US010000023B2

(12) United States Patent
El-Siblani et al.

(10) Patent No.: US 10,000,023 B2
(45) Date of Patent: Jun. 19, 2018

(54) APPARATUS AND METHOD FOR FORMING THREE-DIMENSIONAL OBJECTS USING LINEAR SOLIDIFICATION

(71) Applicant: Global Filtration Systems, Dearborn Heights, MI (US)

(72) Inventors: Ali El-Siblani, Dearborn Heights, MI (US); Alexandr Shkolnik, Los Angeles, CA (US)

(73) Assignee: Global Filtration Systems, Dearborn Heights, MI (US)

( * ) Notice: Subject to any disclaimer, the term of this patent is extended or adjusted under 35 U.S.C. 154(b) by 449 days.

(21) Appl. No.: 14/712,561

(22) Filed: May 14, 2015

(65) Prior Publication Data

US 2015/0246486 A1    Sep. 3, 2015

Related U.S. Application Data

(60) Division of application No. 13/774,355, filed on Feb. 22, 2013, now Pat. No. 9,075,409, which is a
(Continued)

(51) Int. Cl.
*B29C 64/268* (2017.01)
*B29C 67/00* (2017.01)
(Continued)

(52) U.S. Cl.
CPC ...... *B29C 67/0085* (2013.01); *B29C 67/0062* (2013.01); *B29C 67/0066* (2013.01);
(Continued)

(58) Field of Classification Search
CPC .... B29C 64/214; B29C 64/236; B29C 64/268
See application file for complete search history.

(56) References Cited

U.S. PATENT DOCUMENTS 4,849,910 A    7/1989  Jacobs et al.
5,049,901 A    9/1991  Gelbart
(Continued)

FOREIGN PATENT DOCUMENTS

DE    19929199 A1    1/2001
DE    10256672 A1    6/2004
(Continued)

OTHER PUBLICATIONS

International Search Report and Written Opinion for PCT/US2012/044398, dated Oct. 26, 2012.
(Continued)

*Primary Examiner* — Alison L Hindenlang
(74) *Attorney, Agent, or Firm* — Hansen IP Law PLLC

(57) ABSTRACT

An apparatus and method for making a three-dimensional object from a solidifiable material using a linear solidification device is shown and described. In certain examples, the linear solidification device includes a laser diode that projects light onto a scanning device, such as a rotating polygonal mirror or a linear scanning micromirror, which then deflects the light onto a photohardenable resin. As a result, the linear solidification device scans a line of solidification energy in a direction that is substantially orthogonal to the direction of travel of the laser diode. In other examples, the linear solidification device is a laser device array or light emitting diode array that extends in a direction substantially orthogonal to the direction of travel of the array.

20 Claims, 43 Drawing Sheets

Related U.S. Application Data continuation-in-part of application No. 13/534,638, filed on Jun. 27, 2012, now Pat. No. 9,079,355.

(60) Provisional application No. 61/598,666, filed on Feb. 14, 2012, provisional application No. 61/502,020, filed on Jun. 28, 2011.

(51) Int. Cl.
| | |
|---|---|
| G05B 19/042 | (2006.01) |
| B33Y 50/02 | (2015.01) |
| B33Y 10/00 | (2015.01) |
| B33Y 30/00 | (2015.01) |
| B29K 105/24 | (2006.01) |

(52) U.S. Cl.
CPC ........ *G05B 19/042* (2013.01); *B29K 2105/24* (2013.01); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 5,104,592 | A | 4/1992 | Hull et al. |
| 5,121,329 | A | 6/1992 | Crump |
| 5,447,822 | A | 9/1995 | Hull et al. |
| 5,521,748 | A | 5/1996 | Sarraf |
| 5,631,763 | A | 5/1997 | Park |
| 5,753,171 | A | 5/1998 | Serbin et al. |
| 5,780,070 | A | 7/1998 | Yamazawa et al. |
| 5,876,550 | A | 3/1999 | Feygin et al. |
| 5,885,511 | A | 3/1999 | Heller et al. |
| 5,902,537 | A | 5/1999 | Almquist et al. |
| 5,991,102 | A | 11/1999 | Oono et al. |
| 6,030,199 | A | 2/2000 | Tseng |
| 6,180,050 | B1 | 1/2001 | Arai et al. |
| 6,267,919 | B1 | 7/2001 | Tanaka et al. |
| 6,372,178 | B1 | 4/2002 | Tseng |
| 6,406,658 | B1 | 6/2002 | Manners et al. |
| 6,560,248 | B1 | 5/2003 | Vernact |
| 6,570,952 | B2 | 5/2003 | Paladini |
| 6,821,473 | B2 | 11/2004 | Hiizumi et al. |
| 7,006,887 | B2 | 2/2006 | Nagano et al. |
| 7,048,528 | B2 | 5/2006 | Ishikawa et al. |
| 7,158,849 | B2 | 1/2007 | Huang et al. |
| 7,460,159 | B2 | 12/2008 | Ohkawara et al. |
| 7,636,610 | B2 | 12/2009 | Schillen et al. |
| 7,759,230 | B2 | 7/2010 | Im |
| 7,831,328 | B2 | 11/2010 | Schillen et al. |
| 7,906,414 | B2 | 3/2011 | Im |
| 8,905,739 | B2 | 12/2014 | Vermeer et al. |
| 2002/0011693 | A1 | 1/2002 | Leyden et al. |
| 2002/0153640 | A1 | 10/2002 | John |
| 2003/0052105 | A1 | 3/2003 | Nangano et al. |
| 2003/0095186 | A1 | 5/2003 | Aman et al. |
| 2004/0036974 | A1 | 2/2004 | Iizuka et al. |
| 2004/0094728 | A1* | 5/2004 | Herzog ............ B22F 3/1055 250/559.06 |
| 2004/0118309 | A1 | 6/2004 | Fedor et al. |
| 2005/0208168 | A1 | 9/2005 | Hickerson et al. |
| 2008/0259228 | A1 | 10/2008 | Henningsen |
| 2009/0091732 | A1 | 4/2009 | Kato |
| 2010/0097662 | A1 | 4/2010 | Churilla et al. |
| 2010/0232835 | A1 | 9/2010 | Ku |
| 2010/0262272 | A1 | 10/2010 | Shkolnik et al. |
| 2010/0283188 | A1 | 11/2010 | Rohner et al. |
| 2011/0009992 | A1 | 1/2011 | Shkolnik et al. |
| 2012/0165969 | A1 | 6/2012 | Elsey |
| 2013/0001834 | A1 | 1/2013 | El-Siblani et al. |
| 2013/0287933 | A1 | 10/2013 | Kaiser et al. |
| 2014/0052288 | A1 | 2/2014 | El-Siblani et al. |
| 2014/0319736 | A1 | 10/2014 | El-Siblani et al. |
| 2014/0319737 | A1 | 10/2014 | El-Siblani et al. |
| 2014/0319738 | A1 | 10/2014 | El-Siblani et al. |

FOREIGN PATENT DOCUMENTS

| | | |
|---|---|---|
| EP | 0790119 B1 | 5/2003 |
| EP | 1674243 A2 | 6/2006 |
| EP | 1876012 A1 | 1/2008 |
| EP | 1995623 A2 | 11/2008 |
| EP | 2011631 B1 | 4/2012 |
| JP | 08150662 | 6/1996 |
| WO | 2011064725 A1 | 6/2011 |
| WO | 2012021940 A1 | 2/2012 |

OTHER PUBLICATIONS

Yamazawa, Kenji, et al., "High Speed UV Laser Beam Scanning by Polygon Mirror," pp. 223-230, The Institute of Physical and Chemical Research (Riken), (1997).

Opposition to EP 2 011 631, dated Jan. 14, 2013.

European Patent Office (EPO) Notice of Opposition, dated Feb. 25, 2013.

Huang, et al., "Computer Supported Force Analysis and Layer Imagine for Masked Rapid Prototyping System" Department of Mechanical Engineering, National Taiwan University of Science and technology, Taipei, Taiwan.

Huang, et al., "On-line force monitoring of platform ascending rapid prototyping system" Journal of Materials Processing Technology 159 (2005) 257-264.

Patent Abstracts of Japan,English translation of JP 08150662 from: http://www19.ipdl.inpit.go.jp/PA1/result/main/woYeaMaDA408150662P1.htm Jul. 15, 2011.

English translation of DE 10256672 from Lexis Nexis Total Patent.

English translation of DE 19929199 from Lexis Nexis Total Patent.

Non-Final Office Action for U.S. Appl. No. 14/329,153 dated Sep. 3, 2014.

Non-Final Office Action for U.S. Appl. No. 14/328,955 dated Sep. 3, 2014.

Non-Final Office Action for U.S. Appl. No. 14/328,886 dated Sep. 3, 2014.

Extended European Search Report for EP App. No. 12804540.8 (PCT/US2012/044398) dated Jan. 22, 2015.

International Search Report and Written Opinion for PCT/US2014/0066120 dated Feb. 13, 2015.

Paschotta; Rudiger, "Beam Divergence", Encyclopedia of Laser Physics and Technology, Jun. 2008, accessed at http://web.archive.org/web/20090131224642/http://www.rp-photonics.com/beam_divergence.html on Aug. 27, 2014.

International Search Report and Written Opinion for PCT/US2014/017267 dated Apr. 16, 2015.

Notice of Allowance for U.S. Appl. No. 13/774,355 dated Apr. 23, 2015.

Supplemental Notice of Allowability for U.S. Appl. No. 13/774,355 dated May 7, 2015.

Notice of Allowance for U.S. Appl. No. 13/534,638 dated Apr. 14, 2015.

Request for Continued Examination and IDS as-filed for U.S. Appl. No. 14/328,886 dated Mar. 25, 2015.

Corrected Amendment to the Amendment Accopnaying Request for Continued Examination for U.S. 14/328,886 dated Mar. 26, 2015.

"Photodiode", Wikipedia, Feb. 10, 2010, accessed at http://web.archive.org/web/20100210073314/http://en.wikipedia.org/wiki/Photodiode on Sep. 17, 2014.

Response to the Non-Final Office Action for U.S. Appl. No. 14/328,886, as-filed on Nov. 25, 2014.

Request for Continued Examination and IDS as-filed for U.S. Appl. No. 13/534,638 dated Mar. 25, 2015.

Non-Final Office Action for U.S. Appl. No. 13/534,638 dated Sep. 3, 2014.

Response to the Non-Final Office Action for U.S. Appl. No. 14/534,638, as-filed on Nov. 25, 2014.

Restriction Requirement for U.S. Appl. No. 13/774,355 dated Sep. 29, 2014.

Response to the Restriction Requirement for U.S. Appl. No. 13/774,355, as-filed on Nov. 26, 2014.

(56) References Cited

OTHER PUBLICATIONS

Notice of Allowance for U.S. Appl. No. 14/328,886 dated Apr. 15, 2015.

Request for Continued Examination and IDS as-filed for U.S. Appl. No. 14/328,955 dated Mar. 25, 2015.

"Neutral Density Filter", Wikipedia, Dec. 2010, accessed at http://en.wikipedia.org/w/index.php?title=Neutral_density_filter&oldid=402599066 on Aug. 28, 2014.

"Laser Diode Technology", Newport Corp. Sep. 19, 2014, accessed at: http://www.newport.com/Tutorial-Laser-Diode-Technology/852182/1033/content.aspx.

Response to the Non-Final Office Action for U.S. Appl. No. 14/328,955, as-filed on Nov. 25, 2014.

Final Office Action for U.S. Appl. No. 14/328,955 dated Jan. 9, 2015.

"Diode-pumped solid state laser", Wikipedia, accessed at http://en.wikipedia.org/w/index.php?title=Diodepumped_solidstate_laser&oldid=475745566 on Jan. 15, 2015.

Paschotta, Rudiger, "YLF Lasers", RP Photonics Encyclopedia accessed at http://www.rp-photonics.com/ylf_lasers.html on Jan. 16, 2015.

Paschotta, Rudiger, "Acousto-optic Modulators", RP Photonics Encyclopedia accessed at http://www.rp-photonics.com/acousto_optic_modulators.html on Jan. 16, 2015.

Notice of Allowance for U.S. Appl. No. 14/328,955 dated Apr. 23, 2015.

"Direct-Pumped Nd:YLF Laser" Q Peak Inc., accessed at: http://www.qpeak.com/Meetings/CLEO%202012%20Direct%20pump%20Nd_YLF.pdf, May 21, 2015.

"Terra, the diode pumped Nd:YLF laser" Continuum, accessed at: http://www.continuumlasers.com/files/products/Terra/Terra_Datasheet.pdf, May 21, 2015.

"Terra PIV Diode Pumped ND: YLF, Laser for PIV System Measurements", TSI Incorporated, accessed at: http://www.tsi.com/uploadedFiles/_Site_Root/Products/Literature/Spec_Sheets/Terra_PIV_A4_5001615_Web.pdf May 21, 2015.

Wikipedia, "Digital Light Processing", Wikipedia, The Free Encyclopedia, May 13, 2015, accessed at http://en.wikipedia.org/w/index.php?title=Digital_Light_Processing&oldid=662125921.

"Evolution, Q-Switched, Nd: YLF Green Pump Lasers" Coherent catalogue, Copyright 2012, WWW.Coherent.com.

Response to the Non-Final Office Action for U.S. Appl. No. 14/329,153, as-filed on Nov. 25, 2014.

Request for Continued Examination and IDS as-filed for U.S. Appl. No. 14/329,153 dated Mar. 26, 2015.

Notice of Allowance for U.S. Appl. No. 14/329,153 dated Apr. 23, 2015.

"Laser Diodes" RP Photonics Encyclopedia, http://www.rp-photonics.com/laser_diodes.html.

\* cited by examiner

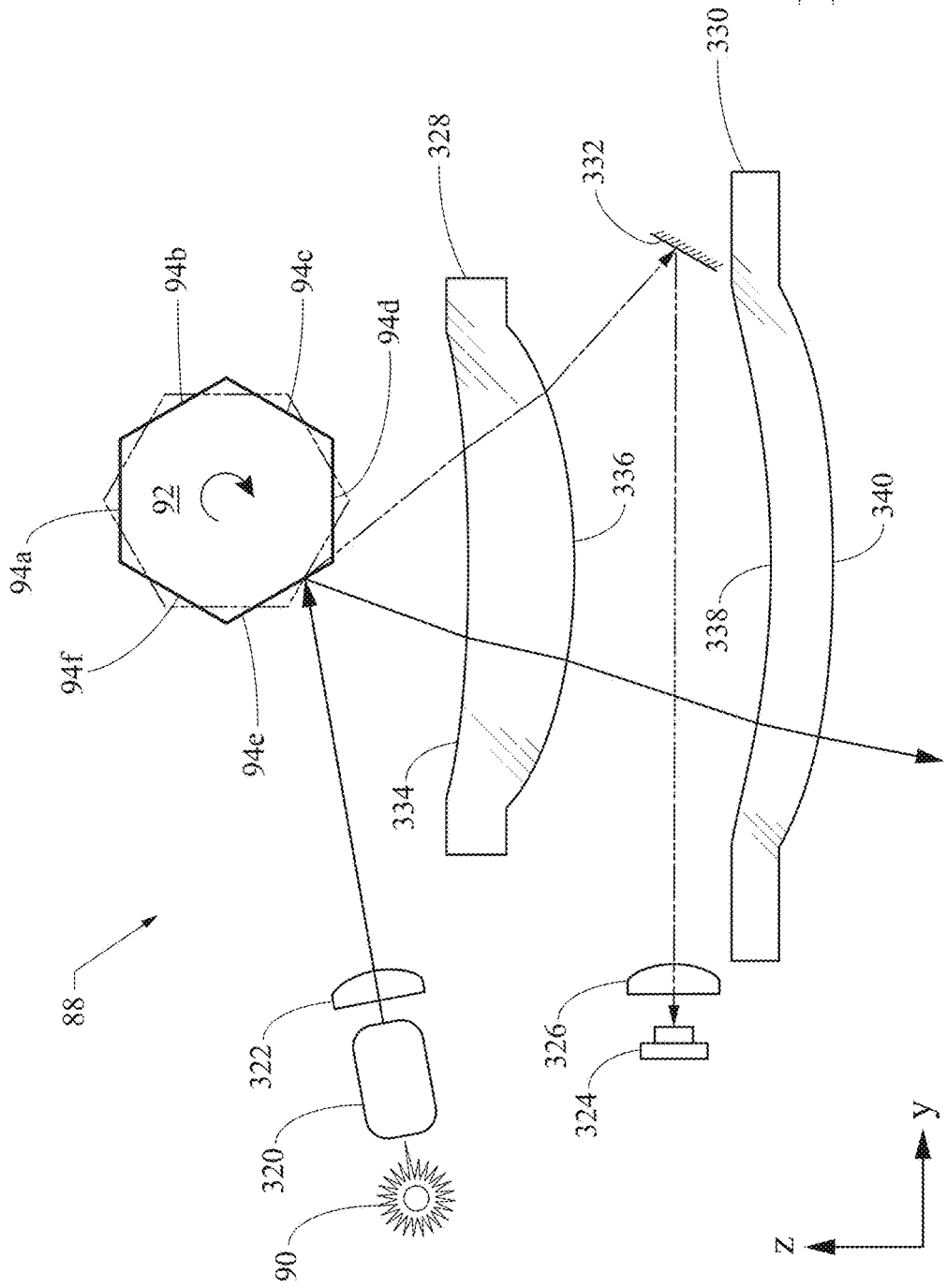

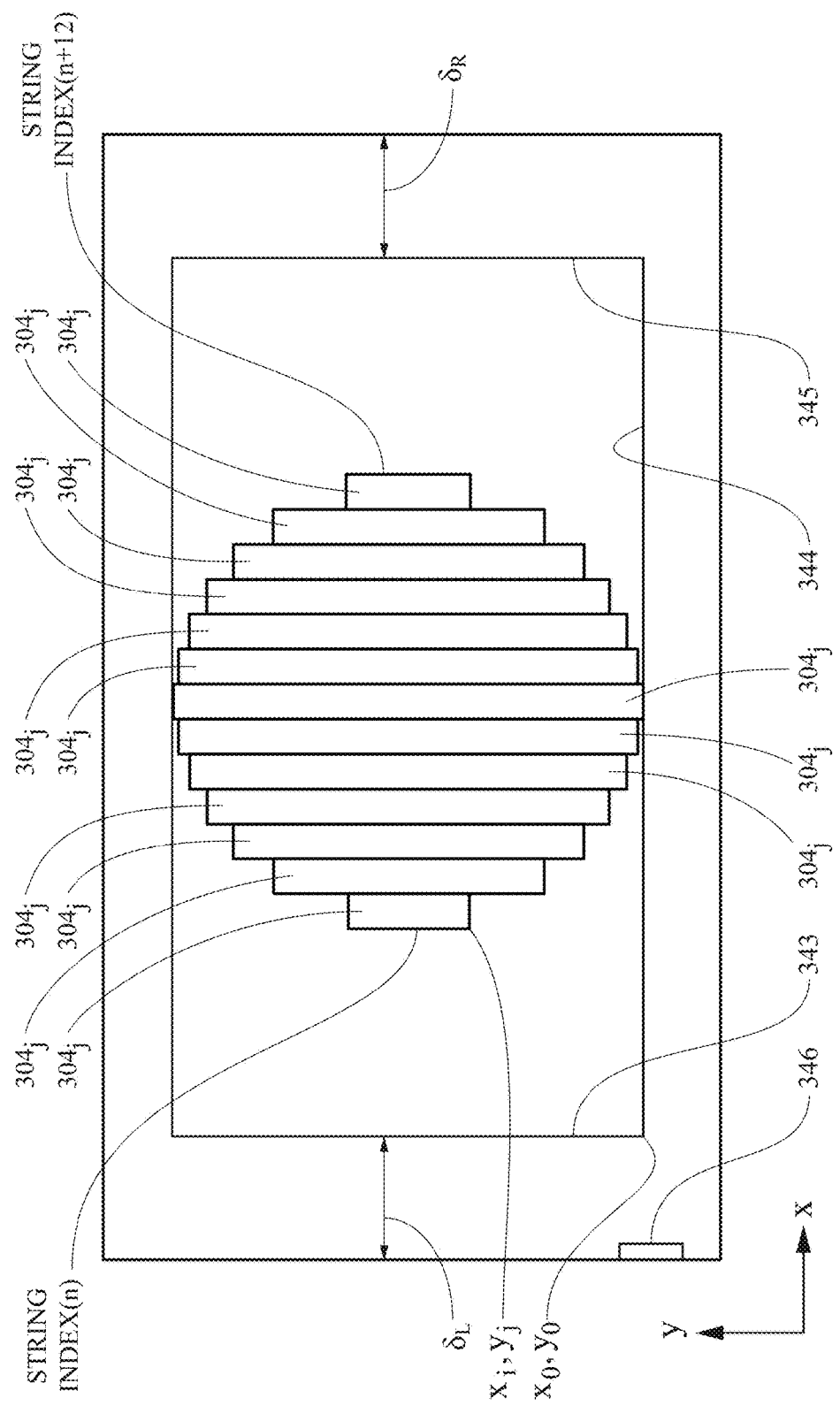

| m (computer memory index) | n ( string index) | Data string |
|---|---|---|
| 0 | 20 | FFFFFFFF, 20, 22000, 44000 |
| 1 | 21 | FFFFFFFF, 21, 20000, 46000 |
| 2 | 22 | FFFFFFFF, 22, 18000, 48000 |
| ... | ... | ... |
| 6 | 26 | FFFFFFFF, 26, 0, 66000 |
| ... | ... | |
| 10 | 30 | FFFFFFFF, 30, 18000, 48000 |
| 11 | 31 | FFFFFFFF, 31, 20000, 46000 |
| 12 | 32 | FFFFFFFF, 32, 22000, 44000 |

| m | n (even) (L-R) | Data String |
|---|---|---|
| 0 | 20 | FFFFFFFF, 10, 8500, 54000 |
| 1 | 21 | FFFFFFFF, 11, 8250, 57750 |
| ... | ... | ... |
| 10 | 30 | FFFFFFFF, 30, 8250, 24750, 41250, 57750 |
| ... | ... | |
| 39 | 59 | FFFFFFFF, 59, 8250, 24750, 41250, 57750 |
| 40 | 60 | FFFFFFFF, 60, 8500, 24500, 41500, 57500 |

FIG. 16(f)

| m | n(odd) R-L | $(N_{max}-1) - n(odd)$ | Even layer data string for $n(even) = (N_{max}-1) - n(odd)$ |
|---|---|---|---|
| 0 | 40 | 100-40 = 60 | FFFFFFFF, 40, 8500, 24500, 41500, 57500 |
| 1 | 41 | 100-41=59 | FFFFFFFF, 41, 8250, 24750, 41250, 57750 |
| ... | ... | ... | ... |
| 30 | 70 | 100-70=30 | FFFFFFFF, 42, 8250, 24750, 41250, 57750 |
| ... | ... | ... | ... |
| 39 | 79 | 100-79=21 | FFFFFFFF, 43, 8250, 57750 |
| 40 | 80 | 100-80=20 | FFFFFFFF, 44, 8500, 54000 |

FIG. 16(g)

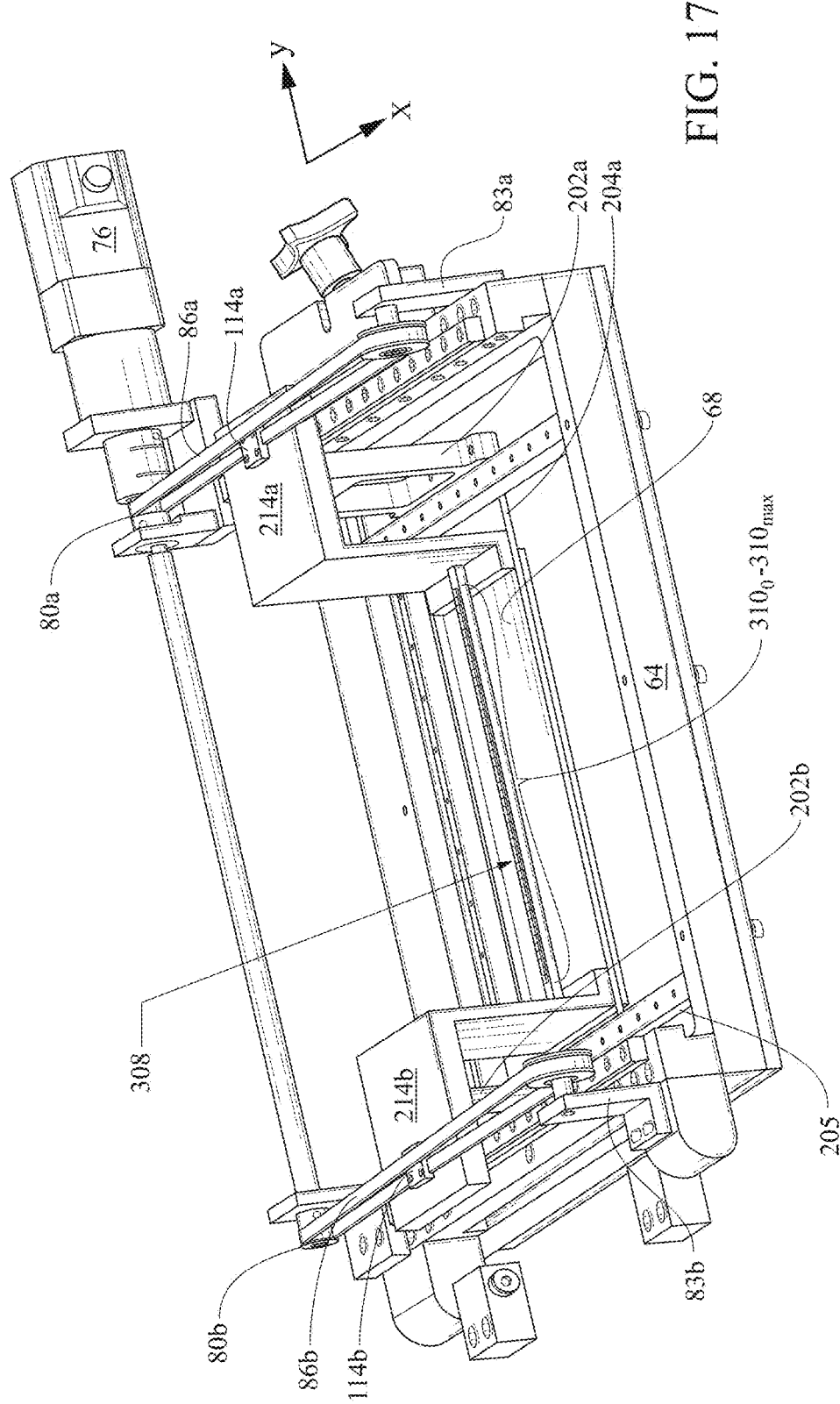

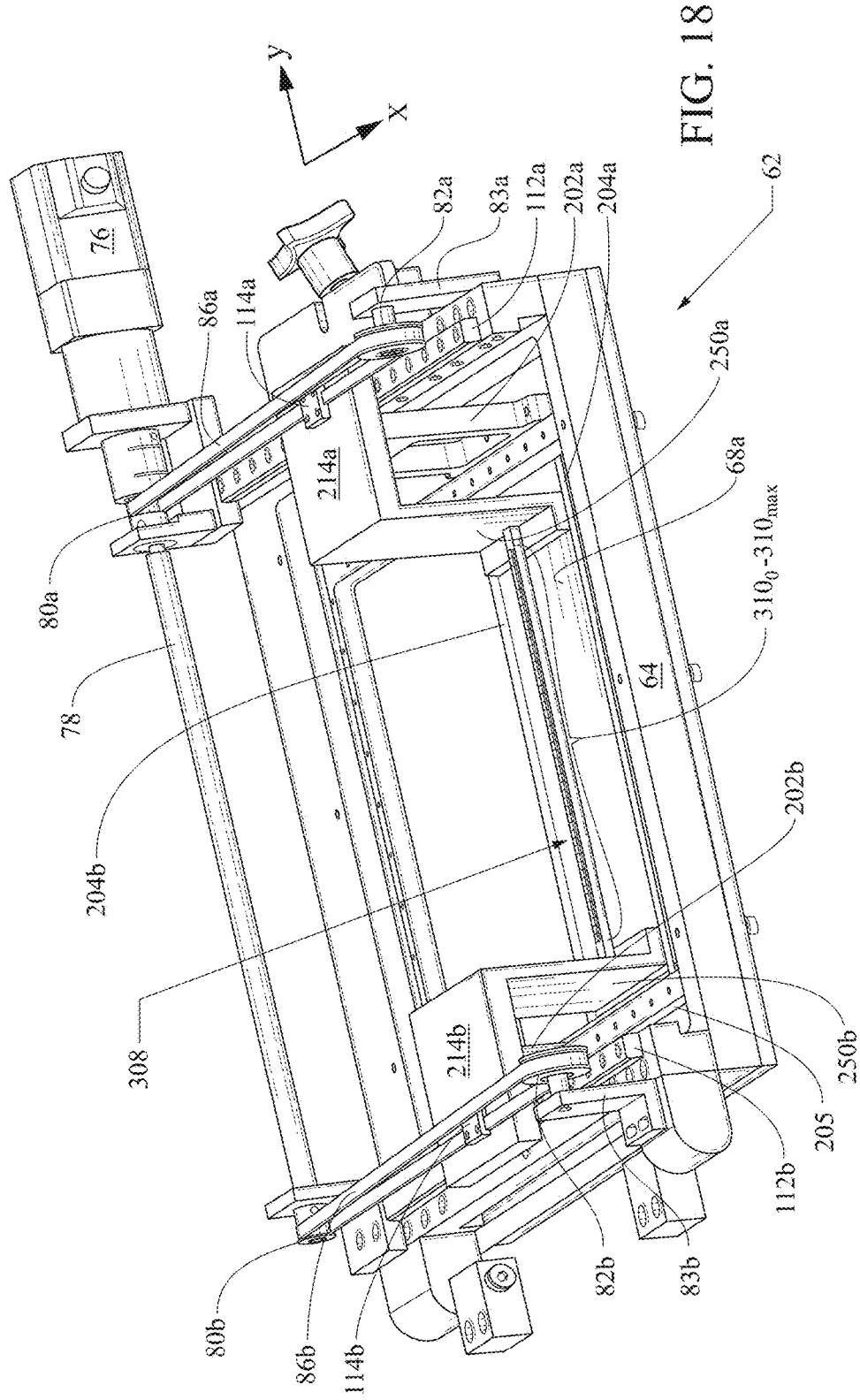

FIG. 29
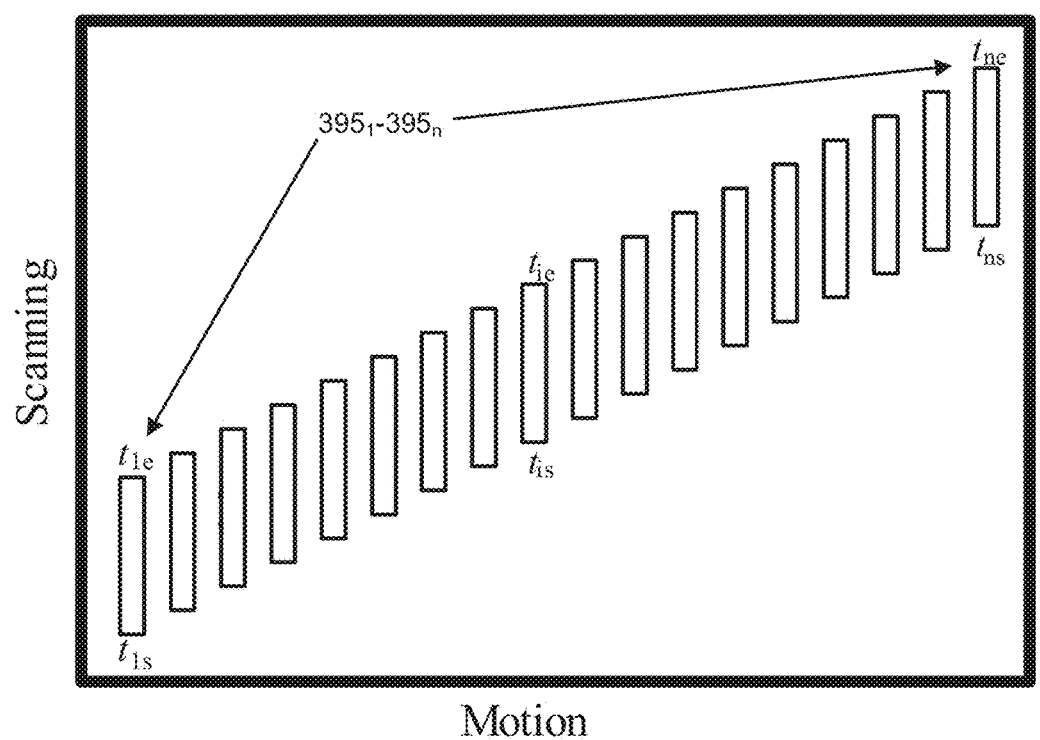
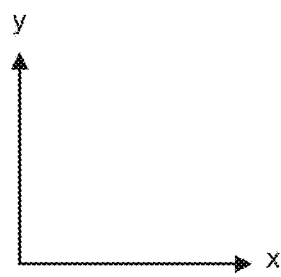

| m (computer memory index) | n (string index) | Data string for linear solidification device no. 1 | Data string for linear solidification device no. 2 |
|---|---|---|---|
| 0 | 20 | FFFFFFFF, 20, 22000, 34000 | 33000, 44000 |
| 1 | 21 | FFFFFFFF, 21, 20000, 34000 | 33000, 46000 |
| 2 | 22 | FFFFFFFF, 22, 18000, 34000 | 33000, 48000 |
| ... | ... | ... | |
| 6 | 26 | FFFFFFFF, 26, 0, 34000 | 33000, 66000 |
| ... | ... | | |
| 10 | 30 | FFFFFFFF, 31, 18000, 34000 | 33000, 48000 |
| 11 | 31 | FFFFFFFF, 32, 20000, 34000 | 33000, 46000 |
| 12 | 32 | FFFFFFFF, 33, 22000, 34000 | 33000, 44000 |

FIG. 30

| m | n (even) (L-R) | Data String for linear solidification device no. 1 | Data string for linear solidification device no. 2 |
|---|---|---|---|
| | | | |
| 0 | 20 | FFFFFFFF, 10, 8500, 32000 | 31000, 54000 |
| 1 | 21 | FFFFFFFF, 11, 8250, 34000 | 32000, 57750 |
| ... | ... | ... | |
| 10 | 30 | FFFFFFFF, 30, 8250, 24750 | 41250, 57750 |
| ... | ... | | |
| 39 | 59 | FFFFFFFF, 53, 8250, 24750, | 41250, 57750 |
| 40 | 60 | FFFFFFFF, 54, 8500, 24500 | 41500, 57500 |

FIG. 31

| m | n(odd) R-L | $(N_{max}-1) - n(odd)$ | Even layer data string for $n(even) = (N_{max}-1)-n(odd)$ for device no. 1 | Even layer data string for $n(even) = (N_{max}-1)-n(odd)$ for device no. 2 |
|---|---|---|---|---|
| 0 | 40 | 100-40 = 60 | FFFFFFFF, 40, 8500, 24500 | 41500, 57500 |
| 1 | 41 | 100-41=59 | FFFFFFFF, 41, 8250, 24750 | 41250, 577550 |
| ... | ... | ... | ... | |
| 30 | 70 | 100-70=30 | FFFFFFFF, 42, 8250, 24750 | 41250, 57750 |
| ... | ... | ... | ... | |
| 39 | 79 | 100-79=21 | FFFFFFFF, 43, 8250, 34000 | 32000, 57750 |
| 40 | 80 | 100-80=20 | FFFFFFFF, 44, 8500, 32000, | 31000, 54000 |

FIG. 32

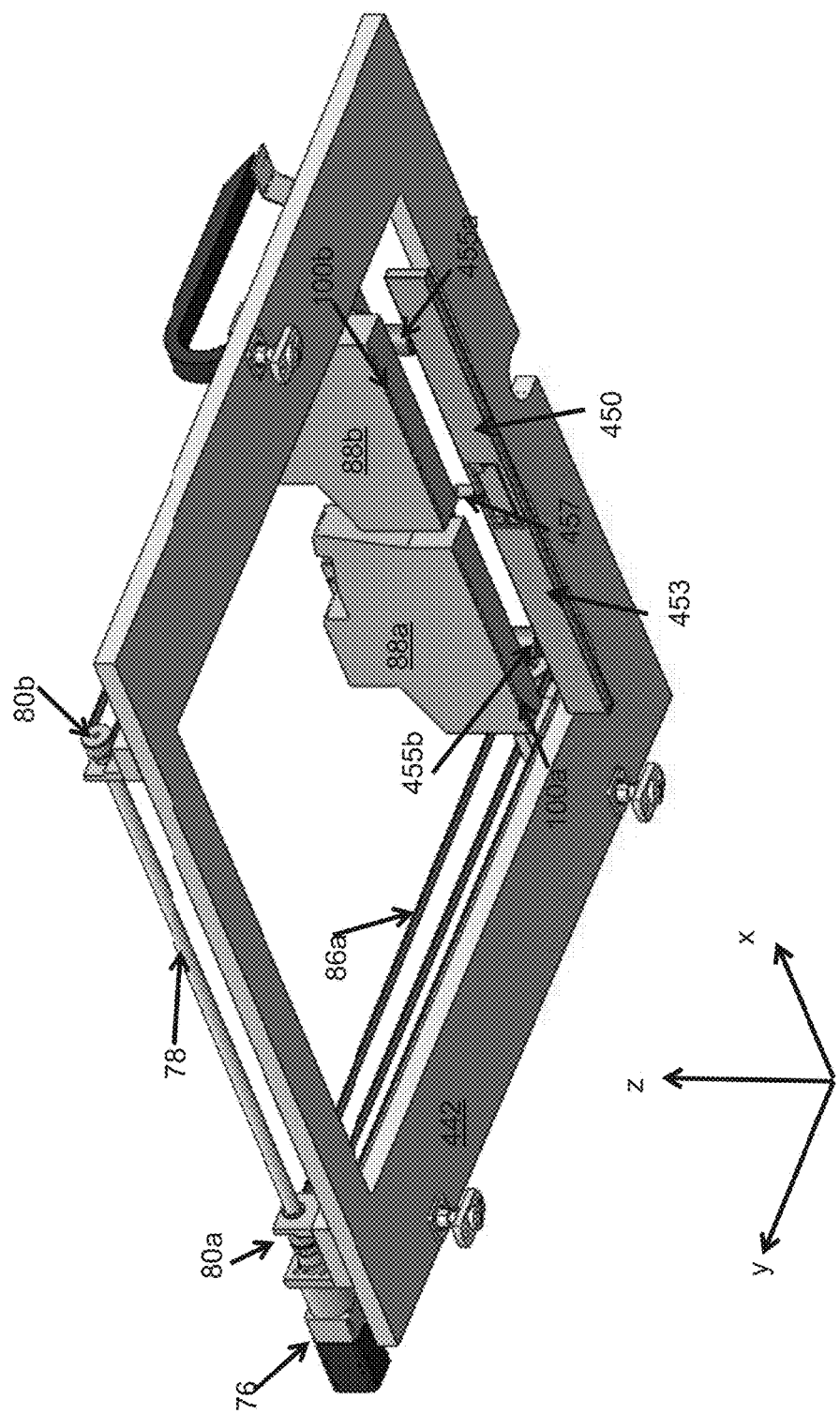

APPARATUS AND METHOD FOR FORMING THREE-DIMENSIONAL OBJECTS USING LINEAR SOLIDIFICATION

CROSS-REFERENCE TO RELATED APPLICATIONS

This application is a divisional of U.S. patent application Ser. No. 13/774,355, filed on Feb. 22, 2013, which is a continuation-in-part of U.S. patent application Ser. No. 13/534,638, filed on Jun. 27, 2012, which claims the benefit of U.S. Provisional Patent Application No. 61/598,666, filed on Feb. 14, 2012 and U.S. Provisional Patent Application No. 61/502,020, filed on Jun. 28, 2011. The entirety of each of the foregoing applications is hereby incorporated by reference.

FIELD

The disclosure relates to an apparatus and method for manufacturing three-dimensional objects, and more specifically, to an apparatus and method for using linear solidification to form such objects.

DESCRIPTION OF THE RELATED ART

Three-dimensional rapid prototyping and manufacturing allows for quick and accurate production of components at high accuracy. Machining steps may be reduced or eliminated using such techniques and certain components may be functionally equivalent to their regular production counterparts depending on the materials used for production.

The components produced may range in size from small to large parts. The manufacture of parts may be based on various technologies including photo-polymer hardening using light or laser curing methods. Secondary curing may take place with exposure to, for example, ultraviolet (UV) light. A process to convert a computer aided design (CAD) data to a data model suitable for rapid manufacturing may be used to produce data suitable for constructing the component. Then, a pattern generator may be used to construct the part. An example of a pattern generator may include the use of DLP (Digital Light Processing technology) from Texas Instruments®, SXRD™ (Silicon X-tal Reflective Display), LCD (Liquid Crystal Display), LCOS (Liquid Crystal on Silicon), DMD (digital mirror device), J-ILA from JVC, SLM (Spatial light modulator) or any type of selective light modulation system.

Many of the foregoing devices are complex and involve numerous, very small, moving parts. For example, DMD devices involve thousands of individually controllable micromirrors. Laser based SLA systems require lasers with a fine degree of controlled manipulability to trace object cross-sections which may be linear, non-linear, or irregular in shape. These features of many known three-dimensional object manufacturing systems have driven up the cost of such systems, making them unavailable to many consumers. Thus, a need has arisen for an apparatus and method for making three-dimensional objects using a linear solidification process which addresses the foregoing issues.

BRIEF DESCRIPTION OF THE DRAWINGS

The disclosure will now be described, by way of example, with reference to the accompanying drawings, in which:

FIG. 5C is a schematic view of a first alternate version of the linear solidification device of FIG. 5A in which the housing is removed and which includes a solidification energy synchronization sensor;

FIG. 16(c) is a top plan view of the source of solidifiable material of FIG. 16(c) with the object cross-section strip data of FIG. 16(c) mapped onto the build envelope;

FIG. 16(f) is a table depicting exemplary sets of data strings corresponding to an even layer of a three-dimensional object represented by the cross-sectional strip data of FIG. 16(e);

FIG. 16(g) is a table depicting exemplary sets of data strings corresponding to an odd layer of a three-dimensional object represented by the cross-sectional string data of FIG. 16(f);

FIG. 17 is a perspective view of an alternate embodiment of a solidification substrate assembly and linear solidification device for use in a system for making a three-dimensional object with the linear solidification device in a first position along the length of the solidification substrate assembly;

FIG. 18 is a perspective view of the embodiment of FIG. 17 with the linear solidification device in a second position along the length of the solidification substrate assembly;

FIG. 29 is a schematic depicting a build envelope with a plurality of rectangular test parts used to provide a linear solidification device speed and/or energy variation algorithm;

FIG. 30 is a table depicting exemplary sets of data strings for two linear solidification devices corresponding to object cross-sectional strip data of FIG. 16(c);

FIG. 31 is table depicting exemplary sets of data strings for two linear solidification devices corresponding to an even layer of a three-dimensional object represented by the cross-sectional strip data of FIG. 16(e);

FIG. 32 is a table depicting exemplary sets of data strings for two linear solidification devices, the data strings corresponding to an odd layer of a three-dimensional object represented by the cross-sectional string data of FIG. 16(f);

FIG. 36 is a perspective view of a portion of a work table assembly and two linear solidification devices operatively connected to a vacuum blade for system for making a three-dimensional object.

Like numerals refer to like parts in the drawings.

DETAILED DESCRIPTION

Figure 1:
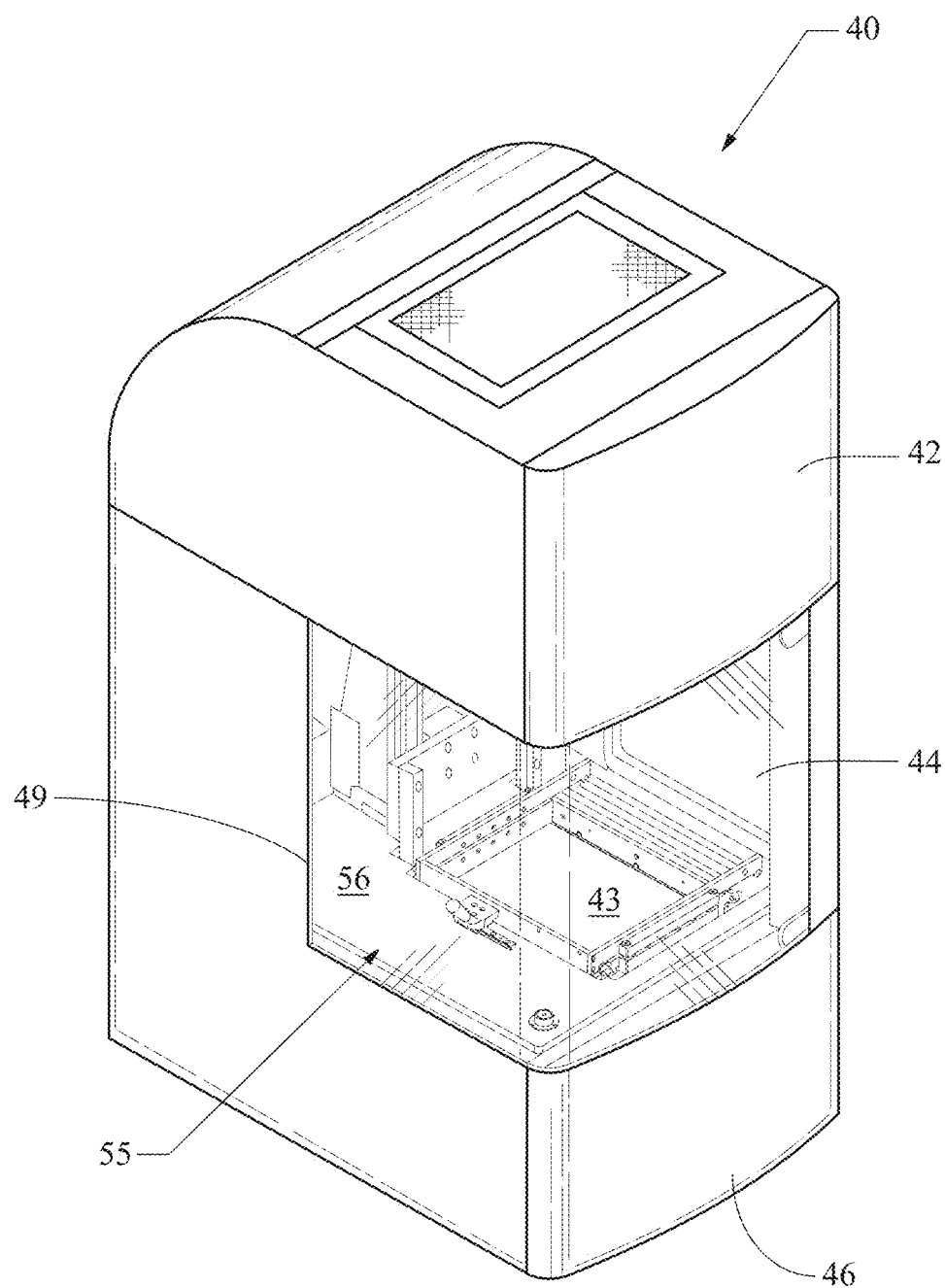
FIG. 1 is a perspective view of a system for making a three-dimensional object from a solidifiable material in a closed housing configuration.

The Figures illustrate examples of an apparatus and method for manufacturing a three-dimensional object from a solidifiable material. Based on the foregoing, it is to be generally understood that the nomenclature used herein is simply for convenience and the terms used to describe the invention should be given the broadest meaning by one of ordinary skill in the art.

The apparatuses and methods described herein are generally applicable to additive manufacturing of three-dimensional objects, such as components or parts (discussed herein generally as objects), but may be used beyond that scope for alternative applications. The system and methods generally include a linear solidification device that applies solidification energy to a solidifiable material, such as a photohardenable resin. The linear solidification devices apply solidification energy in a generally—and preferably substantially—linear pattern across an exposed surface of the solidifiable material and also move in a direction other than the one defined by the length of the linear pattern while applying solidification energy. In certain examples, the linear solidification device includes a scanning device that deflects received solidification energy in a scanning pattern. Such scanning devices include without limitation rotating polygonal mirrors and laser scanning micromirrors.

In certain illustrative examples, the apparatuses and methods described herein may include a solidification substrate against which a solidifiable material is solidified as an object is built from the solidification material. The solidification substrate facilitates the creation of a substantially planar surface of solidification material which is exposed to energy provided by a linear solidification device. The substantially planar surface improves the accuracy of the build process. In certain embodiments, as discussed below, the solidification substrate rocks to facilitate the separation of solidified material from the solidification substrate. In certain other embodiments, one or more peeling members is provided to separate the solidification substrate assembly from an object being built. In further embodiments, the solidification substrate is a planar or curved substrate that translates with the linear solidification device as it traverses the solidifiable material.

The system is generally used for manufacturing three-dimensional objects from a solidifiable material and rapid prototyping. A linear solidification device comprising a source of solidification energy (such as a laser diode or LED array) creates a series of adjacent linear images on a solidifiable material which may vary in accordance with the shape of the object being built as the device moves across the surface of the solidifiable material to selectively solidify it.

As discussed herein, a solidifiable material is a material that when subjected to energy, wholly or partially hardens. This reaction to solidification or partial solidification may be used as the basis for constructing the three-dimensional object. Examples of a solidifiable material may include a polymerizable or cross-linkable material, a photopolymer, a photo powder, a photo paste, or a photosensitive composite that contains any kind of ceramic based powder such as aluminum oxide or zirconium oxide or ytteria stabilized zirconium oxide, a curable silicone composition, silica based nano-particles or nano-composites. The solidifiable material may further include fillers. Moreover, the solidifiable material my take on a final form (e.g., after exposure to the electromagnetic radiation) that may vary from semi-solids, solids, waxes, and crystalline solids. In one embodiment of a photopolymer paste solidifiable material, a viscosity of between 10000 cP (centipoises) and 150000 cp is preferred.

When discussing a photopolymerizable, photocurable, or solidifiable material, any material is meant, possibly comprising a resin and optionally further components, which is solidifiable by means of supply of stimulating energy such as electromagnetic radiation. Suitably, a material that is polymerizable and/or cross-linkable (i.e., curable) by electromagnetic radiation (common wavelengths in use today include UV radiation and/or visible light) can be used as such material. In an example, a material comprising a resin formed from at least one ethylenically unsaturated compound (including but not limited to (meth)acrylate monomers and polymers) and/or at least one epoxy group-containing compound may be used. Suitable other components of the solidifiable material include, for example, inorganic and/or organic fillers, coloring substances, viscose-controlling agents, etc., but are not limited thereto.

When photopolymers are used as the solidifiable material, a photoinitiator is typically provided. The photoinitiator absorbs light and generates free radicals which start the polymerization and/or crosslinking process. Suitable types of photoinitiators include metallocenes, 1,2 di-ketones, acylphosphine oxides, benzyldimethyl-ketals, α-amino ketones, and α-hydroxy ketones. Examples of suitable metallocenes include Bis(eta 5-2,4-cyclopenadien-1-yl) Bis[2,6-difluoro-3-(1H-pyrrol-1-yl)phenyl] titanium, such as Irgacure 784, which is supplied by Ciba Specialty chemicals. Examples of suitable 1,2 di-ketones include quinones such as camphorquinone. Examples of suitable acylphosphine oxides include bis acyl phosphine oxide (BAPO), which is supplied under the name Irgacure 819, and mono acyl phosphine oxide (MAPO) which is supplied under the name Darocur® TPO. Both Irgacure 819 and Darocur® TPO are supplied by Ciba Specialty Chemicals. Examples of suitable benzyldimethyl ketals include alpha, alpha-dimethoxy-alpha-phenylacetophenone, which is supplied under the name Irgacure 651. Suitable α-amino ketones include 2-benzyl-2-(dimethylamino)-1-[4-(4-morpholinyl)phenyl]-1-butanone, which is supplied under the name Irgacure 369. Suitable α-hydroxy ketones include 1-hydroxy-cyclohexyl-phenyl-ketone, which is supplied under the name Irgacure 184 and a 50-50 (by weight) mixture of 1-hydroxy-cyclohexyl-phenyl-ketone and benzophenone, which is supplied under the name Irgacure 500.

The linear solidification device may be configured in a number of ways. In certain examples, the linear solidification device progressively exposes portions of the solidifiable material to solidification energy in one direction (a scanning direction) as the device moves in another direction. In other examples, a generally, or preferably substantially, linear pattern of solidification energy is applied in a single exposure along one direction as the device moves in another direction. The solidification energy may comprise electromagnetic radiation. The electromagnetic radiation may include actinic light, visible or invisible light, UV-radiation, IR-radiation, electron beam radiation, X-ray radiation, laser radiation, or the like. Moreover, while each type of electromagnetic radiation in the electromagnetic spectrum may be discussed generally, the disclosure is not limited to the specific examples provided. Those of skill in the art are aware that variations on the type of electromagnetic radiation and the methods of generating the electromagnetic radiation may be determined based on the needs of the application.

Referring to FIGS. 1-6, a first system 40 for making a three-dimensional object is depicted. System 40 includes a solidification substrate assembly 62 (FIG. 2) and a linear solidification device 88 (FIGS. 3-5C). System 40 includes a housing 42 for supporting and enclosing the components of system 40. Housing 42 includes a viewing window 44 that is moveably disposed in a housing opening 49. Viewing window 44 allows users to observe an object as it is being built during an object build operation. In the example of FIGS. 1-6, viewing window 44 is mounted on a hinge 60 (FIG. 2), allowing the window 44 to be pivotally opened and closed about the longitudinal axis of hinge 60, thereby providing access to the built object once the build operation is complete.

Housing 42 also includes a lower compartment 52 (FIG. 2) for housing a photopolymer resin container 48. Photopolymer resin container 48 is mounted on a sliding support assembly 50 that allows container 48 to be slidably inserted and removed from lower compartment 52. The sliding support assembly 50 provides a means for adding or removing photopolymer resin from container 48 or for replacing container 48. Lower compartment door 46 (FIG. 1) removably secures sliding support assembly 50 within lower compartment 52.

Work table assembly 55 comprises a work table 56 and solidification substrate assembly 62. Work table 56 is disposed in the interior of housing 42 above the lower compartment 46 and includes opening 54 (FIG. 2) through which object build platform 43 is movably disposed. Latch 58 is provided to secure solidification substrate assembly 62 to work table 56 during an object building process.

Figure 2:
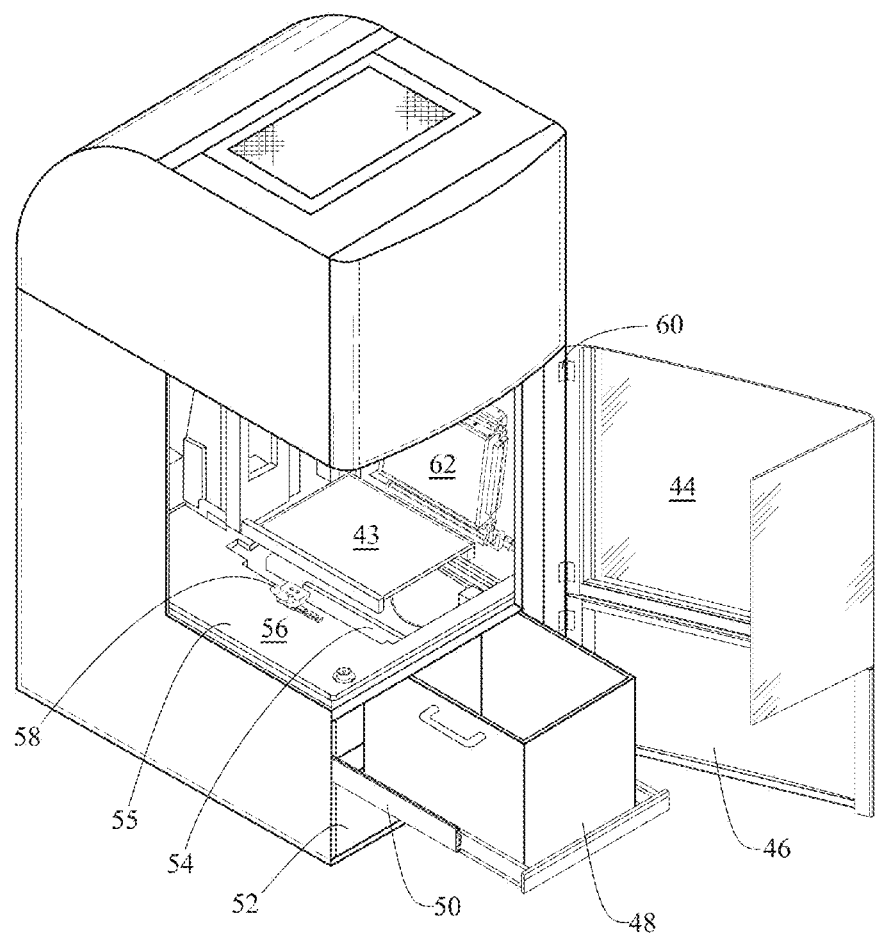
FIG. 2 is a perspective view of the system for making a three-dimensional object of FIG. 1 in an open housing configuration.

Build platform 43 is connected to an elevator assembly (not shown) which moves build platform 43 downward into resin container 48 during an object build operation and upward out of resin container 48 after an object build operation is complete. As indicated in FIG. 2, build platform 43 has a rest position in which it is elevated above work table 56 to facilitate the removal of finished objects as well as the removal of any excess resin on platform 43. In certain illustrative examples, build platform 43 stops at periodic intervals, and linear solidification device 88 supplies solidification energy to the exposed solidification material at an exposed solidifiable material surface with the build platform 43 at rest. In other examples, build platform 43 moves continuously away from work table 56 as solidification energy is supplied to the solidifiable material.

Figure 3:
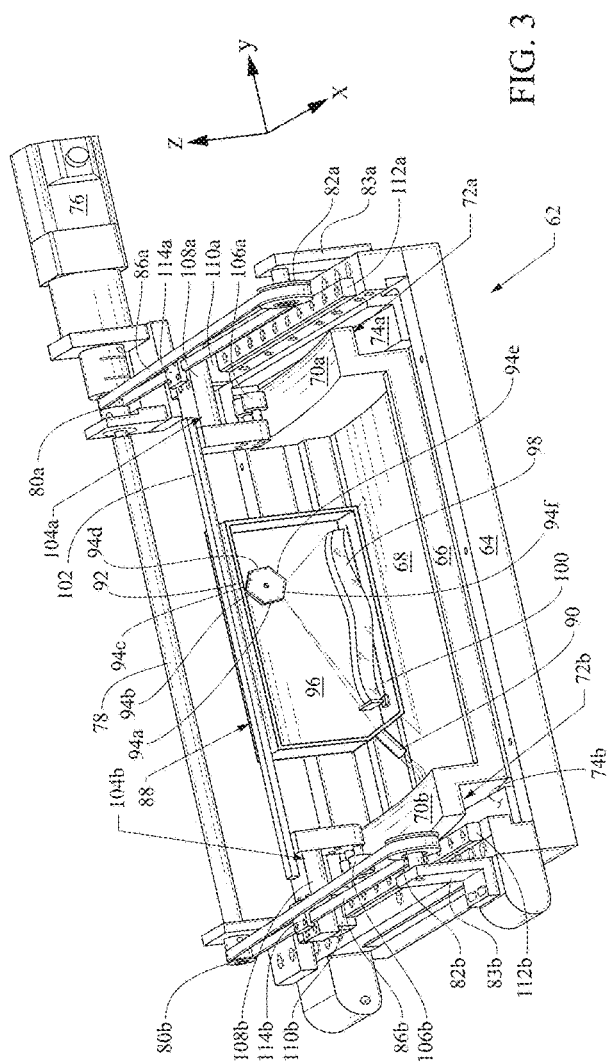
FIG. 3 is a depiction of an embodiment of a solidification substrate assembly and a linear solidification device for use in a system for making a three-dimensional object with the linear solidification device in a first position along the length of the solidification substrate assembly.

Referring to FIG. 3, an object solidification and separation system is depicted which includes a solidification substrate assembly 62 and a linear solidification device 88. Linear solidification device 88 progressively applies solidification energy to a solidifiable material in a first direction (y-direction) as it moves in another direction (x-direction) across the surface of a solidifiable material, such as a photohardenable resin (not shown in figure). In preferred embodiments, linear solidification device 88 includes a linear scanning device, and solidification energy is "scanned" in a scanning direction that defines a scanning axis (i.e., the y-axis) as the linear solidification device 88 moves in the x-direction. Preferably, the linear solidification device 88 is not itself moved in the y-direction as this occurs. The sequential linear scans in the scanning axis direction may be referred to as "linear scanning operations" herein.

Linear solidification device 88 comprises a solidification energy source 90, a scanning device, and a housing 96. In the embodiment depicted in FIG. 3, the scanning device is a rotating energy deflector 92. In other examples of a linear solidification device 88, the scanning device is a laser scanning micromirror that is used in place of rotating energy deflector 92. Thus, it should be understood throughout that a laser scanning micromirror may be used in place of a rotating energy deflector 92 in the exemplary embodiments described herein.

Suitable laser scanning micromirrors include magnetically-actuated MOEMS (micro-opto-electromechanical systems) micromirrors supplied under the name LSCAN by Lemoptix SA of Switzerland. A linear scanning micromirror comprises a silicon chip with a fixed part and a movable mirror part. The mirror is electrically or magnetically actuated to tilt relative to the fixed part to a degree that corresponds to the actuating signal. As the mirror tilts, received solidification energy is scanned via deflection from the tilting mirror. Thus, the degree of tilt or tilt angle corresponds to the position along the scanning (y) axis at which the deflected solidification energy strikes the surface of the solidifiable material.

In certain preferred examples, and as shown in FIG. 3, a lens 98 is provided between the rotating energy deflector 92 and a bottom surface of housing 96 to focus deflected solidification energy and transmit it toward the solidifiable material. In the example of FIG. 3, the solidifiable material is underneath and in contact with rigid or semi-rigid solidification substrate 68. In the example of FIG. 3, lens 98 is preferably a flat field lens. In certain examples, the lens 98 is a flat field lens that is transparent to violet and ultraviolet radiation. In additional examples, the lens 98 also has a focal distance that is longer on the ends of the lens relative to the middle (referring to the y-axis scanning direction along which the lens length is oriented) to compensate for different solidification energy beam travel distances from the rotating energy deflector 92 to the solidifiable material. In certain implementations, lens 98 includes an anti-reflective coating such that the coated lens transmits at least 90%, preferably at least 92%, and more preferably at least 95% of the incident light having a wavelength ranging from about 380 nm to about 420 nm. In one example, lens 98 transmits at least about 95% of the incident light having a wavelength of about 405 nm. Suitable coatings include single layer, magnesium difluoride ($MgF_2$) coatings, including ARSL0001 MgF2 coatings supplied by Siltint Industries of the United Kingdom.

Housing 96 also includes a substantially linear opening 100 (e.g., a slit) through which light is projected to rigid or semi-rigid solidification substrate 68 and onto the solidifiable material.

Figure 4:
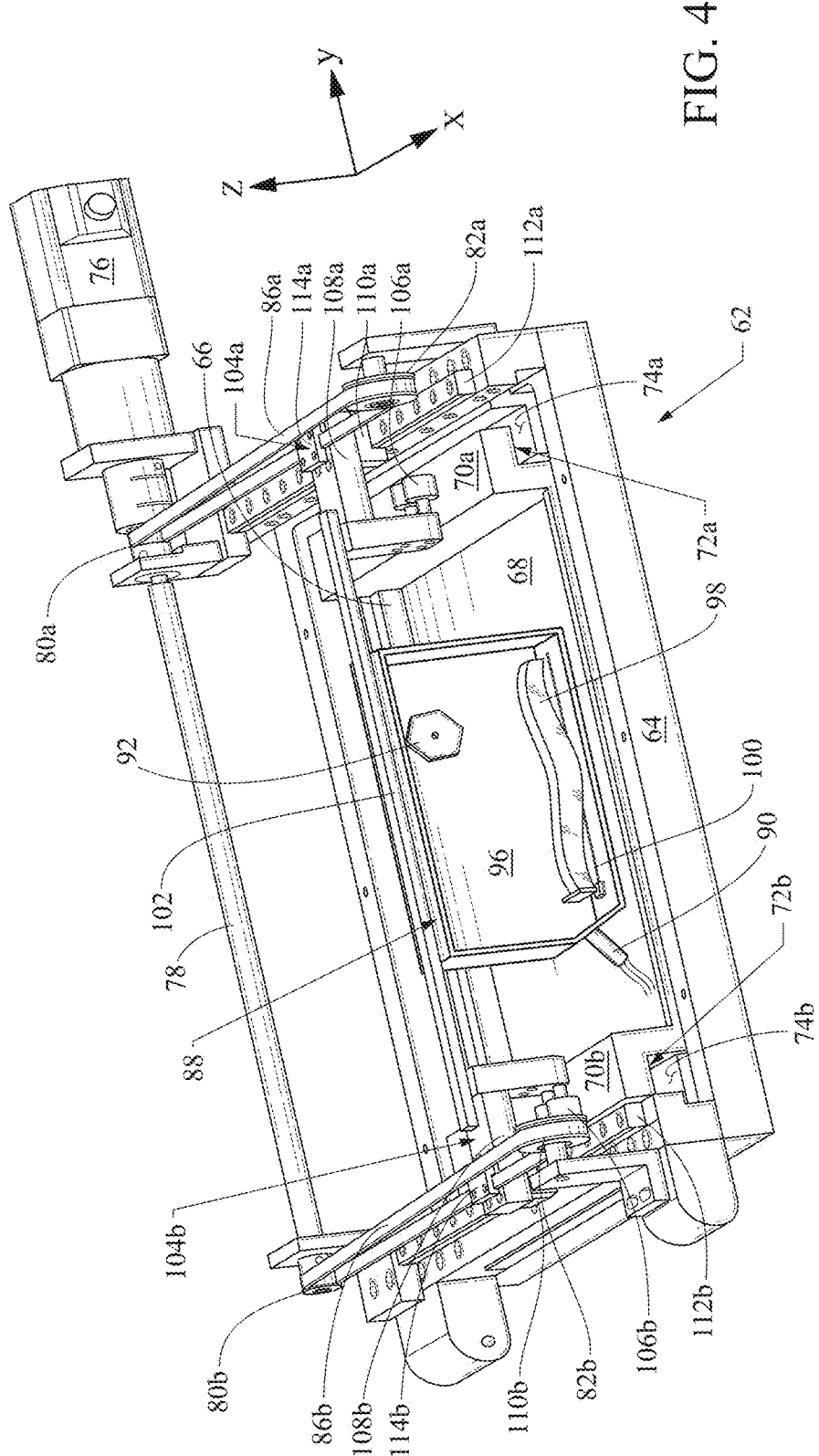
FIG. 4 is a depiction of the solidification substrate assembly and linear solidification device of FIG. 3 with the linear solidification device in a second position along the length of the solidification substrate assembly.

FIGS. 3 and 4 show housing 96 at first and second positions, respectively, along the length (x-axis) of solidification substrate assembly 62. In the embodiment of FIGS. 3-4, housing 96 moves in the x-direction, but not in the y-direction. Motor 76 is provided to drive housing 96 across the surface of rigid or semi-rigid solidification substrate 68 (and the surface of the solidifiable material lying beneath it) from one end of solidification substrate assembly 62 to the other in the x-direction. In certain examples, motor 76 is a servo motor or a stepper motor. In either case, motor 76 has a motor movement parameter associated with it that corresponds to a degree of linear movement of linear solidification device 88 in the x-axis direction. In certain cases the parameter is a number of motor steps corresponding to a particular linear distance that linear solidification device 88 moves in the x-axis direction. As housing 96 moves in the x-direction (the length direction of solidification substrate assembly 62), solidification energy source 90 and rotating energy deflector 92 move therewith. During this movement, solidification energy, preferably laser light, is periodically or continuously projected from solidification energy source 90 to rotating energy deflector 92. In one preferred embodiment, solidification energy source 90 is a laser diode that emits light in the range of 380 nm-420 nm. A range of 390 nm-410 nm is preferred, and a range of from 400 nm to about 410 nm is more preferred. The laser power is preferably at least about 300 mW, more preferably at least about 400 mW, and even more preferably, at least about 450 mW. At the same time, the laser power is preferably no more than about 700 mW, more preferably no more than about 600 mW, and still more preferably no more than about 550 mW. In one example, a 500 mW, 405 nm blue-light laser is used. Suitable blue light laser diodes include 405 nm, 500 mW laser diodes supplied by Sanyo.

Rotating energy deflector 92 deflects solidification energy that is incident upon it toward flat field lens 98. Rotating energy deflector 92 preferably rotates in a rotation plane as linear solidification device 88 moves in the length (x-axis) direction. In certain examples, the rotation plane is substantially perpendicular to the direction in which the linear solidification device 88 moves (i.e., the rotation plane is the y-z plane shown in FIGS. 3-4). In certain examples, rotating energy deflector 92 rotates at a substantially constant rotational speed. In other examples, the linear solidification device 88 moves at a substantially constant speed in the length (x-axis) direction. In further examples, the rotating energy deflector 92 rotates at a substantially constant rotational speed and the linear solidification device 88 moves in the length (x-axis) direction at a substantially constant speed.

When solidification energy source 90 is a light source, rotating energy deflector 92 is preferably a rotating light deflector capable of deflecting visible or UV light. In one exemplary embodiment, rotating energy deflector 92 is a polygonal mirror having one or more facets 94*a, b, c*, etc. defined around its perimeter. In the example of FIG. 3, rotating energy deflector 92 is a hexagonal mirror having facets 94*a* to 94*f*. Each facet 94*a*-94*f* has at least one rotational position, and preferably several, at which it will be in optical communication with solidification energy source 90 to receive light projected therefrom. As the rotating energy deflector 92 rotates, solidification energy (e.g., visible or ultraviolet light) will be deflected along the length of each facet 94*a-f* in succession. At any one time, one of the facets 94*a*-94*f* will receive and deflect solidification energy. As the facet changes its rotational position, the angle of incidence of the solidification energy with respect to the facet will change, altering the angle of deflection, and therefore, the y-axis location at which the deflected solidification energy strikes the solidification substrate 68 and the solidifiable material underneath it. Thus, each rotational position of rotating energy deflector 92 corresponds to a position along the scanning (y) axis at which solidification energy may be projected at a given time. However, for a given number of rotating energy deflector facets F, there will be F rotational positions that each correspond to a particular position along the scanning axis direction. As will be discussed in greater detail below, one or more controllers or microcontrollers may be provided to regulate the activation and deactivation of the build platform 43, solidification energy source 90, rotating energy deflector 92, and motor 76 that drives the linear solidification device 88 across the solidifiable material.

In certain examples, the maximum length of scan in the y-axis direction will correspond to the full length of an individual facet 94*a*-94*f*. That is, as the light progressively impinges on the entire length of any one facet 94*a*-94*f*, the deflected light will correspondingly complete a full scan length in the y-axis direction. The number of facets 94*a*, 94*b*, etc. on the rotating energy deflector 92 will correspond to the number of y-axis scans that are performed for one complete revolution of rotating energy deflector 92. In the case of a hexagonal mirror, six y-axis scans will occur for every complete rotation of rotating energy deflector 92. For rotating energy deflectors that maintain a constant rotational direction (e.g., clockwise or counterclockwise), the scans will be uni-directional along the y-axis. Put differently, as light transitions from one facet 94*a* to another 94*b*, the scan will return to its starting position in the y-axis, as opposed to scanning back in the opposite direction. However, other rotating energy deflector configurations may be used including those in which the rotating energy deflector 92 rotates in two rotational directions to produce a "back and forth" scan in the y-axis direction.

It is useful to use the term "build envelope" to describe the maximum length (in the x-direction) and maximum width (in the y-direction) in which solidification energy may be supplied to the solidifiable material. In the embodiment of FIGS. 3-4, the build envelope area will typically be less than the area of solidification substrate 68 or the area defined by the exposed and upward facing surface of solidifiable material lying underneath it. In the example of FIG. 3, the build envelope will comprise an x-dimension (length) that is less than or equal to the full distance that the solidification energy source 90 and rotating energy deflector 92 can traverse in the x-direction. In some cases, the y-dimension (width) of the build envelope may be somewhat longer than the length of lens 98 and housing opening 100 because light projected from flat field lens 98 and through housing opening 100 may be projected outwardly from housing 96 in the y-axis direction at a non-orthogonal angle of incidence with respect to the exposed surface of the solidifiable material.

FIGS. 16(*b*) and (*c*) depict a top view of a region of solidifiable material which includes a build envelope 342. The build envelope defines the maximum area of solidification, and therefore, the maximum area of the three-dimensional object in the x-y plane. As shown in FIGS. 16(*b*) and 16(*c*), in certain cases the linear solidification device 88 is movable in the x-axis direction along a total distance that equals the sum of a build envelope 342 length distance L and two offset distances, $\delta_L$ and $\delta_R$. The offset distances $\delta_L$ and $\delta_R$ respectively represent the distance from the left end-of-travel (EOT) position of linear solidification device 88 to the left-hand side build envelope boundary 343 and the distance from the right-hand side EOT position to the right-hand side build envelope boundary 345. In certain examples, the offset distances, $\delta_L$ and $\delta_R$ are provided to ensure that the linear solidification device 88 has time to achieve a substantially constant speed in the x-axis direction before any solidification of solidifiable material will begin (i.e., before build envelope 342 is reached). In certain examples, the movement of the linear solidification device 88 at a constant x-axis speed avoids the necessity of directly measuring the x-axis position at any given moment because it allows a motor movement parameter for motor 76 to provide an indirect indication of x-axis position. In one particular example suitable for servo and stepper motors, the motor movement parameter is a number of motor steps. In certain examples, $\delta_L$ and $\delta_R$ are equal.

In certain examples, as rotating energy deflector 92 rotates, solidification energy source 90 will selectively project light in accordance with data that represents the object being built. At a given location in the x-axis direction, some y-axis locations may be solidified and others may not, depending on the shape of the object being built.

One way of selectively projecting light to the solidifiable material is to selectively activate the solidifiable energy source 90 depending on the x-axis location of the linear solidification device and the rotational position of the facet 94*a-f* that is in optical communication with the solidification energy source 90. While each facet 94*a*-94*f* will have a full range of locations along its length at which solidification energy may be received from solidification energy source 90, it will not necessarily be the case that each such facet location will receive solidification energy during any individual scan performed by that facet. Thus, by (directly or indirectly) coordinating the activation of solidification energy source with the rotational position of a given facet 94*a*-94*f*, solidification energy can be selectively provided to only those locations along the y-axis where solidification is desired.

The number of linear scans that can be performed within a given linear distance along the x-axis direction may depend on several variables, including the rotational speed of rotating energy deflector 92, the number of facets F on the rotating energy deflector 92, and the speed of movement of the linear solidification device 88 along the x-axis direction. In general, as the speed of movement of the linear solidification device 88 increases in the x-axis direction, the number of linear scans per unit of x-axis length decreases. However, as the number of facets on the rotating energy deflector 92 increases or as the rotational speed of the rotating energy deflector 92 increases, the number of linear scans per unit of x-axis length increases.

Thus, for a given build envelope distance L in units such as millimeters, the maximum number of line scanning operations that can be performed may be calculated as follows:

$$N_{max}=(L/S)*(RPM/60)*F \qquad (1)$$

where, $N_{max}$=maximum number of line scanning operations in the x-axis direction within the build envelope;
L=desired length of the build envelope in the x-axis direction (mm);
S=speed of movement of solidification energy source in the x-axis direction (mm/sec);
RPM=rotational frequency of rotating energy deflector (revolutions/minute); and
F=number of facets on the rotating energy deflector.

Each linear scan can then be assigned a linear scan index n (which can also be called a string index when sets of data strings are used as object layer data) ranging from a value of 0 to $N_{max}-1$. Equation (1) can also be used to calculate an actual number of line scanning operations needed for a given part length in the x-axis direction. In that case, L would be the desired length of the part in the x-axis direction an $N_{max}$ would be replaced by N, which would represent the total number of line scanning operations used to form the part.

When the linear solidification device is moving at a constant speed S in the x-axis direction, a motor movement parameter such as a number of motor steps for motor 76 may be correlated to the build envelope length L and used to define a variable W which equals a number of motor steps/L. The microcontroller unit can then use the number of motor steps to indirectly determine the number of a linear scan (or string index as described further herein) position of the linear solidification device within the build envelope in accordance with the following equation:

$$\text{scan index } n=((\text{number of steps from boundary})/(W)(S))*(RPM/60)*F \qquad (2)$$

In equation (2), the number of steps from the boundary refers to the number of motor steps counted starting at build envelope boundary 343 and moving from left to right or starting at build envelope boundary 345 and moving from right to left. A particular three-dimensional object layer having a length may be formed by a number of linear scans performed within build envelope 342.

In certain examples, the host computer will assign scan index numbers or string data index numbers by scaling the part to the build envelope size and assigning a scan index number n based on the total number of possible scans $N_{max}$ in the build envelope 342. The scan index numbers n will then be correlated to a number of motor steps as set forth in equation (2). This relationship depends, in part, on the accuracy of the value W which is the ratio of the number of steps required for the linear solidification device 88 to traverse the build envelope length L (FIG. 16(b)) divided by L. As explained below, in some cases, W may deviate from the value predicted by geometry of the mechanical devices used to move the linear solidification device 88 (i.e., the value predicted by the gear ratio for motor 76, the rotational speed of motor 76, and the pulley diameter of pulleys 82a and 82b). In that case, it may be desirable to adjust the value of W. Methods of adjusting the value of W are described further below.

In another example, a flexible flat film mask is provided between linear solidification device 88 and rigid or semi-rigid solidification substrate 68. The flexible flat film mask has a plurality of variably transparent imaging elements defining a matrix. Each imaging element may be selectively made transparent or opaque by supplying energy to it. Examples of such flexible flat film masks include transparent organic light emitting diode (OLED) screens and liquid crystal display (LCD) screens. The matrix is configured in a plurality of rows (1-n) arranged along the length (x-axis) direction of the solidification substrate assembly. Each row defines an x-axis location and has a plurality of elements along the y-axis direction that may be selectively made transparent or opaque to allow energy from solidification energy source 90 to pass therethrough. Thus, at a specific x-axis location, the specific members of a row that are activated to allow energy transmission will dictate which portions of the solidifiable material in the y-axis direction will receive solidification energy while continuing to continuously supply energy from solidification energy source 90 to rotating energy deflector 92.

As indicated previously, the systems for making a three-dimensional object described herein may include a control unit, such as a microcontrol unit or microcontroller, which contains locally stored and executed programs for activating motors 76, 118 and moving build platform 43, as well as for selectively activating solidification energy source 90. In certain examples, the systems include a host computer that processes three-dimensional object data into a format recognized by the microcontroller unit and then transmits the data to the microcontroller for use by the microcontroller unit's locally stored and executed programs. As used herein, the term "microcontroller" refers to a high-performance, programmable computer memory system used for special tasks. In certain examples, the microcontrollers described herein include an integrated circuit chip having a microprocessor, a read only memory (ROM), interfaces for peripheral devices, timers, analog to digital and digital to analog converters, and possibly other functional units.

In certain examples, a linear solidification controller (not shown) selectively activates and deactivates linear solidification device 88, at least in part, based on the position of linear solidification device 88 in the length (x-axis) direction. The position may be directly detected or may be indirectly determined by other variables (e.g., a number of motor steps). In one implementation discussed further below, an end of travel sensor 346 (FIGS. 16(b) and (c)) is used along with a motor movement parameter to indirectly determine the x-axis position.

In one implementation, the linear solidification controller is a microcontroller or solidification energy source controller (not shown) which is operatively connected to solidification energy source 90 to change the energization state of solidification energy source 90 by selectively activating and deactivating it. In additional examples, the controller selectively activates the solidification energy source, at least in part, based on shape information about the three-dimensional object being built. In further examples, the controller selectively activates the solidification energy source based on the position of linear solidification device 88 in the length (x-axis) direction (or based on another variable that correlates to the position such as a number of motor steps for motor 76) and based on shape information about the object being built which varies with the x-axis position. On a given exposed surface of solidifiable material, the specific x, y locations that will receive the solidification energy will be dependent on the y-axis profile of the object being built at the given x-axis location of solidification energy source 90 and rotating energy deflector 92. In further examples, the linear solidification controller selectively activates imaging elements on a flat film mask to electively solidify desired locations on the solidifiable material. In other examples, a laser scanning micromirror selectively deflects solidification energy in a linear patterns to perform a linear scanning operation.

In certain examples, the shape information about the object being built is provided as three-dimensional object shape information which mathematically defines the shape of the object in three-dimensional space. The three-dimensional object data is then sliced or subdivided into object layer data preferably along a dimension that corresponds to a build axis. The build axis refers to an axis along which an object is progressively built and in the examples described herein is typically referred to as the "z-axis." The object layer data may comprise information that mathematically defines the shape of the object in a plane orthogonal to the build axis. Thus, in one example wherein the build axis is referred to as the z-axis, each set of object data layer may comprise x and y coordinates that define the shape of the object cross-section at a given z-axis position. Exemplary methods of providing and using object data to drive the solidification process are described further below.

As mentioned previously, motor 76 is provided to translate housing 96 across the surface of the solidifiable material in the x-axis direction. An exemplary apparatus for providing the translation is depicted in FIGS. 3 and 4. In accordance with the figures, housing 96 is connected via cross-bar 102 to two cam follower assemblies 104a and 104b spaced apart across the width (y-axis direction) of solidification substrate assembly 62. Motor 76 rotates shaft 78, which is connected at its ends 80a and 80b to respective timing belts 86a and 86b. Each timing belt 86a and 86b is connected to a corresponding pulley, 82a and 82b, which is rotatably mounted to a corresponding bracket 83a and 83b mounted on the stationary frame 64 of solidification substrate assembly 62.

Cam follower assemblies 104a and 104b are each connected to a corresponding one of the timing belts 86a and 86b via corresponding belt connectors 114a and 114b. Cam follower assemblies 104a and 104b are also connected to corresponding linear bearings 110a and 110b which slidably engage corresponding linear slides or rails 112a and 112b. Linear slides 112a and 112b are attached to stationary frame 64 and are spaced apart from one another in the width (y-axis) direction of solidification substrate assembly 62. When motor 76 is energized, shaft 78 rotates about its longitudinal axis, causing timing belts 86a and 86b to circulate in an endless loop. The circulation of timing belts 86a and 86b causes cam follower assemblies 104a and 104b to translate in the length (x-axis) direction of solidification substrate assembly 62, which in turn moves linear solidification device housing 96 in the length (x-axis) direction. Thus, the concurrent activation of motor 76, rotating energy deflector 92 and solidification energy source 90, allows for the scanning of solidification energy in the width (y-axis) direction along an exposed surface of the solidifiable material concurrently with the translation of solidification energy source 90 and rotating energy deflector 92 in the length (x-axis) direction.

Figure 5B:
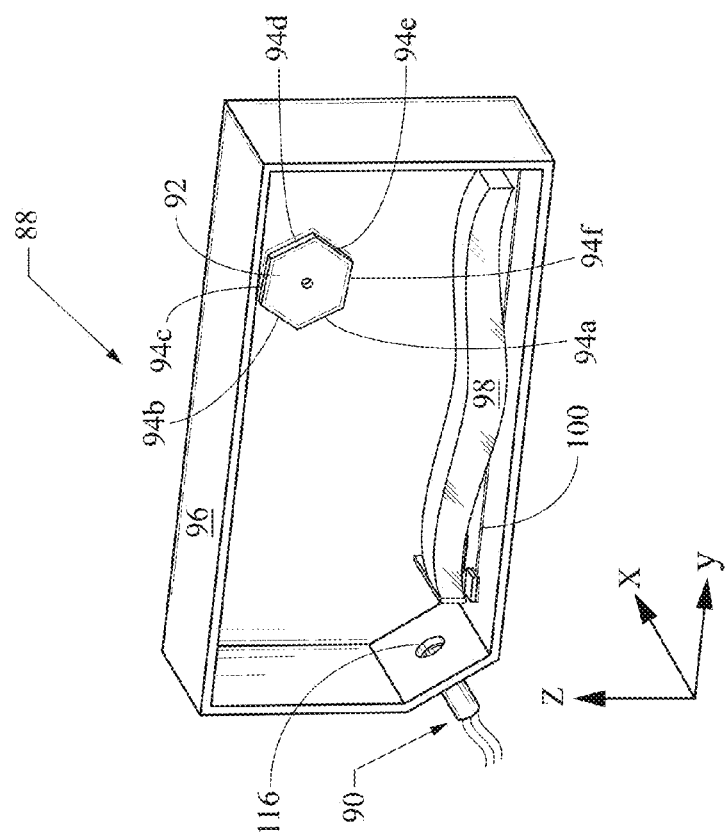
FIG. 5B is a perspective view of the front of the linear solidification device of FIG. 5B.
Figure 5A:
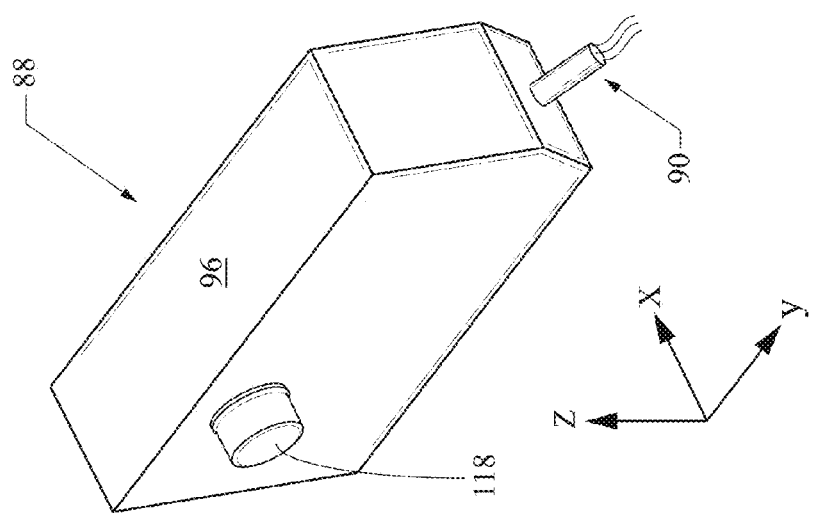
FIG. 5A is a perspective view of the rear of a linear solidification device comprising a solidification energy source and a rotating energy deflector.

A more detailed view of linear solidification device 88 is provided in FIGS. 5A and 5B, which show opposite sides of the device 88. Housing 96 is a generally polygonal structure. As depicted in the figures, housing 96 has an open face, but the face may be closed. Rotating energy deflector 92 is spaced apart from solidification energy source 90 in both the height (z-axis) and width (y-axis) direction, and may be slightly offset from solidification energy source 90 in the length (x-axis) direction as well. Rotating energy deflector 92 is rotatably mounted to housing 96 so as to rotate substantially within a plane that may preferably be oriented substantially perpendicularly to the length (x-axis) direction (i.e., the y-z plane). Solidification energy source port 116 is provided for mounting solidification energy source (e.g., a laser diode) such that it is in optical communication with at least one facet 94a-94f of rotating energy deflector 92 at one time. As indicated previously, lens 98 is spaced apart and below from rotating energy deflector 92 in the height (z-axis) direction and is located above housing light opening 100.

Motor 118 is mounted on a rear surface of housing 96 and is operatively connected to rotating energy deflector 92. Motor 118 is connected to a source of power (not shown). When motor 118 is energized, rotating energy deflector 92 rotates in the y-z plane, bringing the various facets 94a-94f sequentially into optical communication with solidification energy source 90. A control unit (not shown) may also be provided to selectively energize motor 118, solidification energy source 90 and/or motor 76. Either or both of motors 76 and 118 may be stepper or servo motors. In certain examples, either or both of the motors 76 and 118 are driven by continuous energy pulses. In the case of motor 118, in certain preferred embodiments, it is driven by continuous energy pulses such that the timing of each pulse corresponds to a fixed rotational position of a facet 94(a)-(f) of rotating energy deflector 92. As the motor is pulsed, each of the facets 94(a)-(f) will sequentially come into optical communication with solidification energy source 90, and the particular facet that is in optical communication with solidification energy source 90 will have a fixed rotational position that corresponds to the timing of the pulse.

In certain implementations, the rotational position of rotating energy deflector 92 may repeatably correspond to the timing of each motor energy pulse without being known by the operator. The fixed association of the motor energy pulse and the rotational position of the facets 92a-92f allows the motor pulse timing to be used to synchronize the transmission of a synchronization solidification energy signal from solidification energy source 90 so that a synchronization solidification energy signal is issued for each facet 94(a)-(f) at some defined rotational position while it is in optical communication with solidification energy source 90.

In certain implementations, it is desirable to provide a y-axis scanning speed (i.e., a speed at which solidification energy moves along the exposed surface of the solidifiable material) that is significantly greater than the x-axis speed at which the linear solidification device 88 moves. Providing this disparity in y-axis and x-axis speeds helps to better ensure that the scanned energy pattern is linear and orthogonal to the x-axis direction, thereby reducing the likelihood of object distortion. In certain examples, the scanning speed in the y-axis direction is at least about 1000 times, preferably at least about 1500 times, more preferably at least about 2000 times, and still more preferably at least about 2200 times the speed of movement of linear solidification device 88 in the x-axis direction. In one example, linear solidification device 88 moves at a speed of about 1 inch/second in the x-axis direction and the y-axis scanning speed is about 2400 inches/second. Increasing the scanning speed relative to the speed of movement of linear solidification device 88 in the x-axis direction increases the resolution of the scanning process by increasing the number of scan lines per unit of length in the x-axis direction.

The scanning speed (in number of scans per unit time) at which solidification energy is progressively applied to selected areas of a solidifiable resin in the width (y-axis) direction of solidification substrate assembly 62 corresponds to the rotational speed of rotating energy deflector 92 multiplied by the number of facets 94a-f. In certain examples, the rotational speed is from about 1,000 to about 10,000 rpm, preferably from about 2,000 to about 8,000 rpm, and more preferably from about 3,000 to about 5,000 rpm.

Referring to FIG. 5C, and alternate embodiment of linear solidification device 88 of FIGS. 5A and B is depicted. In FIG. 5C, housing 96 is removed. As shown in the figure, solidification energy source 90 is in optical communication with one facet 94(a)-(f) of rotating energy deflector 92 at any one time as rotating energy deflector 92 rotates in the y-z plane (i.e., the plane orthogonal to the direction of movement of linear solidification device 88). In this embodiment, one or more solidification energy focusing devices is provided between solidification energy source 90 and rotating energy deflector 92. In the example of FIG. 5C, the one or more focusing devices comprises a collimator 320 and a cylindrical lens 322.

Collimator 320 is provided between solidification energy source 90 and cylindrical lens 322. Cylindrical lens 322 is provided between collimator 320 and rotating energy deflector 92. Collimator 320 is also a focusing lens and creates a round shaped beam. Cylindrical lens 322 stretches the round-shaped beam into a more linear form to allow the beam to decrease the area of impact against rotating energy deflector 92 and more precisely fit the beam within the dimensions of one particular facet 94(a)-(f). Thus, solidification energy transmitted from solidification energy source 90 passes through collimator 320 first and cylindrical lens 322 second before reaching a particular facet 94(a)-(f) of rotating energy deflector 92.

In certain preferred examples, collimator 320 and/or cylindrical lens 322 transmit at least 90%, preferably at least 92%, and more preferably at least 95% of the incident light having a wavelength ranging from about 380 nm to about 420 nm. In one example, collimator 320 and cylindrical lens 322 transmit at least about 95% of the incident light having a wavelength of about 405 nm. In the same or other examples, solidification energy source 90 comprises a laser diode having a beam divergence of at least about five (5) milliradians, more preferably at least about six (6) milliradians, and sill more preferably at least about 6.5 milliradians. At the same time or in other examples, the beam divergence is no more than about nine (9) milliradians, preferably no more than about eight (8) milliradians, and still more preferably not more than about 7.5 milliradians. In one example, the divergence is about 7 milliradians. Collimator 320 is preferably configured with a focal length sufficient to collimate light having the foregoing beam divergence values. Collimator 320 is preferably configured to receive incident laser light having a "butterfly" shape and convert it into a round beam for transmission to cylindrical lens 322.

In certain examples, collimator 320 has an effective focal length that ranges from about 4.0 mm to about 4.1 mm, preferably from about 4.0 mm to about 4.5 mm, and more preferably from about 4.01 mm to about 4.03 mm. In one example, collimator 320 is a molded glass aspheric collimator lens having an effective focal length of about 4.02 mm. One such collimator 320 is a Geltech™ anti-reflective coated, molded glass aspheric collimator lens supplied as part number 671TME-405 by Thorlabs, Inc. of Newton, N.J. This collimator is formed from ECO-550 glass, has an effective focal length of 4.02 mm, and has a numerical aperture of 0.60.

In certain examples, collimator 320 and/or cylindrical lens 322 are optimized based on the specific wavelength and beam divergence characteristics of solidification energy source 90. In one example, collimator 320 and/or cylindrical lens 322 are formed from a borosilicate glass such as BK-7 optical glass. In certain preferred examples, collimator 320 and/or cylindrical lens 322 are coated with an anti-reflective coating such that the coated collimator 320 and coated cylindrical lens 322 transmit at least 90%, preferably at least 92%, and more preferably at least 95% of the incident light having a wavelength ranging from about 380 nm to about 420 nm. Suitable anti-reflective coatings include magnesium difluoride ($MgF_2$) coatings such as the ARSL0001 MgF2 coating supplied by Siltint Industries of the United Kingdom.

In certain examples of a linear solidification device 88, the solidification energy defines a spot (which may or may not be circular) at the point of impingement on the solidifiable material. The angle of incidence between the solidification energy and the solidifiable material will vary with the rotational position of a given facet 94(a)-(f) relative to the solidification energy source 90. The spot dimensions and shape will also tend to vary with the angle of incidence. In some cases, this variation in spot size and/or spot dimensions can produce uneven solidification patterns and degrade the accuracy of the object building process. Thus, in certain examples, one or more lenses are provided between rotating energy deflector 92 and the solidifiable material to increase the uniformity of the spot size and/or dimensions as the rotational position of rotating energy deflector 92 changes. In certain examples, the one or more lenses is a flat field lens 98 (FIGS. 5A and 5B). In other examples (FIG. 5C), the one or more lenses is an F-Theta lens (328 or 330). In other examples, and as also shown in FIG. 5C, the one or more lenses is a pair of F-Theta lenses 328 and 330. The F-Theta lenses 328 and 330 are spaced apart from one another and from the rotating energy deflector 92 along the z-axis direction (i.e., the axis that is perpendicular to the scanning direction and the direction of movement of the linear solidification device 88). First F-Theta lens 328 is positioned between second F-Theta lens 330 and rotating energy deflector 92. Second F-Theta lens 330 is positioned between first F-Theta lens 328 and the solidifiable material (as well as between first F-Theta lens 328 and light opening 100, not shown in FIGS. 5C-D).

First F-Theta lens 328 includes an incident face 334 and a transmissive face 336. Incident face 334 receives deflected solidification energy from rotating energy deflector 92. Transmissive face 336 transmits solidification energy from first F-Theta lens 328 to second F-Theta lens 330. Similarly, second F-Theta lens 330 includes incident face 338 and transmissive face 340. Incident face 338 receives solidification energy transmitted from transmissive face 336 of first F-Theta lens 338, and transmissive face 340 transmits solidification energy from second F-Theta lens 330 to housing light opening 100 (not shown in FIG. 5C) and to the solidifiable material.

In certain implementations of the linear solidification device of FIG. 5C, first F-Theta lens 328 has a refractive index that is less than that of second F-Theta lens 330. The relative difference in refractive indices helps reduce laser beam scattering losses. At the same time or in other implementations, the radius of curvature of first F-Theta lens transmissive face 336 is less than the radius of curvature of second F-Theta lens transmissive face 340. Suitable pairs of F-Theta lenses are commercially available and include F-Theta lenses supplied by Konica Minolta and HP. In certain embodiments, the F-Theta lenses 328 and 330 are preferably coated with an anti-reflective coating. The anti-reflective coating is used to maximize the amount of selected wavelengths of solidification energy that are transmitted through F-Theta lenses 328 and 330. In one example, the anti-reflective coating allows the coated F-Theta lenses 328 and 330 to transmit greater than 90 percent of the incident solidification energy having a wavelength between about 325 nm and 420 nm, preferably greater than 90 percent of the incident solidification energy having a wavelength between about 380 nm and about 420 nm, more preferably greater than about 92 percent of the incident solidification energy having a wavelength between about 380 nm and about 420 nm, and still more preferably greater than 95 percent of the incident solidification energy having a wavelength between about 380 nm and about 420 nm. In one specific example, the coated F-theta lenses transmit at least about 95% of the incident light having a wavelength of about 405 nm (i.e., blue laser light). In other preferred embodiments, collimator 320, and cylindrical lens 322 are also coated with the same anti-reflective coating. Suitable anti-reflective coatings include magnesium difluoride (MgF2) coatings such as the ARSL001 coating supplied by Siltint Industries of the United Kingdom.

In certain examples, linear solidification device 88 may comprise multiple solidification energy sources. In some implementations, the linear solidification device 88 may include multiple solidification energy sources that provide solidification energy of the same wavelength, and the device 88 may transmit a single beam of solidification energy to the solidifiable material. In other implementations, the device 88 may include solidification energy sources of different wavelengths and selectively transmit solidification energy of only one of the wavelengths to a solidifiable material. This implementation may be particularly useful when a three-dimensional object is built using multiple solidifiable materials each of which solidifies in response to solidification energy of different wavelengths (e.g., because their photoinitiators are activated by different wavelengths of solidification energy).

Figure 5D:
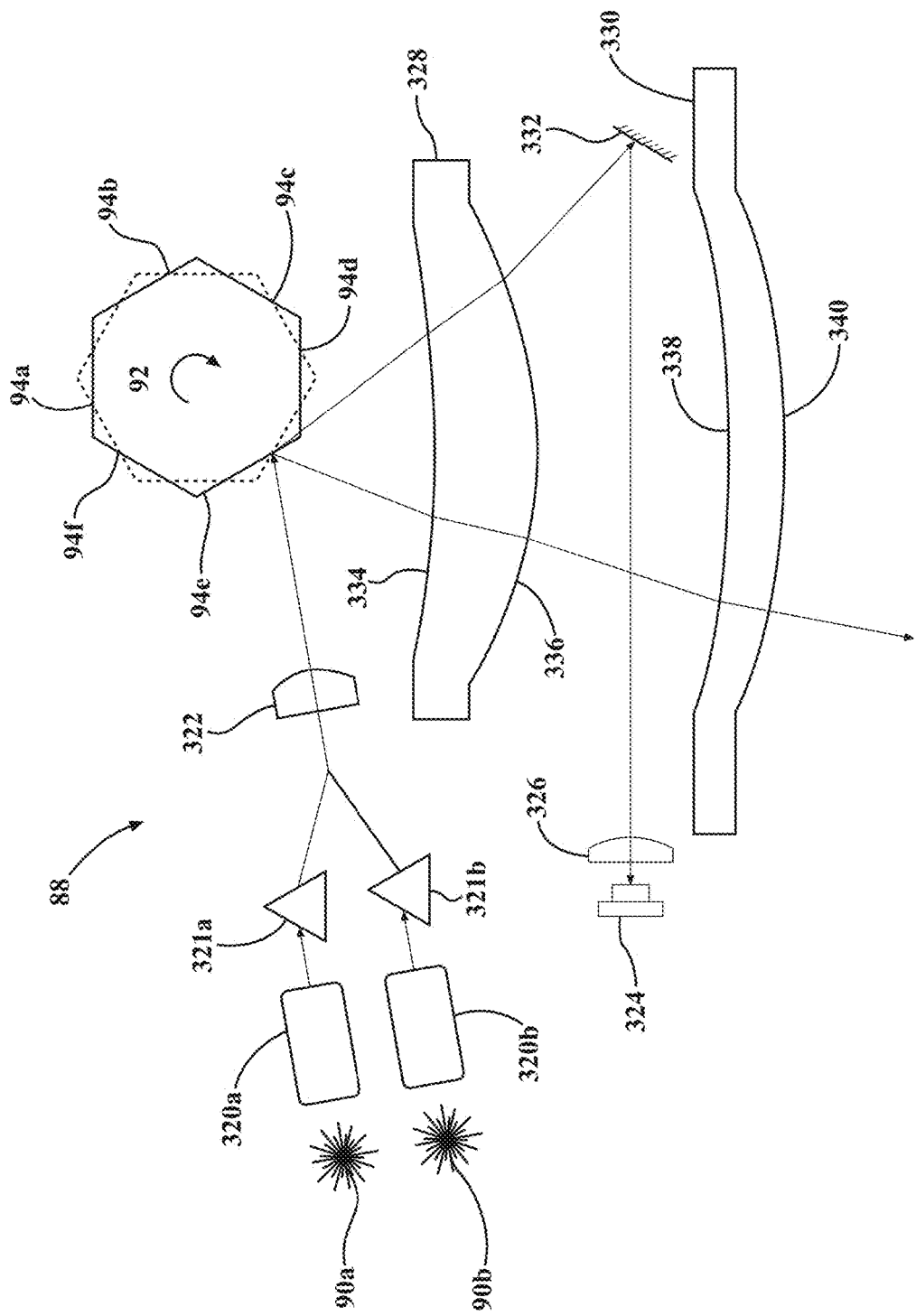
FIG. 5D is a schematic view of a second alternate version of the linear solidification device of FIG. 5A in which the housing is removed and which includes dual solidification energy sources and a solidification energy sensor.

Referring to FIG. 5D, an alternate version of linear solidification device 88 (with the housing removed) is depicted in schematic form. The linear solidification device 88 is the same as the one depicted in FIG. 5C with two exceptions. First, the linear solidification device 88 of FIG. 5D includes two solidification energy sources 90a and 90b. In the specific embodiment of FIG. 5D, solidification energy sources 90a and 90b transmit solidification energy of substantially the same wavelength. In some cases, the use of such multiple solidification energy sources 90a, 90b is desirable in order to increase the power of the solidification energy transmitted to the solidifiable material. The power of the solidification energy can affect the rate of solidification, which in turn may limit the maximum speed of travel of the linear solidification device 88 in the x-axis direction. In order to solidify, for example, a given volume of a solidifiable resin, the volume must receive sufficient solidification energy (e.g., in Joules). The solidification energy received by a given volume of solidifiable material is a function of the power (e.g., in Watts) of the solidification energy and the time of exposure of the volume of solidifiable material. As a result, as the power is reduced, the rate of travel of the solidification energy device 88 must be reduced to ensure that sufficient solidification energy is received at each location along the direction of travel (i.e., x-axis) of solidification energy device 88. Put differently, at a desired solidification depth in the build axis (z-axis) direction, increasing the power of the solidification energy increases the rate at which the linear solidification device 88 can be traversed in the x-axis direction, and hence, the speed of an object build process.

The second difference between the solidification energy devices 88 of FIGS. 5C and 5D is the inclusion of prisms 321a and 321b in FIG. 5D. The solidification energy device 88 of FIG. 5D is intended to combine solidification energy from both sources 90a and 90b into a single beam for delivery to the solidifiable material. The single beam preferably has a power that is at least 1.5 times, preferably at least 1.7 times, and more preferably at least 1.95 times the average power of the individual solidification energy sources 90a and 90b. Each solidification energy source 90a and 90b transmits its respective solidification energy to a respective prism 321a and 32 lb. The prisms 321a and 321b receive incident solidification energy at a first angle and deflect the energy to produce transmitted solidification energy beams at a second (different) angle that allows the individual beams to be combined in a single beam. It is believed that the individual beams combine ahead of cylindrical lens 322, after which the solidification energy is received by rotating energy deflector 92 and ultimately transmitted to the solidifiable material in the same manner described previously with respect to FIG. 5C.

As mentioned previously, the linear solidification device 88 of FIGS. 5C and 5D also includes a solidification energy sensor 324, which may be an optical sensor. Suitable optical sensors include photodiodes. One exemplary photodiode that may be used is a 404 nm, 500 mW photodiode supplied by Opnext under the part number HL40023MG.

Solidification energy sensor 324 generates a signal upon receipt of solidification energy. Mirror 332 is provided and is in optical communication with rotating energy deflector 92 such that when each facet of rotating energy deflector 92 receives solidification energy from solidification energy source 90 while at a particular rotational position (or range of positions) in the y-z plane, the energy will be deflected toward mirror 332 (as shown by the dashed lines). Similarly, when the scanning device used in linear solidification device 88 is a linear scanning micromirror, a particular tilt angle or range of tilt angles will cause received solidification energy to be deflected toward mirror 332. The solidification energy then reflects off of mirror 332 along a path that is substantially parallel to the scanning axis (y-axis) between first F-Theta lens 328 and second F-Theta lens 330 to sensor 324. Sensor 324 may be operatively connected to a computer to which it will transmit the signal generated upon receipt of solidification energy. The signal may be stored as data and/or used in programs associated with a solidification energy source controller (not shown). An example of a line scanning synchronization method that makes use of the generated sensor signal is described below.

In certain examples, sensor 324 is used to determine the beginning of a line scanning operation along the scanning axis (y-axis) direction. However, in certain cases using the solidification energy sources described herein, the intensity of the solidification energy transmitted by solidification energy source 90 may be higher than desired, thereby reducing the sensitivity of sensor 324 due, at least in part, to the presence of scattered and ambient light. As a result, in some implementations a filter 326 is provided between sensor 324 and mirror 332 along the path of travel of solidification energy from mirror 332 to sensor 324. Filter 326 preferably reduces the intensity of electromagnetic radiation received by sensor 324 without appreciably altering its wavelength(s). Thus, in one example filter 326 is a neutral density filter. One such suitable neutral density filter is a 16× neutral density filter supplied by Samy's Camera of Los Angeles, Calif. under the part number HDVND58. In certain implementations, sensor 324 is used to synchronize a timer that serves as a reference for linear scanning operations. In such cases, the exposure of sensor 324 to scattered or ambient light may cause synchronization errors. Thus, filter 326 is preferably configured to ensure that only direct solidification energy from solidification energy source 90 is received by sensor 324.

Referring again to FIG. 16(b), in certain implementations, linear solidification device 88 is positioned within the build envelope 342 such that the mirror 332 is located immediately proximate scanning-axis build envelope boundary 344. In such implementations, the receipt of solidification energy by sensor 324 (FIG. 5C) indicates that a line scanning operation may begin immediately thereafter because if the solidification energy source 90 remains activated and if rotating energy deflector 92 continues to rotate, solidification energy will be transmitted to the solidifiable material at the scanning axis build envelope boundary 344 immediately after it is transmitted to mirror 332. Therefore, sensor 324 can be used to indicate the beginning of a line scanning operation for each facet 94(a)-94(f). As mentioned previously, when solidification energy source 90 remains activated while rotating energy deflector 92 completes a single revolution, a number of linear scanning operations will be completed in the scanning axis direction which equals the number of the rotating energy deflector's 92 facets 94(a)-(f).

In those cases where sensor 324 is used to indicate the beginning of a line scanning operation, it is useful to briefly activate solidification energy source 90 at a specific moment at which the transmitted solidification energy will be received by mirror 332. The brief activation of solidification energy source may be coordinated or synchronized with an actuating signal sent to the scanning device used in linear solidification device 88. For example and as mentioned previously, in certain cases motor 118 is energized by a constant frequency pulse, the timing of which corresponds to a fixed rotational position for the particular facet 94(a)-(f) that is in optical communication with solidification energy source 90. Therefore, through a process of trial and error a lag time may be determined between the leading or trailing edge of the motor pulses and the receipt of solidification energy by sensor 324. More specifically, the source of solidification energy 90 can be selectively activated at a number of times relative to the leading or trailing edge of the pulse to determine which lag time results in the generation of a solidification energy sensor signal by sensor 324. In one preferred embodiment, the solidification energy source 90 is activated at or within a specified time following the trailing edge of the energy pulse used to drive motor 118.

In certain examples, it is preferable to dynamically adjust or calibrate the timing of the synchronization energy pulses. In accordance with such examples, the synchronizing energy pulses are activated at a dynamically calibrated time relative to an internal microprocessor clock (i.e., in the microcontroller) without linking the synchronizing energy pulses to the actuation pulses sent to motor 118 to rotate rotating energy deflector 92. One implementation of the dynamic calibration of the synchronization energy pulse timing is as follows: When rotating energy deflector motor 118 is first activated during a part building process, one or more trial synchronization pulses are performed by a program resident in the microcontroller that activates solidification energy source 90 at one or more trial times with respect to the microprocessor clock. The initial trial time will be selected based on a lag time relative to the actuating pulses sent to motor 118 which is believed to cause the transmitted solidification energy to strike the sensor 324. The trial times are progressively adjusted until the dynamic calibration of the synchronization energy pulses is complete. The program resident in the microcontroller compares the time that the microcontroller sends an output signal to activate the solidification energy source 90 to the time that sensor 324 indicates that solidification energy has been received. The program adjusts the timing of the output signal (relative to the CPU clock) sent to solidification energy source 90 to the earliest possible time that results in the transmission of a signal from synchronization sensor 324, as this time indicates that the solidification energy has been transmitted as close as possible to the time at which the solidification energy contacts the sensor 324. The ultimate timing of the synchronization energy pulses determined by this adjustment process is then saved and used in subsequent synchronization operations. As indicated previously, the timing of the pulses is defined relative to the cycles of a CPU clock in the microprocessor to ensure that they are repeatable. In certain cases, the use of this dynamic adjustment process to arrive at the synchronization energy pulse timing is more accurate than timing the synchronization energy pulses based on a fixed time relative to the motor 118 pulses, including because in certain cases the relationship between the motor 118 pulses and the rotational position of rotating energy deflector 92 may fluctuate or vary despite the fact that the rotating energy deflector 92 rotates at a substantially constant frequency.

Figure 24:
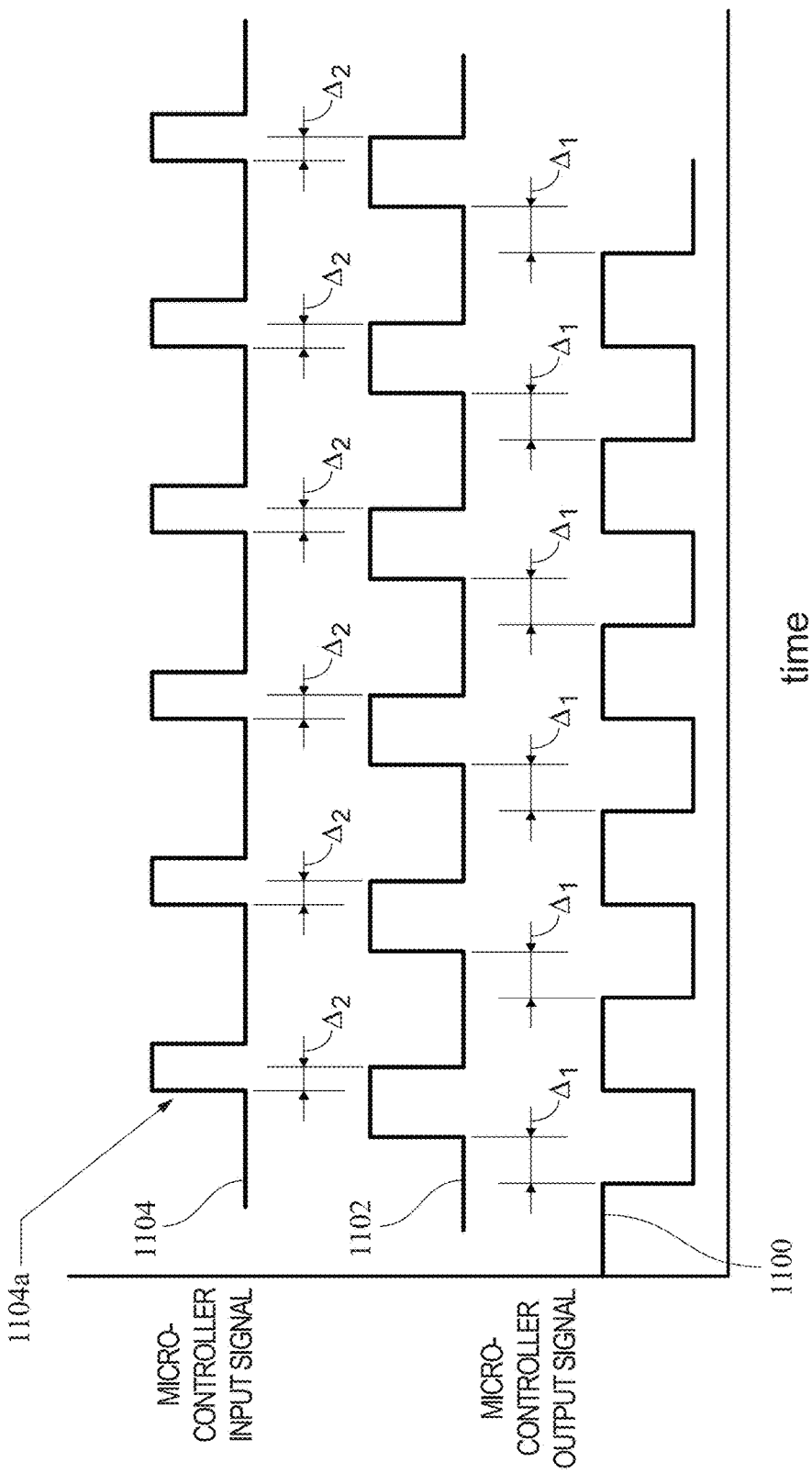
FIG. 24 is a graph depicting microcontroller output signals to a solidification energy source and a motor used to drive a rotating energy deflector and microcontroller input signals received from a solidification energy synchronizations sensor.

The activation of the solidification energy source 90 relative to the pulses sent to motor 118 in accordance with one example is depicted in FIG. 24. Waveform 1100 represents the microcontroller output signal sent to the motor 118 to rotate mirror 92. Waveform 1102 represents the microcontroller output signal sent to the solidification energy source 90 to toggle the energization state solidification energy source. The rising edges of each cycle indicate that the solidification energy source is activated. The falling edges indicate that it is deactivated. The time differential between each falling edge of the motor pulse waveform 1100 and rising edge of the solidification energy source activation signal waveform 1102 is represented as $\Delta_1$. In preferred embodiments, $\Delta_1$ is maintained at a substantially consistent value from pulse-to-pulse of motor 118 to better ensure that the relationship between the rotational position of each facet 94a-f (FIG. 5B) and the activation of a synchronizing pulse of solidification energy from solidification energy source 90 is substantially constant. However, in other examples, $\Delta_1$ is an initial trial time that is only used as a starting point for dynamically calibrating the timing of synchronization energy pulses sent by source 90 relative to a microcontroller CPU clock. In such examples, once the dynamically calibrated time is determined, it is used for subsequent synchronization energy pulses at which point the system no longer uses the timing of the motor 118 actuation pulses to determine when to send the synchronizing solidification energy pulses.

In certain cases, the sensor 324 may be unnecessary because a specified lag time relative to the energization pulses that drive motor 118 will reliably indicate when a line scanning operation is about to begin (assuming solidification energy source 90 remains activated). However, in some examples, the pulses cannot be used to reliably indicate when a line scanning operation is about to begin within the desired degree of precision. For example, the facets 94(a) to 94(f) of rotating energy deflector 92 may not be perfectly or consistently planar. In that case, the scanning (y) axis position of solidification energy may not correlate well with the rotational position of rotating energy deflector 92 or the pulse waveform 1100 (FIG. 24) of rotary motor 118. In addition, heat generated by solidification energy source 90 can cause slight variations in the path of the solidification energy toward the solidifiable material and the angle of incidence at which it strikes the solidifiable material. Thus, sensor 324 assists in better determining the time at which a line scanning operation may begin (or is about to begin if the solidification energy source 90 remains activated). This is particularly helpful when object data is stored as time values because the time values can be reliably correlated to specific positions along the scanning axis direction relative to the scanning axis boundary 344 of build envelope 342 (FIG. 16(b)). In certain examples, a timer is set to zero when sensor 324 generates a synchronization signal, and the object data is specified as time values at which the energization state of solidification energy source 90 is changed relative to the zero time value.

Referring again to FIG. 24, in certain examples, the timer is set to zero (initialized) when sensor 324 first indicates that it has received solidification energy. Waveform 1104 represents signals generated by sensor 324 and transmitted to the microcontroller. In certain examples, the timer is initialized to zero on the rising edge of the sensor signal received by the microcontroller. For the first sensor signal pulse in FIG. 24, the rising edge is identified as 1104a. Filter 326 (FIG. 3) is intended to remove ambient light or other sources of light other than solidification energy reflected from rotating energy deflector 92. Otherwise, the microcontroller may prematurely initialize the CPU, causing the microcontroller to prematurely begin applying solidification energy to solidify the solidifiable material. In certain examples, filter 326 is selected and/or adjusted to ensure that the sensor 324 generates an output signal for a period of time that is no longer than the time required for light reflected from rotating energy deflector 92 to traverse the sensing length of sensor 324 when the rotating energy deflector 92 is rotating at its operating rotational frequency. For example, if sensing length of sensor 324 is 2 mm, the build envelope distance in the scanning (y) axis direction is nine (9) inches (228.6 mm), and the rotational frequency and number of facets of rotating energy deflector 92 yields a scan rate of 2000 lines/second, the time required for solidification energy to traverse the sensor's sensing length will be 2 mm/((2000 lines/second) (228.6 mm)) or 4.4 microseconds. Thus, prior to performing an object building process, the sensor 324 may be exposed to solidification energy from solidification energy source 90 and rotating energy deflector 92. The output signals generated by sensor 324 may be observed on an oscilloscope to determine of the time required for solidification energy to traverse the sensor 324 is 4.4 microseconds. If it is not, the filter 326 may be adjusted or replaced until the correct sensing time is observed.

As indicated previously, in certain examples solidifiable material such as a photohardenable resin is provided under substantially rigid or semi-rigid substrate 68 to receive solidification energy transmitted through substrate 68. Solidification substrate 68 is generally rigid or semi-rigid and substantially permeable to the energy supplied by linear solidification device 88. In certain examples, it is preferred that the energy from linear solidification device 88 pass through solidification substrate 68 without a significant diminution in transmitted energy or a significant alteration of the energy spectrum transmitted to the solidification material relative to the spectrum that is incident to the upper surface of solidification substrate 68. In the case where the energy from solidification energy source 90 is light (including non-visible light such as UV light), solidification substrate 68 is preferably substantially transparent and/or translucent to the wavelength(s) of light supplied by solidification energy source 90.

One example of a rigid or semi-rigid solidification substrate 68 is a translucent float glass. Another example is a translucent plastic. A variety of different float glasses and plastics may be used. Exemplary plastics that may be used include transparent acrylic plastics supplied by Evonik under the name Acrylite®. The term "translucent" is meant to indicate that substrate 68 is capable of transmitting the light wavelengths (including non-visible light such as UV light) necessary to solidify the solidifiable material and that the intensity of such wavelengths is not significantly altered as the light passes through substrate 68. In the case of photopolymers, a photoinitiator is commonly provided to start the polymerization/cross-linking process. Photoinitiators will have an absorption spectrum based on their concentration in the photopolymer. That spectrum corresponds to the wavelengths that must pass through solidification substrate 68 and which must be absorbed by the photoinitiator to initiate solidification. In one example wherein solidification energy source 90 is a blue laser light diode, Irgacure 819 and Irgacure 714 photoinitiators may preferably be used.

As solidification energy is supplied to it, the exposed surface of the solidifiable material will solidify in accordance with a generally—and preferably substantially—linear pattern in the width (y-axis) direction, creating a thin linear region of material that adheres to solidification substrate 68. As indicated previously, the downward movement of the build platform 43 (FIGS. 1 and 2) can cause the object to break or distort if it remains adhered to solidification substrate 68. In certain examples, the surface of rigid or semi-rigid solidification substrate 68 which contacts the solidifiable material is coated with a material used to reduce the adhesion of solidified material to substrate 68. Suitable adhesion reducing agents include Teflon® coatings. Non-stick coatings such as nanocoatings may also be used.

To minimize the likelihood of part distortion due to adhered solidified material, in certain examples the solidified material is periodically peeled from solidification substrate assembly 62. In accordance with such examples, when the solidification energy source (which may be embodied as any linear solidification device, such as an LED array 308 (FIG. 17) or linear solidification device 88 (FIGS. 3-5C)) moves in the x-axis direction, it is selectively activated to solidify a substantially linear section of the solidifiable material extending along the scanning (y) axis direction. In addition, as solidification energy source 90 moves in the x-axis direction, the solidification substrate assembly 62 is peeled from a solidified section of solidifiable material. The peeled solidified section of solidifiable material includes the substantially linear section of the solidifiable material that is solidified by the solidification energy source. In certain examples, the solidified material is peeled from solidification substrate 68. In other cases, the solidified material is peeled from a film located between the solidification substrate 68 and the solidifiable material.

In certain examples, this peeling operation comprises rocking the rigid or semi-rigid solidification substrate 68 with respect to the partially-built three-dimensional object.

Figure 6:
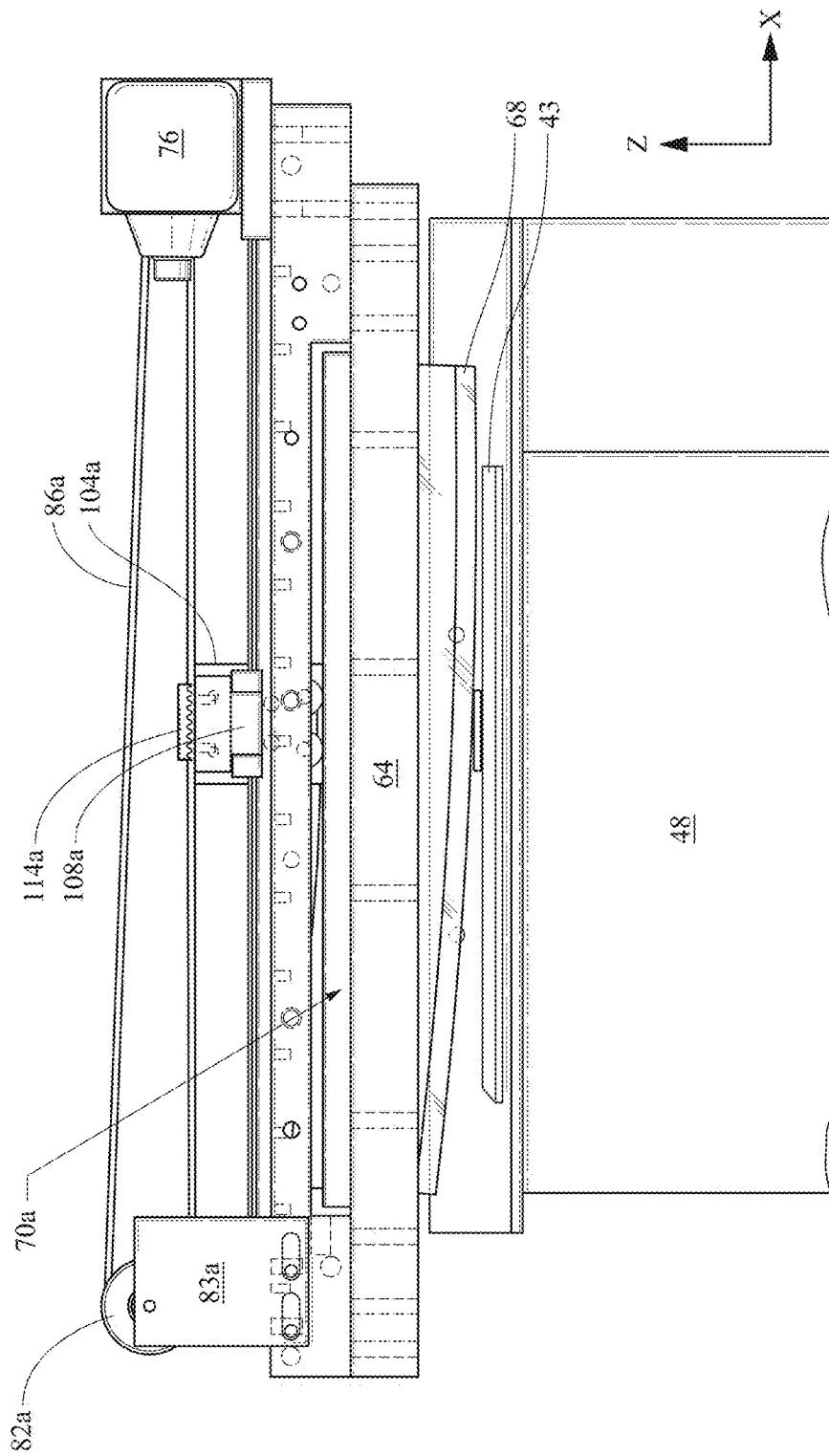
FIG. 6 is a side elevational view of a system for making a three-dimensional object from a solidifiable material, which comprises the solidification substrate assembly and linear solidification device of FIGS. 3 and 4.

In the embodiment of FIGS. 3-4 solidification substrate 68 is curved along its length (i.e., when viewing it along the y-axis direction, the solidification substrate 68 has a slight curvature in the x-axis direction). In certain examples, the length of solidification substrate 68 is substantially parallel to the direction of travel of linear solidification device 88. One exemplary curved profile of solidification substrate 68 is depicted in FIG. 6, which depicts solidification substrate assembly 62 in a rocked position. In the embodiment of FIGS. 3-4, solidification substrate 68 is disposed in a rocking frame 66. Rocking frame 66 includes first and second rocking frame sides 70a and 70b which are spaced apart along the width (y-axis) direction of solidification substrate assembly 62. First and second rocking frame sides 70a and 70b each have stationary frame engagement surfaces 72a and 72b which are preferably also curved along their lengths (x-axis direction).

As shown in FIGS. 3 and 4, stationary frame 64 includes first and second rocking frame engagement surfaces 74a and 74b which engage stationary frame engagement surfaces 72a and 72b of rocking frame 66. In one exemplary embodiment, the radius of curvature of solidification substrate 68 and the radius of curvature of each stationary frame engagement surface 72a and 72b are substantially the same. In another example, the upward facing surfaces of first and second rocking frame sides 70a and 70b are curved and may have a radius of curvature substantially the same as that of rigid or semi-rigid solidification substrate 68. The engagement of stationary frame engagement surfaces 72a/72b with corresponding rocking frame engagement surfaces 74a and 74b allows rocking frame 66 to rock with respect to stationary frame 64 as cam followers 106a and 106b traverse the length of first and second rocking frame sides 70a and 70b.

As mentioned previously, cam follower assemblies 104a and 104b convert the motion of timing belts 86a and 86b into the linear motion of linear solidification device 88 in the length (x-axis) direction of solidification substrate assembly 62. Referring to FIGS. 3 and 4, cam follower assemblies 104a and 104b include cam followers 106a and 106b, each of which are depicted as a pair of rollers. Cam followers 106a and 106b engage upper surfaces of rocking frame sides 70a and 70b as linear solidification device 88 translates in the x-axis direction. The engagement of cam followers 106a and 106b with the upper surfaces of rocking frame sides 70a and 70b applies a downward force to sides 70a and 70b, causing them to rock. This in turn causes solidification substrate 68 to rock, which peels it from solidified material adhered to it, as best seen in FIG. 6 (which also depicts solidifiable material container 48 that is not shown in FIGS. 3-4). It should be noted that in three-dimensional object manufacturing systems that use pattern generators which simultaneously project solidification energy in both build envelope directions (x and y), it is generally undesirable to have any curvature in a solidification substrate, as such curvature can result in image distortion. However, in certain of the linear solidification processes described herein, such image distortion is minimized or eliminated because solidification energy is incident along a substantially flat linear path of small thickness. For example, as solidification substrate 68 is traversed in the width (y-axis) direction at a particular location along its length (x-axis), it is substantially flat.

Referring to FIGS. 7-13, an alternate embodiment of an apparatus for making a three-dimensional linear solidification device is depicted. Like numerals refer to like parts in the previous embodiment. The apparatus includes a solidification substrate assembly 62 and a linear solidification device 88. The linear solidification device 88 is a linear scanning device that includes the same components and operates in the same manner as described previously with respect to FIGS. 3-6. However, solidification substrate assembly 62 is configured differently. In this embodiment, solidification substrate 68 is provided as part of a moving substrate assembly 212 that moves across the solidifiable material in the length (x-axis) direction of solidification substrate assembly 62 as linear solidification device 88 moves in the same direction. In contrast, solidification substrate 68 remains stationary in the embodiment of FIGS. 3-6. In addition, the embodiment of FIGS. 7-13 includes a film assembly 205. Film assembly 205 remains stationary as solidification substrate 68 moves. Film assembly 205 includes a film 224 (not visible in FIGS. 7 and 8) which is positioned beneath solidification substrate 68 in the height (z-axis) direction. The solidifiable material is located beneath film 224 and solidifies in contact with it, instead of solidifying directly in contact with solidification substrate 68, as in FIGS. 3-6.

As with the embodiment of FIGS. 1-6, in the embodiment of FIGS. 7-13 a flexible film mask with a matrix of variably transparent imaging elements (e.g., LCD or transparent OLED) that can be selectively made transparent or opaque can be provided in lieu of a linear scanning device, thereby allowing solidification energy to be selectively provided to the solidifiable material in the y-axis direction while continually supplying solidification energy from solidification energy source 90 to rotating energy deflector 92. In one example, the flexible film is provided on top of rigid or semi-rigid solidification substrate 68 and moves with it as substrate 68 moves along the length (x-axis) direction of solidification substrate assembly 62.

Figure 9A:
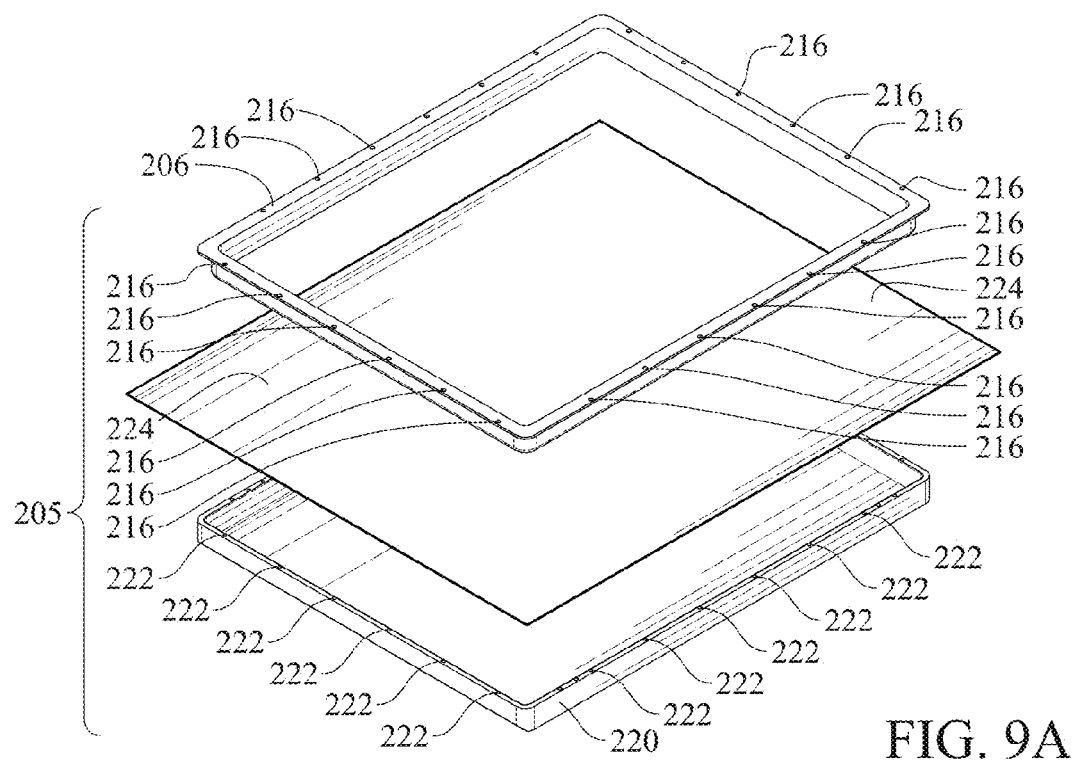
FIG. 9A is an exploded perspective view of a film assembly used in the solidification substrate assembly of FIG. 7.
Figure 9B:
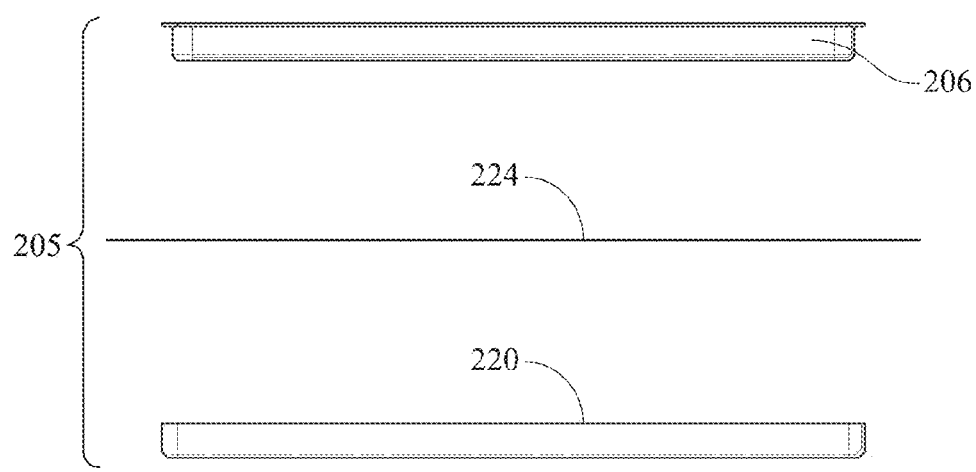
FIG. 9B is a side elevational view of the film assembly of FIG. 9A.
Figure 9C:
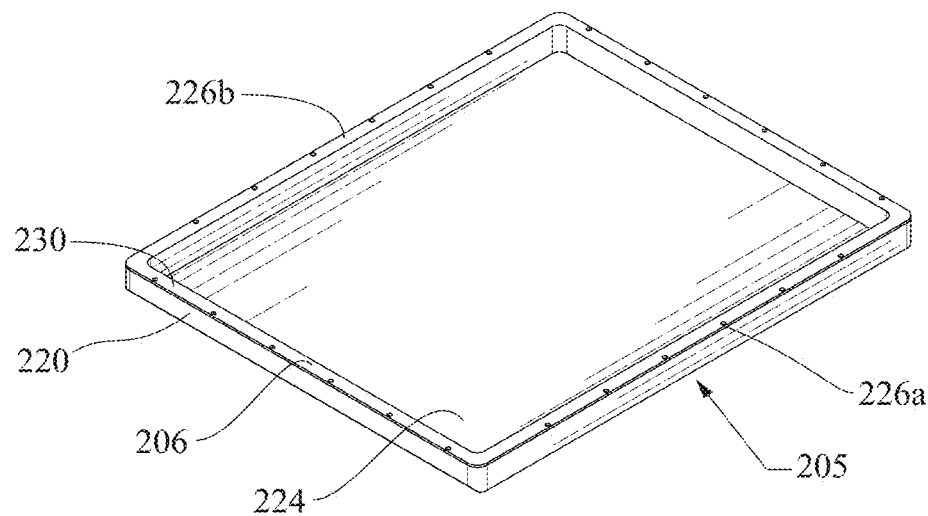
FIG. 9C is a perspective view of the film assembly of FIG. 9A in an assembled configuration.
Figure 10:
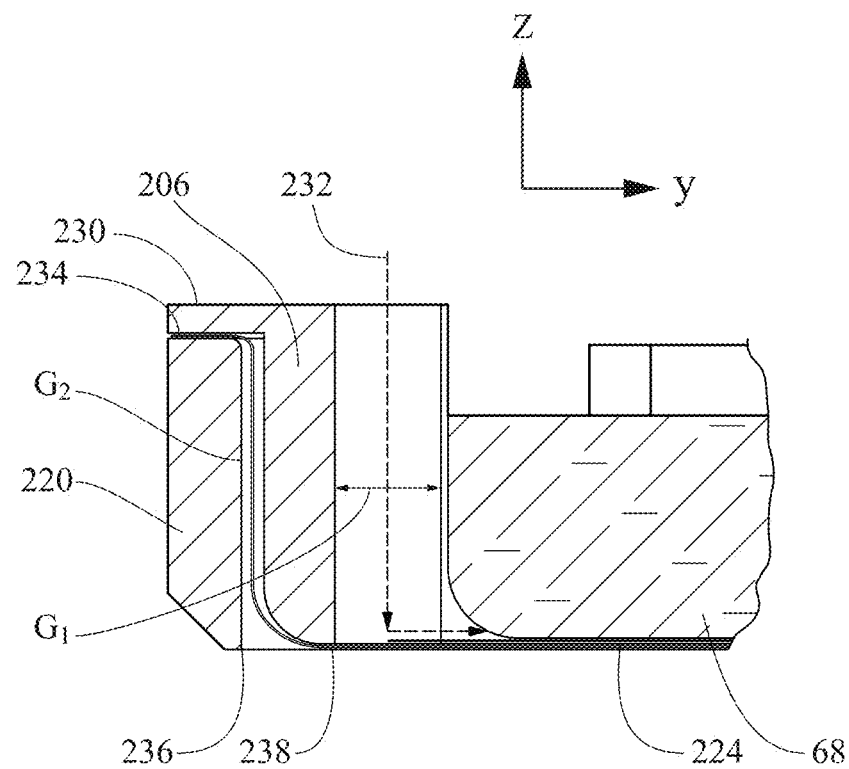
FIG. 10 is a close-up cross-sectional view of the film assembly of FIG. 7 taken along line 10-10 of FIG. 7 with the solidification substrate bracket removed.

As best seen in FIGS. 9A-C, film assembly 205 comprises one or more frames, which in the embodiment of FIGS. 9A-9C includes an inner frame 206 and an outer frame 220. As shown in FIG. 10 (in which bracket 238b is removed), film 224 has a central portion (FIG. 9C) that is disposed in the interior of inner frame 206. Film 224 also has an inner peripheral portion disposed between the lower edge 238 of inner frame 206 and the lower edge 236 of outer frame 220. An outer peripheral portion of film 224 is sandwiched between an outwardly projecting lip 230 formed on inner frame 206 and an upper surface 234 formed on outer frame 220. Film 224 is preferably stretched tautly and its central portion is positioned underneath rigid or semi-rigid solidification substrate 68. When in use during an object building operation, rigid or semi-rigid solidification substrate 68 applies a downward force on film 224 as substrate 68 moves in the length (x-axis) direction, helping to planarize the exposed surface of the solidifiable material.

Film 224 is preferably a homopolymer or copolymer formed from ethylenically unsaturated, halogenated monomers. Fluoropolymers are preferred. Examples of suitable materials for protective film 224 include polyvinylidene fluoride (PVDF), ethylenchlorotrifluoroethylene (ECTFE), ethylenetetrafluoroethylene (ETFE), polytetrafluoroethylene (PTFE), perfluoroalkoxy (PFA), and modified fluoroalkoxy (a copolymer of tetrafluoroethylene and perfluoromethylvinylether, also known as MFA). Examples of suitable film 224 materials include PVDF films sold under the Kynar® name by Arkema, ECTFE films sold under the Halar® name by SolvaySolexis, ETFE films sold under the Tefzel® name by DuPont, PFA films sold under the Teflon®-PFA name by DuPont, and MFA films sold under the name Nowofol. MFA and Teflon® films are preferred.

As best seen in FIG. 7, motor 76 is again provided and is operatively connected to linear solidification device 88. However, motor 76 is also operatively connected to solidification substrate 68 such that when motor 76 is energized, shaft 78 rotates causing linear solidification device 88 and solidification substrate 68 to translate in the length (x-axis) direction.

Figure 7:
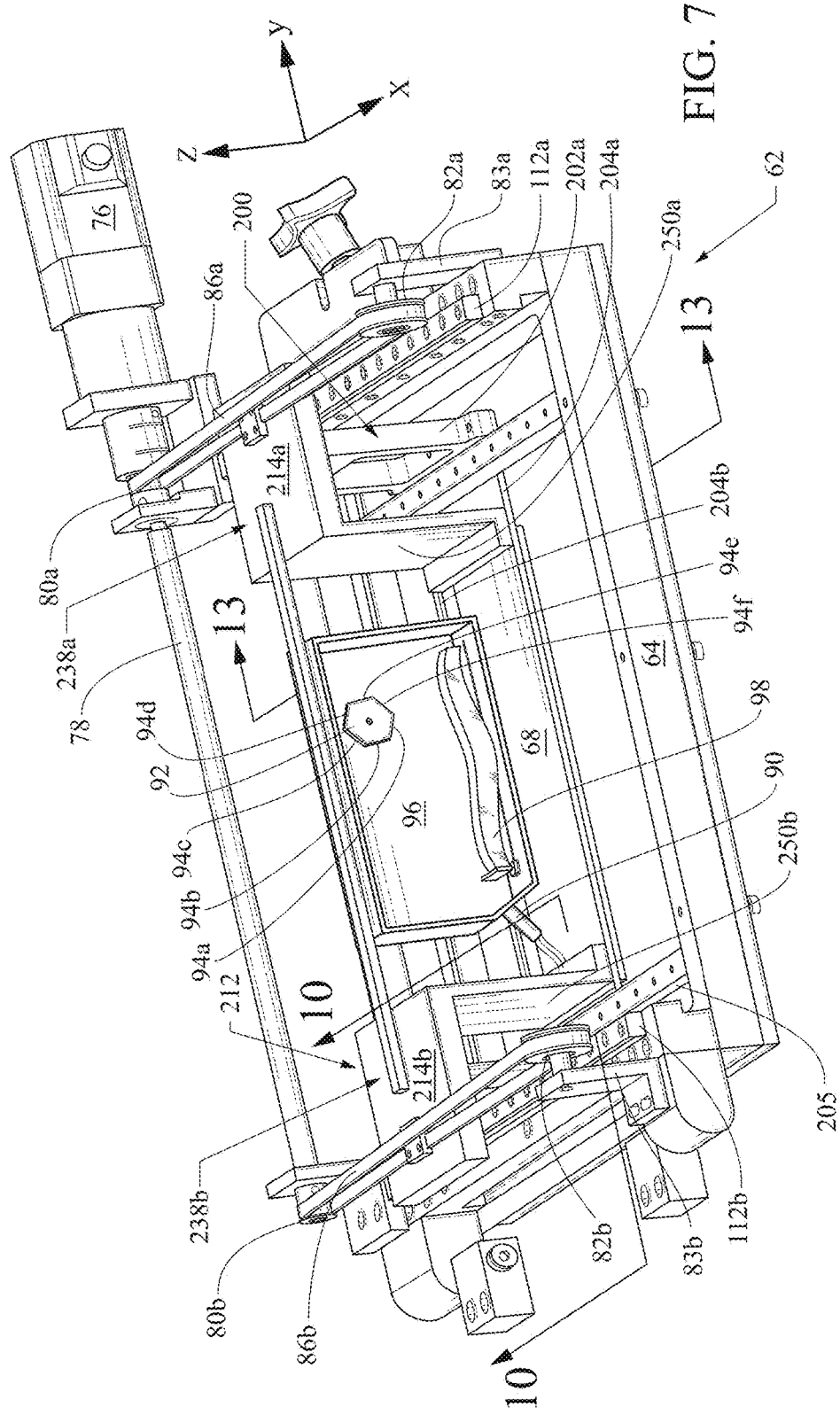
FIG. 7 is an alternative embodiment of a solidification substrate assembly and linear solidification device for use in a system for making a three-dimensional object from a solidifiable material.
Figure 8:
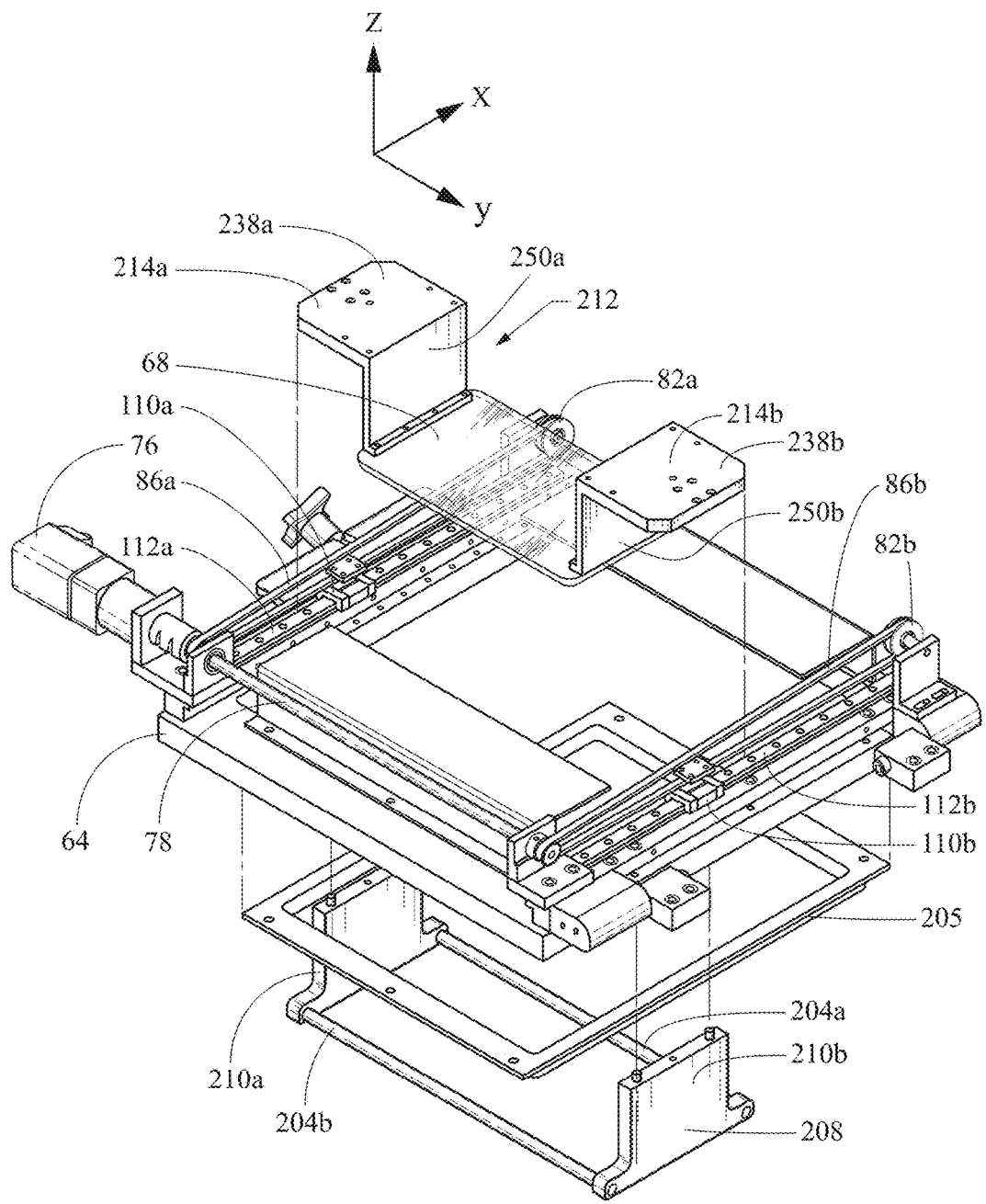
FIG. 8 is an exploded assembly view of the embodiment of FIG. 7.
Figure 11:
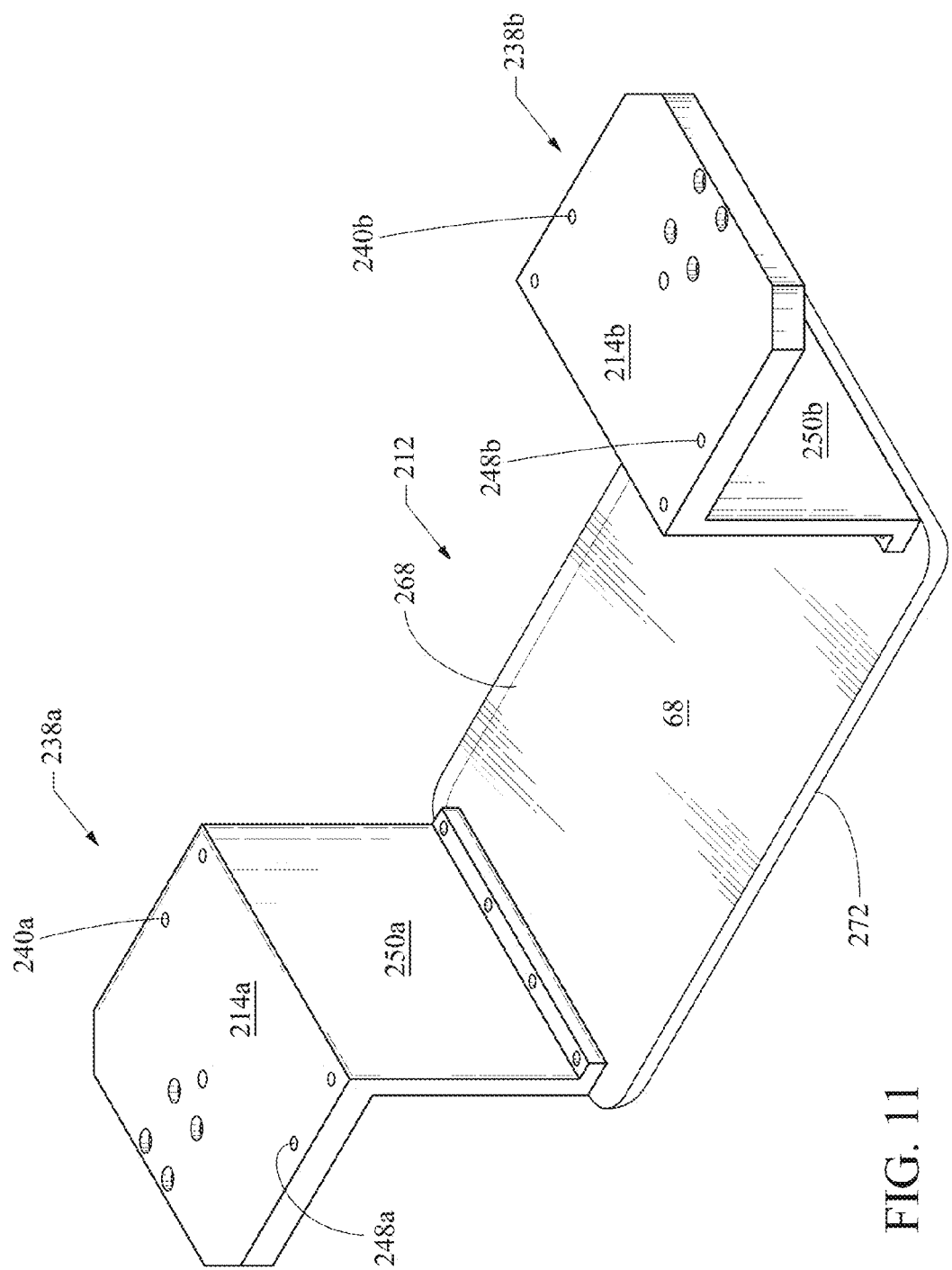
FIG. 11 is a perspective view of a movable substrate assembly used in the solidification substrate assembly of FIG. 7.

FIG. 11 is a perspective view of moving substrate assembly 212. As shown in FIGS. 7, 8 and 11, a pair of brackets 238a and 238b connects rigid or semi-rigid solidification substrate 68 to timing belts 86a and 86b. Brackets 238a and 238b are spaced apart from one another across the width (y-axis) or scanning axis direction of solidification substrate 68. Each bracket 238a and 238b includes a respective vertical panel, 250a and 250b, and a respective horizontal panel 214a and 214b (FIG. 11). Vertical panels 250a and 250b are each connected to a respective end of rigid or semi-rigid solidification substrate 68 and to a respective horizontal panel 214a and 214b. Vertical panels 250a and 250b may be separately formed and then connected to their respective horizontal panels 214a and 214b or may be formed integrally therewith. Rigid or semi-rigid solidification substrate 68 is preferably constructed of glass or hard plastic. In one example, substrate 68 is constructed of a rigid or semi-rigid transparent acrylic polymer. Rigid or semi-rigid solidification substrate 68 includes a first upper surface 268 that faces linear solidification device 88 and a second lower surface 272 that faces film 224 and the solidifiable material.

Timing belts 86a and 86b are used to move rigid or semi-rigid solidification substrate 68 from a first position to a second position in the length (x-axis) direction with respect to stationary frame 64, film assembly 205, and the build envelope (total exposable area) of the solidifiable material lying underneath film assembly 205. Timing belts 86a and 86b are connected to respective pulleys 82a and 82b at one end and to respective ends 80a and 80b of motor drive shaft 78 at another end (FIG. 7).

As best seen in FIGS. 7 and 8, moving substrate assembly brackets 238a and 238b are connected to their respective timing belts 86a and 86b on an upper surface of horizontal panels 214a and 214b and to respective linear bearings 110a and 110b (shown in FIG. 8) on a lower surface of horizontal panels 214a and 214b. Linear bearings 110a and 110b slidingly engage corresponding linear rails 112a and 112b to facilitate the sliding movement of rigid or semi-rigid solidification substrate 68 along the length (x-axis direction) of solidification substrate assembly 62. Thus, as motor 76 operates, each bracket 238a and 238b slides along its respective linear rail 112a and 112b causing rigid or semi-rigid solidification substrate 68 to move along the length L (x-axis direction) of solidification substrate assembly 62.

As best seen in FIGS. 9A-C, in one example, outer frame 220 of film assembly 205 is a generally rigid and rectangular structure shaped to cooperatively engage inner frame 206. Inner frame 206 is a generally rigid and rectangular structure which includes an upper lip 230 (FIGS. 10 and 13) that projects outwardly around the perimeter of inner frame 206. Outer frame 220 fits underneath upper lip 230. In certain examples, the outer edge of lip 230 and the outer perimeter of outer frame 220 are substantially flush with one another and define a substantially continuous outer surface, as illustrated in FIG. 10.

Referring to FIG. 10, outer frame 220 and inner frame 206 are preferably secured to minimize the likelihood of resin leakage through inter-frame gap $G_2$ and the area between lip 230 of inner frame 206 and the upper most surface 234 of outer frame 220. Numerous methods of minimizing or eliminating such leakage may be provided. In one example, as shown in FIG. 10, film 224 is stretched between inner and outer frames 206 and 220, so that an inner peripheral portion of film 224 is located in gap $G_2$, and so that an outer peripheral portion of film 224 is sandwiched between inner frame lip 230 and the upper most surface of outer frame 220. In addition, through-holes 216 (FIG. 9A) formed on the upper surface of upper lip 230 are alignable with complementary holes 222 (FIG. 9A) formed on the upper surface of outer frame 220, allowing fasteners such as screws, bolts, etc. to secure outer frame 220 to inner frame 206. Thus, in certain examples, the fasteners are selected to minimize the amount of leakage in the area between inner frame lip 230 and the upper most surface of outer frame 220. In other examples, portions of gap $G_2$ may be filled with a suitable resin blocking agent such as a cured resin. Suitable cured resins include silicones and epoxies.

Together, film 224, outer frame 220, and inner frame 206 define a film assembly 205 that is securable to stationary frame 64. In certain embodiments, it is contemplated that film assembly 205 will be replaced periodically due to the stress on film 224. Thus, film assembly 205 is preferably releasably secured to stationary frame 64 to facilitate replacement of film assembly 205.

In certain embodiments, film 224 is configured to provide a relieved area that reduces or minimizes the likelihood of vacuum formation between film 224 and rigid or semi-rigid solidification substrate 68. In such embodiments, a portion of film 224 includes a relieved area (not shown) defined by microtextures or grooves in its upper surface (facing rigid or semi-rigid solidification substrate 68). The relieved area lies beneath rigid or semi-rigid solidification substrate 68 while also extending beyond the perimeter of rigid or semi-rigid solidification substrate 68, preferably in the width (y-axis) direction. In certain examples, film assembly 205 has a width in the y-axis direction (FIG. 7) which is longer than the width (in the y-axis direction) of rigid or semi-rigid solidification substrate 68. As shown in FIG. 10, the variation in width creates a gap $G_1$ between the edge of rigid or semi-rigid solidification substrate 68 and the inner surface of inner frame 206, creating a leak path 232 from the atmosphere to the portion of the relieved area of film 224 lying underneath and in facing opposition to rigid or semi-rigid solidification substrate 68, thereby minimizing the likelihood of vacuum formation between film 224 and rigid or semi-rigid solidification substrate 68. In the embodiment of FIG. 10, gap $G_1$ creates a leak path from the atmosphere to the film relieved area that is generally in the z-direction (i.e., substantially parallel to the direction of movement of build platform 43 and to the surface area of film 224). However, other leak path orientations are possible, such as one that is generally in the x-y plane. Film assembly 205 is attached to the underside of stationary frame 64 via fasteners connected to frame 64 and outwardly projecting lip 230 of inner frame 206 (see FIG. 10).

Referring to FIGS. 7, 8, 12, and 13, solidification substrate assembly 62 includes a peeling member assembly 208 (FIGS. 8, 12) having at least one film peeling member, which in the depicted embodiment is two film peeling members 204a and 204b. Film peeling members 204a and 204b are generally elongated rigid members which are spaced apart from one another along the length (x-axis) direction of solidification substrate assembly 62 and on opposite sides of rigid or semi-rigid solidification substrate 68.

Figure 12:
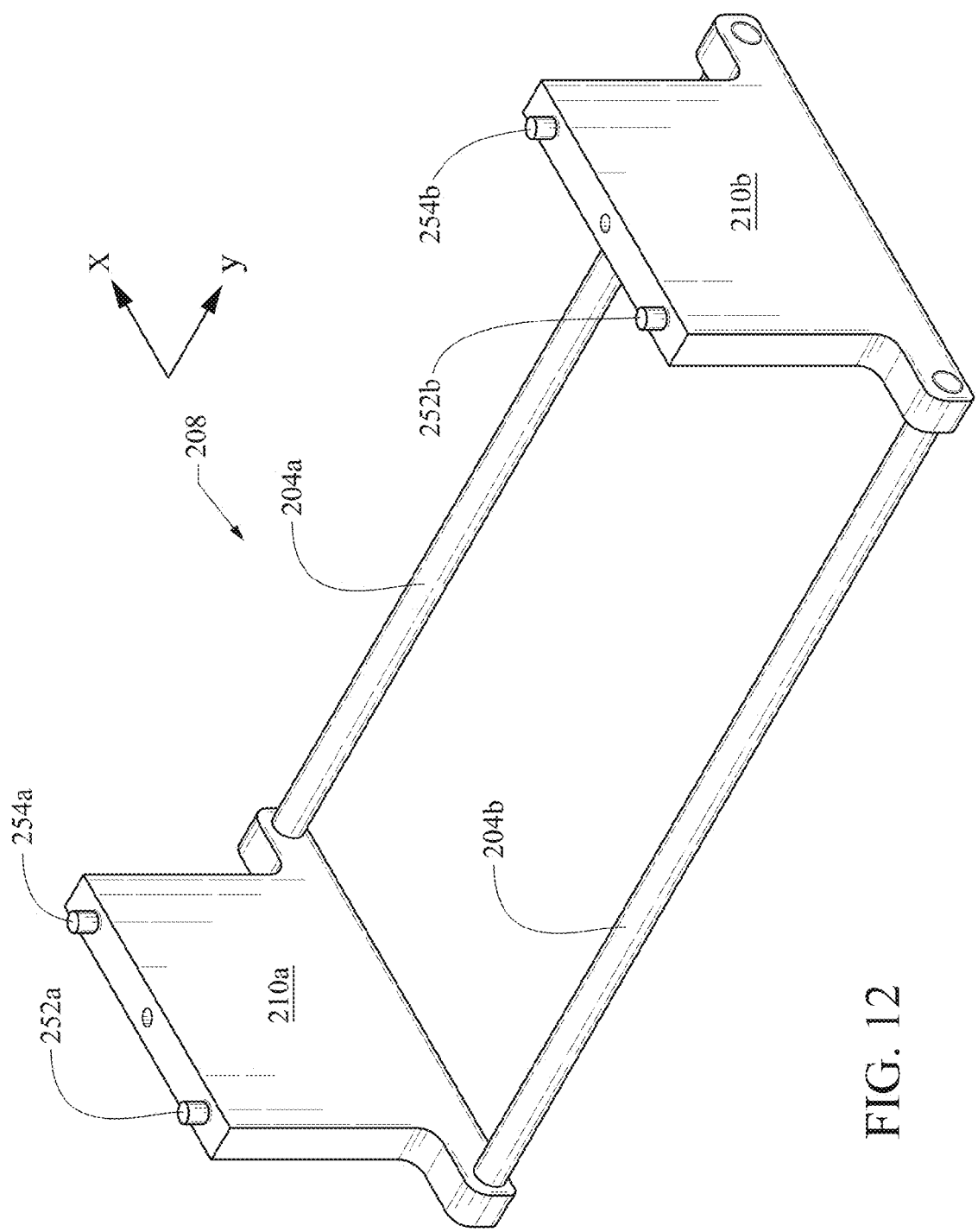
FIG. 12 is a perspective view of a peeling member assembly used in the solidification substrate assembly of FIG. 7.

In one preferred embodiment, film peeling members 204a and 204b are operatively connected to rigid or semi-rigid solidification substrate 68 to move in a coordinated fashion with rigid or semi-rigid solidification substrate 68. One exemplary apparatus for facilitating this movement is depicted in FIGS. 8 and 12. Each film peeling member 204a and 204b is connected to an opposite side of two brackets 210a and 210b. Brackets 210a and 210b are spaced apart along the width (y-axis) direction of solidification substrate assembly 62 while peeling members 204a and 204b are spaced apart along the length (x-axis) direction of solidification substrate assembly 62.

Bracket 210a has an upper surface with connectors 252a and 254a (FIG. 12) which are configured for connection to complementary connectors 240a and 248a (FIG. 11) formed in horizontal panel 214a of solidification substrate assembly bracket 238a. Correspondingly, bracket 210b has an upper surface with connectors 252b and 254b (FIG. 12) which are configured for connection to complementary connectors 240b and 248b (FIG. 11) formed in horizontal panel 214b of solidification substrate assembly bracket 210b. Connectors 252 a/b and 254 a/b may be male or female, threaded or unthreaded. Similarly, complementary connectors 240a/248a and 240b/248b may be male or female, threaded or unthreaded. In FIG. 12, connectors 252 a/b and 254 a/b are male connectors suitable for insertion into corresponding female connectors (e.g., threaded or unthreaded holes) 240 a/b and 248 a/b.

Figure 13:
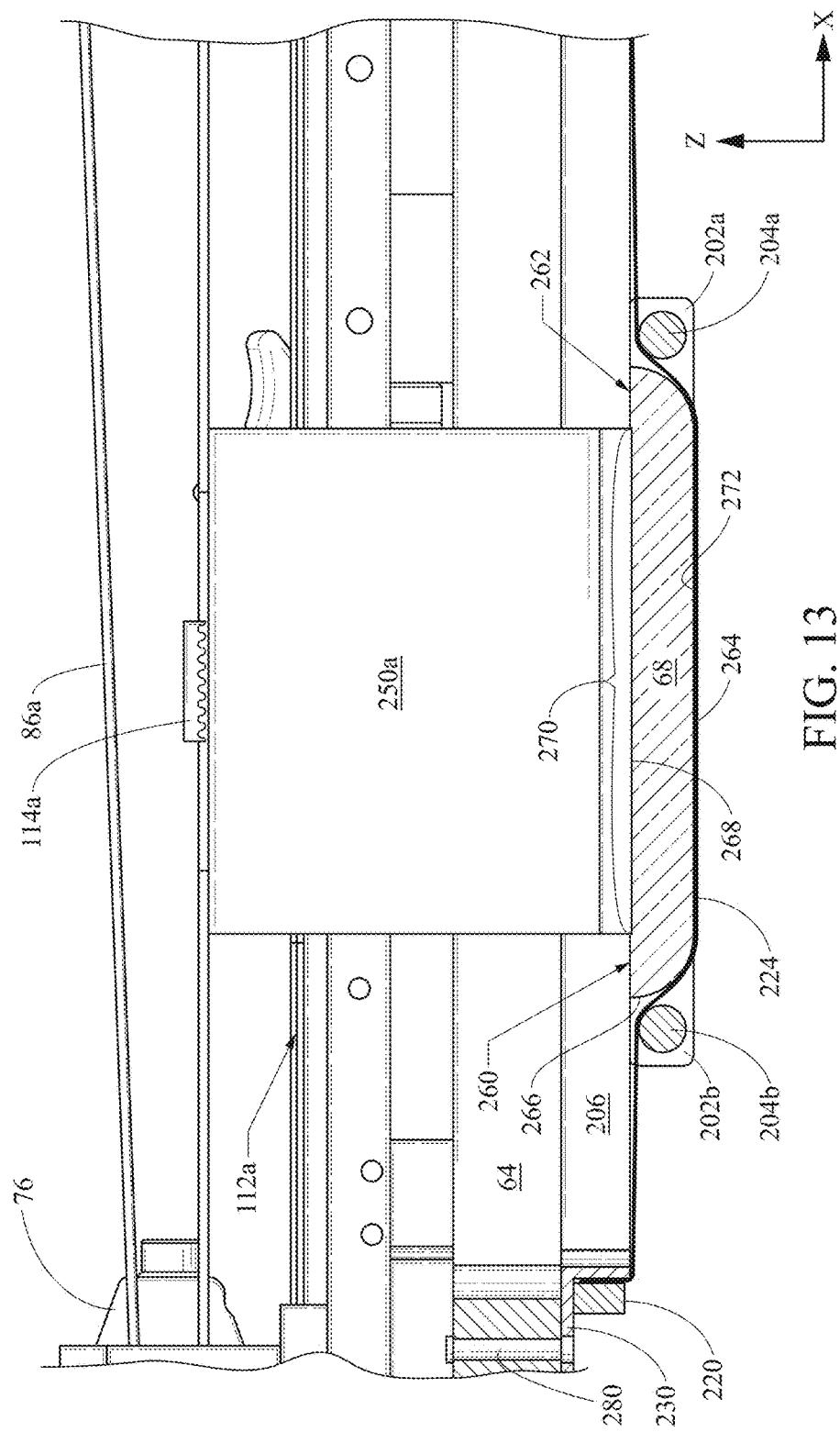
FIG. 13 is a close-up side cross-sectional view of the solidification substrate assembly of FIG. 7 taken along line 13-13 in FIG. 7.

The connections between brackets 210a/b and 238 a/b allow film peeling members 204a and 204b to move in coordination with rigid or semi-rigid solidification substrate 68 as it moves along the length (x-axis) direction of solidification substrate assembly 62. Peeling members 204a and 204b are preferably maintained at a fixed distance relative to rigid or semi-rigid solidification substrate 68. As best seen in FIG. 13, rigid or semi-rigid solidification substrate assembly 62 is preferably configured to maintain the upper surface 268 of rigid or semi-rigid solidification substrate 68 beneath inner frame 206 and outer frame 220 of film assembly 205. The lower surface 272 of rigid or semi-rigid solidification substrate 68 is in abutting engagement with film 224, which facilitates the creation of a substantially planar surface of solidifiable material to which solidification energy is supplied. As shown in FIG. 13, an inner peripheral portion of film 224 is connected to film assembly 205 at a height that is above the height of lower-most surface 272 of rigid or semi-rigid solidification substrate 68. Thus, the portion of film 224 which engages lower-most surface 272 of rigid or semi-rigid solidification substrate 68 remains below the film frame assembly 205 defined by inner film frame 206 and outer film frame 220. As best seen in FIG. 13, film assembly 205 is attached to the underside of stationary frame 64 via fasteners 280 (only one of which is visible in FIG. 13) connected to stationary frame 64 and outwardly projecting lip 230 of inner frame 206.

Referring again to FIG. 13, rigid or semi-rigid solidification substrate 68 also preferably has a beveled edge 266. Upper substrate surface 268 is positioned proximate inner and outer film frames 206 and 220 and is disposed between lower substrate surface 272 and inner and outer film frames 206 and 220. As illustrated in the figure, in certain examples, upper substrate surface 268 has a surface area greater than the surface area of lower substrate surface 272. The use of a beveled edge 266 and an upper substrate surface 268 with a surface area greater than that of lower surface 272 improves the ability of substrate 68 to slide along film 224 as substrate 68 moves relative to film 224 and frames 206 and 220. As shown in FIG. 13, when viewed in cross-section, lower surface 272 has a substantially flat region 264 disposed inward of beveled edge 266.

In certain embodiments that include a beveled edge such as edge 266, steps are taken to reduce the likelihood of image distortion that curved substrate geometries may cause. In the embodiment of FIG. 13, linear solidification device is preferably positioned inward of beveled edge 266 to avoid such distortion. Thus, in the example of FIG. 13, solidification energy is received by substantially flat surface 270 and transmitted from a substantially flat lower surface 272. In certain preferred examples, no solidification energy is transmitted from beveled edge 266 to the solidifiable material beneath film 224.

Figure 19:
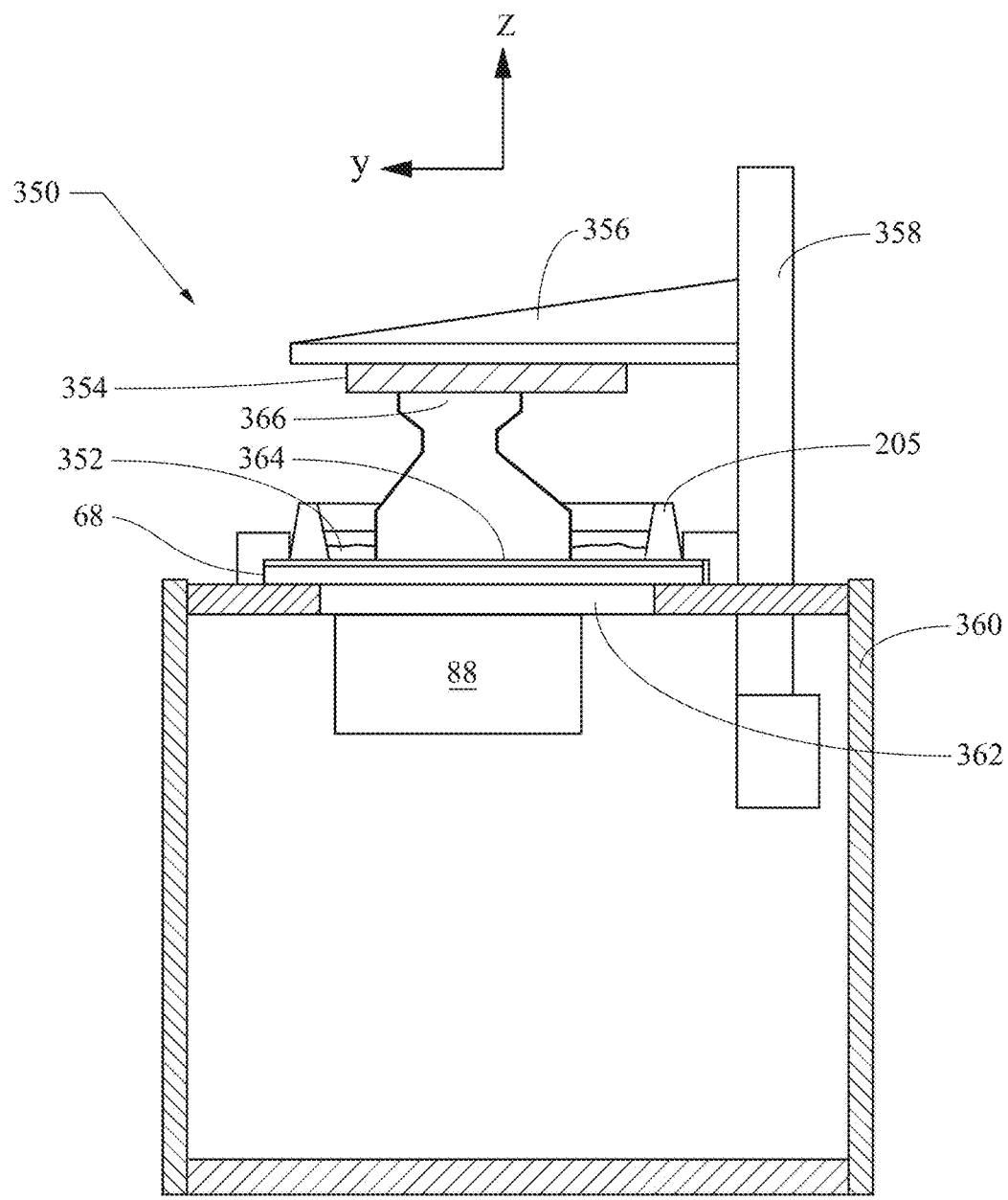
FIG. 19 is a schematic view of an alternate embodiment of a system for making a three-dimensional object using a linear solidification device.

In FIGS. 1-4, the three-dimensional object is progressively built in a vertically upward (z-axis) direction by moving build platform 43 progressively downward into resin container 48 (FIG. 2). However, other build orientations and directions may be used. FIGS. 19-20 depict another system 350 for making a three-dimensional object 316 from a solidifiable material 302. FIG. 2 depicts system 350 with build platform 354 in one position relative to rigid or semi-rigid solidification substrate 68. In FIG. 19, recently solidified material is adhered to rigid or semi-rigid solidification substrate 68. Solidifiable material 352 is of the type described previously for the embodiment of FIGS. 1-4. In system 350, build platform 354 is suspended on a support 356 that is attached to an elevator 358. Elevator 358 progressively moves build platform 354 in a vertically upward direction during an object building operation.

Figure 20A:
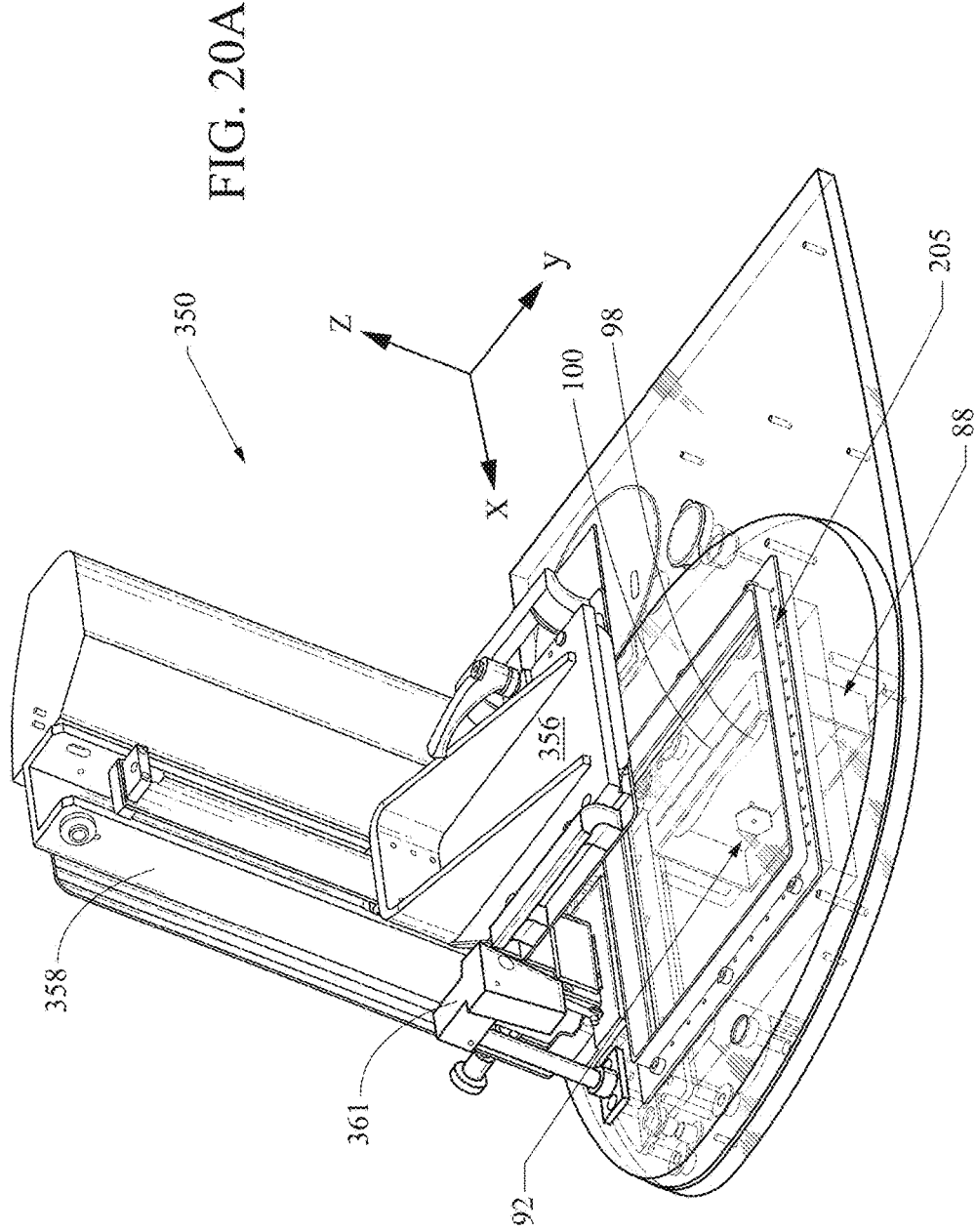
FIG. 20A is a detailed view of a portion of the system for making a three-dimensional object of FIG. 19.

Linear solidification device 88 is positioned underneath rigid or semi-rigid solidification substrate 68 and moves in the length (x-axis) direction to solidify solidifiable material 352. As best seen in FIG. 20A, linear solidification device 88 is constructed in substantially the same manner as in the previous embodiments. However, it is oriented in a vertically (z-axis) opposite direction relative to the earlier embodiments and may also be embodied as an LED array or a laser diode with a laser scanning micromirror. Thus, lens 98 is located vertically (z-axis) above rotating energy deflector 92 and vertically (z-axis) below light opening 100 (FIGS. 5a and 5b). In FIG. 20A, the solidification energy source 90, which is preferably a laser diode, is not visible. However, it is positioned to direct solidification energy in the y-z plane toward rotating energy deflector 92 as rotating energy deflector 92 rotates. Thus, as linear solidification device 88 translates in the x-direction, solidification energy is progressively scanned in the y-axis direction to selectively solidify certain locations along a generally—and preferably substantially—linear scanning path (as dictated by the shape of the three-dimensional object at a given x-axis position). Whether a given y-axis location on the solidifiable material will receive solidification energy depends on whether solidification energy is being supplied by the solidification energy source 90 as the facet 94a-94f that is in optical communication with solidification energy light source reaches the rotational position corresponding to that y-axis location.

The apparatus for moving linear solidification device 88 is similar to that described in the previous embodiments. In one example, a pair of linear slides is suspended from the underside of the upper horizontal surface of housing 360. Connectors on either side of the light opening 100 in linear solidification device 88 connect linear solidification device 88 to linear bearings that slide on rails. A motor such as motor 76 is be provided with a shaft, timing belt, and pulley assembly to slide linear solidification device 88 in the length (x-axis) direction.

Unlike the embodiment of FIGS. 1-4, there is no container of solidifiable material into which build platform 356 is immersed during an object build process. Instead, solidifiable material is periodically dispensed into a build tray that is defined by film assembly 205 described previously. In FIG. 20A, film 224 (not shown) is positioned above rigid or semi-rigid solidification substrate 68 and beneath build platform 356. The film 224, inner frame 206, and outer frame 220 collectively define a shallow basin that holds solidifiable material. Rigid or semi-rigid solidification substrate 68 supports and is positioned underneath film 224 such that a peripheral portion of rigid or semi-rigid solidification substrate rests in housing 360 (FIG. 19). An opening 362 in the upper surface of housing 360 provides an optical pathway between linear solidification device 88 and solidifiable material 352. As an object is built, solidifiable material 352 is solidified and adheres to the object 366 (FIG. 19), thereby reducing the amount of solidifiable material 352 in the basin. Level detector 361, projects light and senses returned light to determine the level of liquid in the basin. When the level drops below a selected threshold, additional solidifiable material is dispensed into the basin (using an apparatus that is not depicted).

Figure 20B:
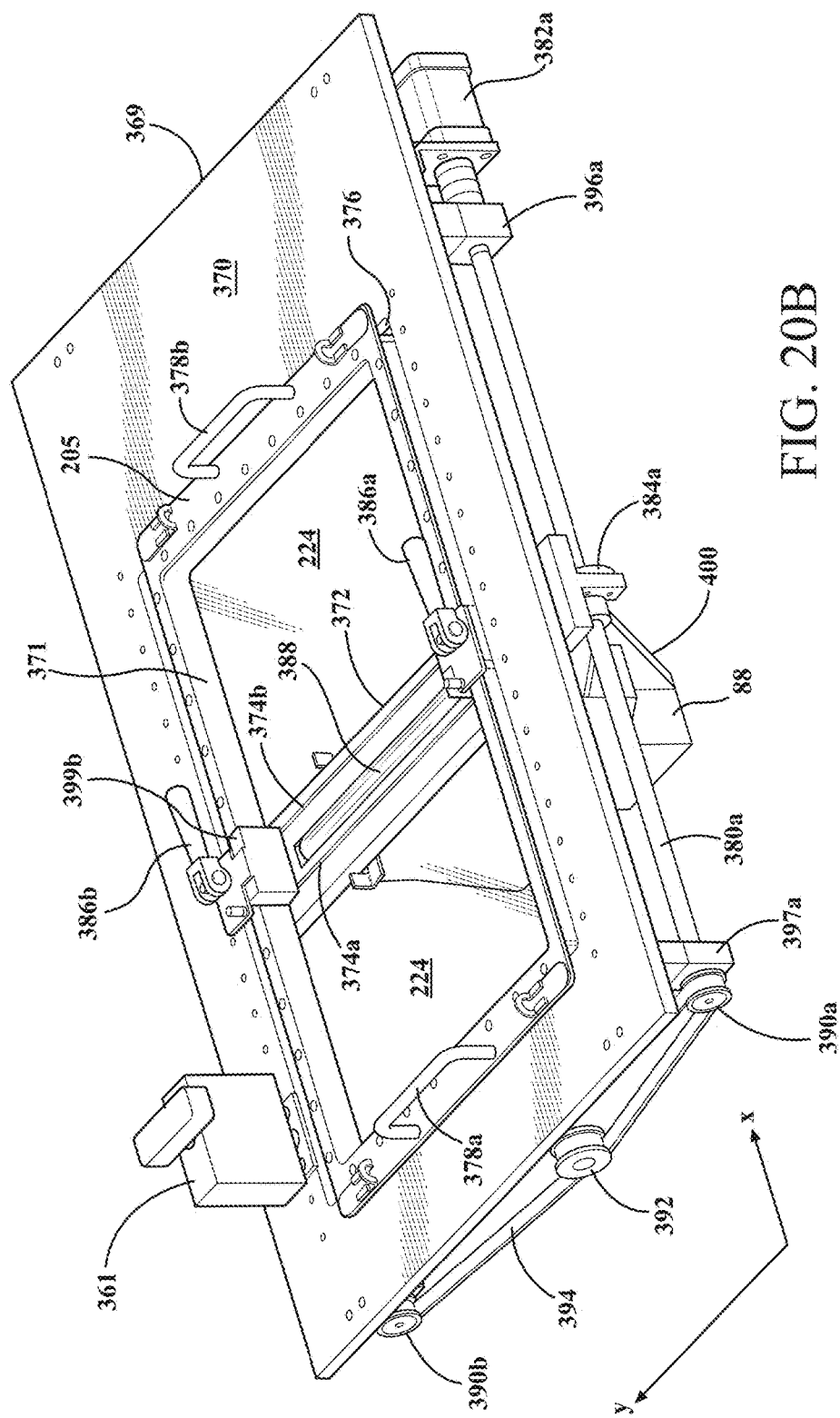
FIG. 20B is a detailed perspective view of a work table assembly and linear solidification device of an alternate embodiment of the system for making a three-dimensional object of FIG. 19.
Figure 20C:
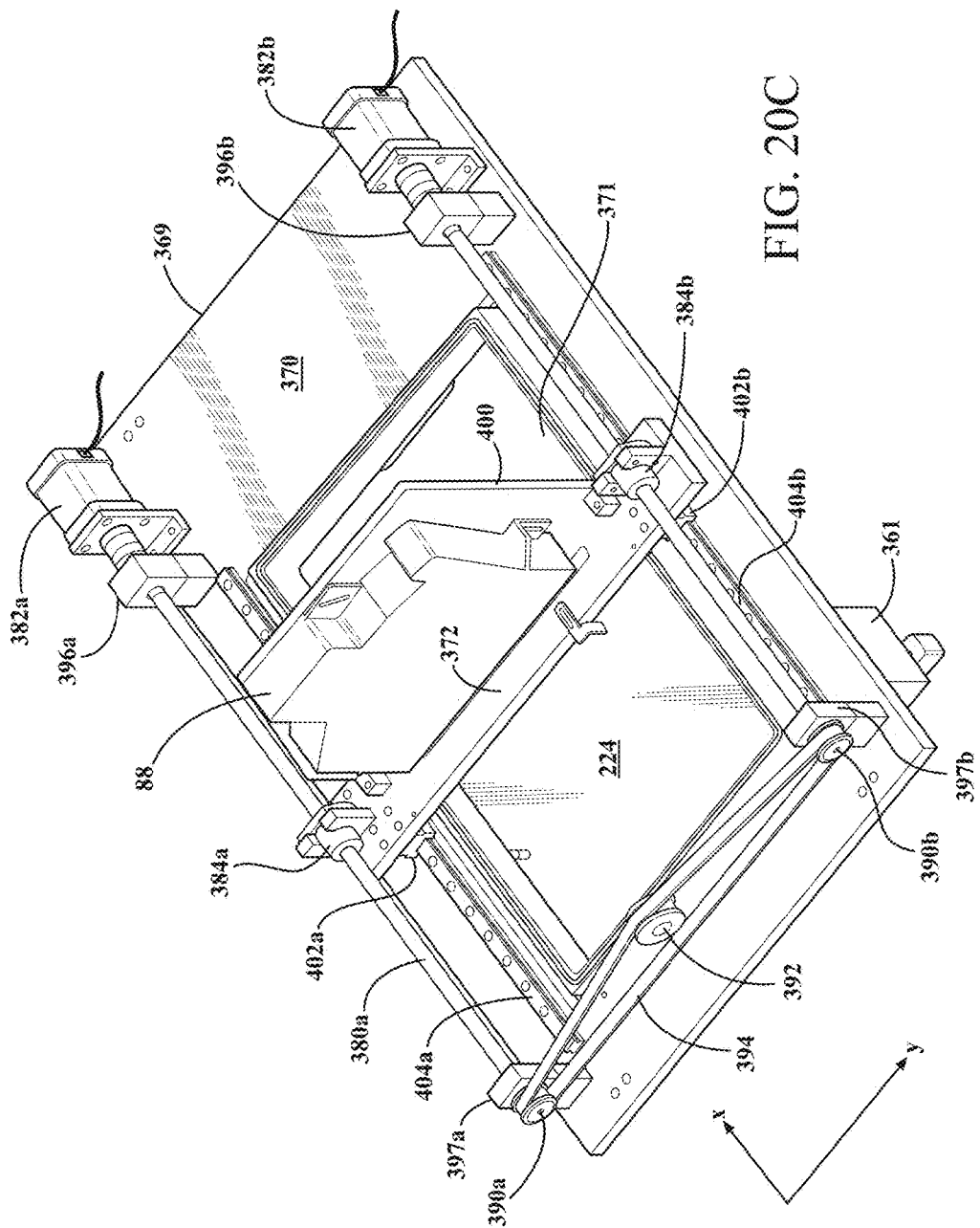
FIG. 20C is a detailed perspective view of the underside of the work table assembly and linear solidification device of FIG. 20B in a flipped (bottom side up) orientation.
Figure 20D:
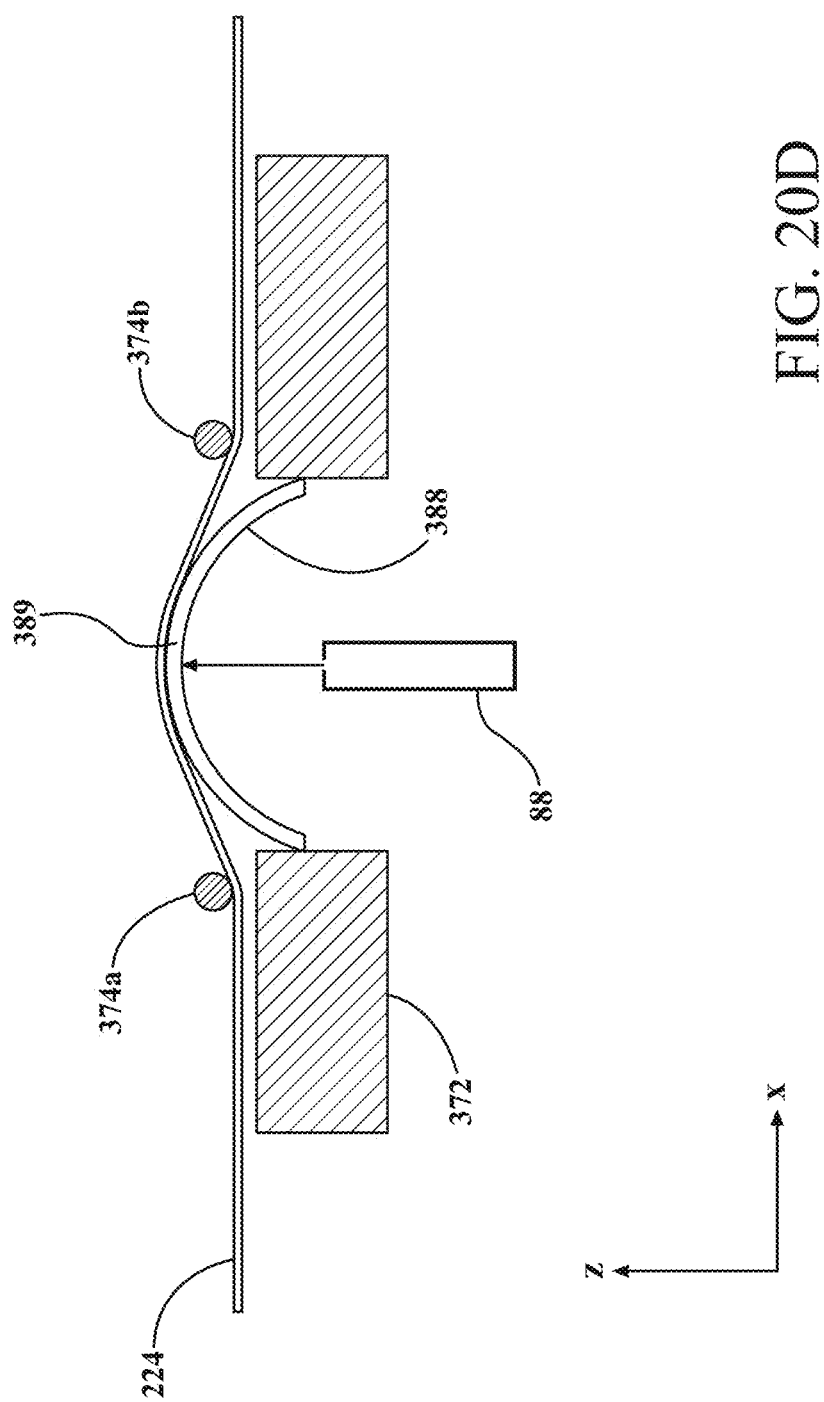
FIG. 20D is a cross-sectional, side view of a portion of the linear solidification device and solidification substrate assembly of FIG. 20B.

Referring to FIGS. 20B-20D, a portion of an alternate version of the system 350 for making a three-dimensional object is depicted. FIGS. 20B and 20C depict a work table assembly 369 that may be used in system 350 of FIG. 20A. The system 350 also includes linear solidification device 88 that may be embodied as described previously. A cover 400 may also be provided to enclose the optics and solidification energy source(s) in the linear solidification device 88.

In accordance with the depicted example, system 350 comprises a linear solidification energy device 88 that travels in a first (x-axis) direction as solidification energy is transmitted in a second (y-axis) direction. In addition, a solidification substrate 388 travels in the first (x-axis) direction as the linear solidification device 88 travels in the first (x-axis) direction. The three-dimensional object is progressively built upside down in the vertical (z-axis) direction during the object building process.

The work table assembly 369 of FIG. 20B comprises work table 370 and a solidification substrate assembly 371 that comprises film assembly 205, and solidification substrate 388. System 350 also includes a carriage 372 and peeling members 374a and 374b. Carriage 372 is used to support and translate the linear solidification device 88 in the x-axis direction. Peeling members 374a and 374b are used to separate film 224 of film assembly 205 from the solidified three-dimensional object. Film assembly 205 acts as a basin or reservoir for holding solidifiable material. Level sensor 361 is provided to detect the level of solidifiable material held in the film assembly 205 so that solidifiable material may be added as needed to maintain a desired level.

Work table 370 includes an opening 376 in which film assembly 205 is disposed. Film assembly 205 may also include handles 378a and 378b which are spaced apart from one another in the x-axis direction to facilitate removal and/or replacement of the film assembly 205 from the work table assembly. Cam latches 386a and 386b are spaced apart from one another in the y-axis direction to releasably lock the film assembly 205 into place in work table opening 376.

The solidification substrate 388 of FIGS. 20B-20D is rigid or semi-rigid and is preferably formed as a partial cylinder (half of the circumference of a complete cylinder or less) having its length axis oriented in the solidification energy scanning axis (y-axis) direction. In certain preferred examples, solidification energy traverses the length of the solidification substrate 388 at a substantially fixed circumferential location along the substrate 388. A close-up cross-sectional view of a portion of the film assembly 205, linear solidification device 88 and the substrate 388 is shown in FIG. 20D. As shown in the figure, solidification substrate 388 is disposed in an opening within carriage 372 such that the substrate 388 is concave relative to linear solidification device 88. Substrate 388 has an inner surface that defines an inner radius and an outer surface that defines on outer radius, wherein the outer radius is larger than the inner radius. Linear solidification device 88 is positioned such that the inner surface of the substrate 388 is between the linear solidification device 88 and the outer surface of substrate 388.

Solidification substrate 388 is positioned so that at least a portion of it projects away in the vertical (z-axis) direction from an upper surface of carriage 372. Solidification substrate 388 has an apex 389 that is the circumferential location of the substrate 388 which is spaced apart from carriage 372 by the farthest distance (as compared to the other circumferential locations). In certain preferred examples, linear solidification device 88 is positioned such that solidification energy is selectively projected along the length of substrate 388 substantially at the apex 389. In certain examples, the housing opening 100 (FIG. 5B) is oriented parallel to the length of solidification substrate 388 and at an x-axis position that is substantially the same as the x-axis position of apex 389.

Solidification substrate 388 is preferably formed from a translucent and/or transparent glass or plastic. In certain preferred examples, substrate 388 has a radius of curvature of ranging from about 0.2 inches (5.1 mm) to about 0.8 inches (20.3 mm), preferably from about 0.4 inches (10.2 mm) to about 0.6 inches (15.2 mm), and even more preferably about 0.5 inches (12.7 mm). In the same or other preferred examples, solidification substrate 388 has a thickness ranging from about 0.5 mm to about 3.5 mm, preferably from about 0.6 mm to 3.0 mm, and more preferably from about 1.5 mm to about 2.5 mm. In one example, the thickness is about 2.0 mm.

Referring again to FIG. 20D, film assembly 205 (which is configured as described previously) sits above carriage 372 and solidification substrate 388 in the vertical (z-axis) direction. The use of a curved solidification substrate 388 reduces the surface area of contact between substrate 388 and film 224, thereby reducing the friction between substrate 388 and film 224 as substrate 388 travels in the x-axis direction relative to film 224.

In certain examples, during an object build operation the build platform 356 (FIG. 20A) or the most recently solidified downward facing surface of the object is immersed in a volume of solidifiable material held in the film assembly 205 (which acts as a solidifiable material basin or reservoir) until a desired spacing between the most recently solidified downward facing surface of the object and a solidification substrate is obtained. During the immersion, pressure forces build up and force or squeeze out some amount of solidifiable material laterally away from the object. In the case of a planar solidification substrate, the pressure forces may be undesirably high and could distort the three-dimensional object. The curved solidification substrate 388 reduces such pressure forces.

The linear solidification device 88 is operated similarly as in the previous embodiments. A motor 382a and an optional motor 382b (FIG. 20C) are operatively connected to linear solidification device 88 to translate device 88 in the x-axis direction. In certain examples, motors 382a and 382b are stepper motors that are actuated in units of motor "steps" which may be correlated to a linear distance in the x-axis direction and used to define object strip data, as discussed below.

Carriage 372 is operatively connected to two externally threaded shafts 380a and 380b which are spaced apart from one another in the scanning (y-axis) direction. Shafts 380a and 380b are supported and attached to work table 370 by brackets 396a and 397a (shaft 380a) and brackets 396b and 397b (shaft 380b). Carriage 372 is connected to the threaded shafts 380a and 380b by corresponding internally threaded nuts 384a and 384b. The activation of motor 382a (and optionally, motor 382b) causes the shafts to rotate about their longitudinal axes (which are oriented in the x-axis direction). As shafts 380a and 380b rotate, the engagement of the external shaft threads with the internal nut threads causes the carriage 372 to translate in the x-axis direction. System 350 may also include an end of travel sensor such as end of travel sensor 346 shown in FIG. 16(b) to allow the x-axis position of the linear solidification device 88 to be reliably initialized.

Carriage 372 is supported in the vertical (z-axis) direction by internally threaded nuts 384a, 384b and shafts 380a and 380b. Linear bearings 402a and 402b are attached to the vertically upward (z-axis) facing surface of carriage 372 and slidably engage rails 404a and 404b formed on the underside (downward facing surface in the z-axis direction) of work table 370.

As indicated previously, motor 382b is optional. In certain cases, only a single motor 382a is required. Pulleys 390a and 390b are provided on the distal ends of externally threaded shafts 380a and 380b. A timing belt 394 engages pulleys 390a and 390b such that when the externally threaded shaft 380a rotates about its longitudinal axis, pulley 390a rotates about its central axis, causing the timing belt 394 to begin circulating. The circulation of timing belt 394 in turn causes pulley 390b to rotate about its central axis, which in turn causes externally threaded shaft 380b to rotate about its longitudinal axis. The rotation of externally threaded shaft 380b causes the corresponding side of carriage 372 to translate in the x-axis direction due to the engagement of externally threaded shaft 380b and internally threaded nut 384b. Tensioner 393 may also be provided to maintain a desired tension of timing belt 394. In those cases where the optional motor 324b is provided, timing belt 394 may be eliminated.

As best seen in FIG. 20D, the position of solidification substrate 388 urges a portion of film 224 of film assembly 205 in a vertically (z-axis) upward direction away from the upper surface of carriage 372 and from linear solidification device 88. Peeling members 374a and 374b are operatively connected to carriage 372 and spaced apart from one another along the x-axis direction on respective sides of solidification substrate 388. Film 224 is positioned between the peeling members 374a, 374b and the upper surface of carriage 372. As solidifiable material is solidified at the location of substrate apex 389, it will tend to solidify in contact with and adhere to film 224. As carriage 372 moves in the x-axis direction, film peeling members 374a and 374b move in the same direction and pull the film 224 in the downward vertical (z-axis) direction away from the solidified object. Brackets 399a (not shown) and 399b are connected to peeling members 374a and 374b and are positioned inside the film assembly 205. The brackets 399a and 399b are also connected to carriage 372 so as to translate with carriage 372 when carriage 372 translates in the x-axis direction. Thus, system 350 selectively solidifies material in the scanning (y-axis) direction while translating a linear solidification device 88 and film peeling members 374a and 374b in the x-axis direction.

Instead of using film assembly 205, the system 350 for making a three-dimensional object of FIGS. 19 and 20A-D may utilize a basin formed from polymeric materials. In one example, a basin comprising a transparent resilient bottom and resilient side walls is used. In certain implementations, both the transparent resilient bottom and the non-resilient side walls are formed from the same or different silicone polymers. In another implementation, a basin comprising non-resilient acrylic side walls and a resilient silicone bottom is used. In another example, the bottom of the basin is defined by a rigid or semi-rigid transparent solidification substrate 68 that is connected to side walls formed of a resilient or plastically deformable polymeric material. In a further example, the substrate 68 may be coated with a resilient transparent material, such as a silicone, that extends only a portion of the way to the side walls, leaving a peripheral gap around the coating and between the coating and the sidewalls. In yet another example, the substrate 68 may be coated with a resilient transparent material that extends all the way to the side walls. In certain examples, a tilting mechanism may be provided that tilts the basin with respect to the build platform 356 to peel solidified solidifiable material from the bottom of the basin. A non-resilient material such as a transparent non-resilient film may also be provided as a layer on top of the resilient bottom between the resilient bottom and the build platform 356.

As with the earlier embodiments, during an object build process, solidifiable material 352 solidifies in contact with film 224, causing the film 224 to stretch as the object 366 is pulled upward (z-axis direction) and away from housing 360. Thus, the movement of build platform 354 is preferably controlled to prevent damaging film 224 and/or object 366.

In the embodiments of FIGS. 19 and 20A-D, a flexible film mask with a matrix of variably transparent imaging elements (e.g., LCD or transparent OLED) that can be selectively made transparent or opaque can be provided, thereby allowing solidification energy to be selectively provided in the y-axis direction while continually supplying solidification energy from solidification energy source 90 to rotating energy deflector 92. In one example, the flexible film mask is provided on top of rigid or semi-rigid solidification substrate 68. Solidification energy device 88 may be embodied as shown in FIGS. 5A-C. In addition, rotating energy deflector 92 may be replaced with a laser scanning micromirror.

In accordance with certain implementations of the three-dimensional object manufacturing processes and apparatuses described herein, a method of representing object data for use in controlling the action of linear solidification device 88 is illustrated in FIGS. 14-16(g). Typical file types used to generate object data include STL (Stereo Lithography) files or other CAD (Computer Aided Drafting) files commonly translated for rapid prototyping systems into formats such as SLC, CLI slice data files or voxelized data files which may include data formats such as BMP, PNG, etc. However, any data input type may be used and converted internally to create the image data used by the linear solidification device 88. The object data corresponds to the energy pattern supplied by linear solidification device 88 and may be generated by a control unit or by an external source or device (e.g., a network or storage device).

Figure 14:
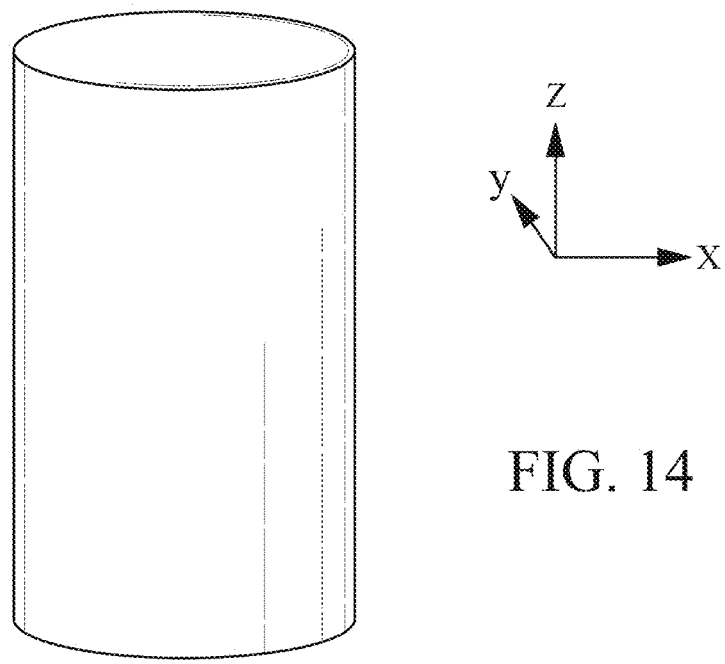
FIG. 14 is a graphical depiction of three-dimensional object data for use in illustrating a method of making a three-dimensional object using a linear solidification device.

As an exemplary three-dimensional object, a simple cylinder 300 is shown in FIG. 14. Locations on or within the cylinder can be characterized by x, y, and z-axes as shown.

Figure 15:
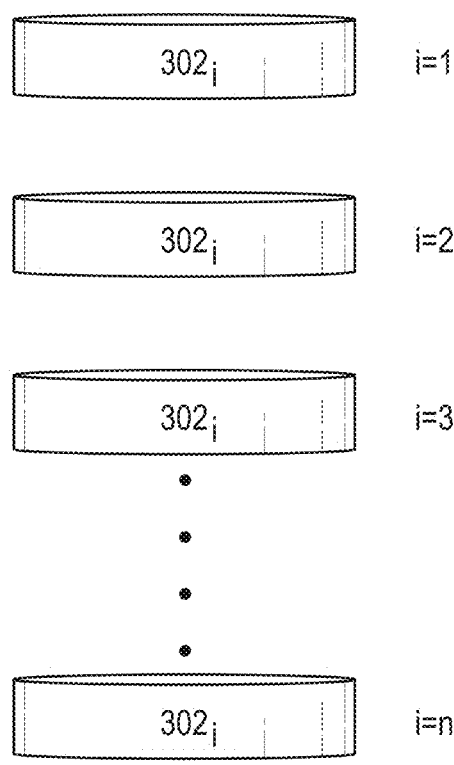
FIG. 15 is a graphical representation of sliced data representative of the three-dimensional object of FIG. 14.

In certain linear solidification device implementations, the intensity and duration of solidification energy supplied at a particular x, y location cannot be controllably varied. As a result, those locations in the x, y plane which receive solidification energy will solidify to substantially the same depth. In such implementations, it can be useful to perform a data "slicing" operation in which a computer representation of the three-dimensional object is sliced to create a plurality of sections in the build axis (z-axis) direction, each representing a uniform depth across at all points across the x-y plane. Each such section may mathematically correspond to or be represented by an object layer data set. One exemplary illustration of such slices is graphically depicted in FIG. 15. As shown in FIG. 15, a data representation of the object 300 can be further represented as a plurality of build axis (z-axis) slices $302_i$, wherein the total number of slices n is substantially equal to the height of the object as built divided by the depth of solidification provided by linear solidification device 88. The slices $302_i$ may be represented mathematically be object layer data sets in which each layer is defined by x, y coordinates representing its contours and a z-axis value representing its location along the build axis, with $\Delta z$ values between adjacent slices representing the thickness of the layer.

Figure 16A:
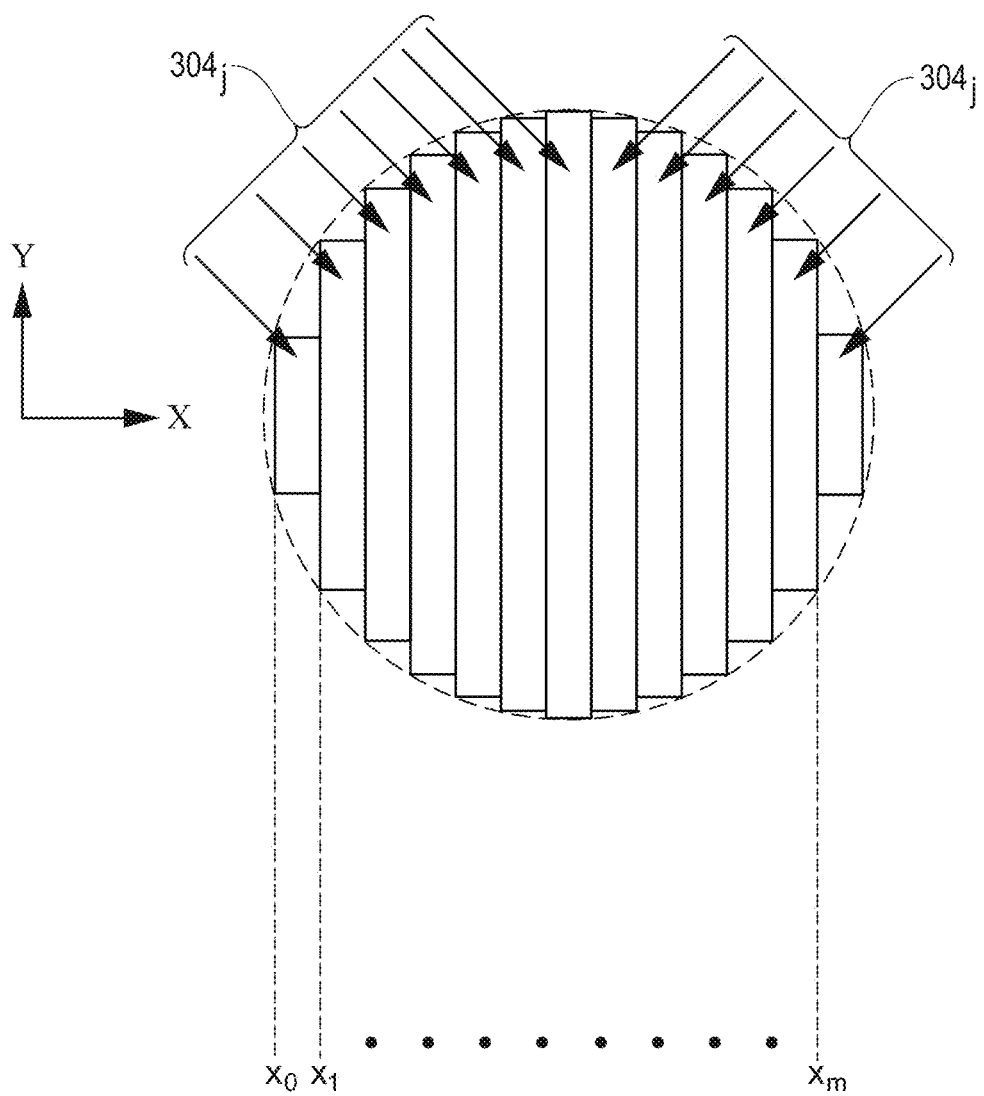
FIG. 16(a) is a graphical representation of object cross-section strip data corresponding to one of the slices of a three-dimensional object shown in FIG. 15.

Each object layer data set may be represented graphically as a plurality of strips having a length along the scanning axis (y-axis) direction and a width along the x-axis direction, with the strips being arranged width-wise along the x-axis direction. Referring to FIG. 16(a), a view taken along the vertical (z-axis) direction of a graphical representation of an individual object data slice $302_i$ is provided. The individual slice $302_i$ may be represented as a plurality of adjacent strips $304_j$, which is represented as m strips. The dashed line is not part of the data representation, but is provided to show the generally circular shape defined by strips $304_j$. In the example of FIG. 16, the strips have a width corresponding to the direction of movement of the linear solidification device 88 (x-axis) and length corresponding to a direction other than the direction of linear solidification device 88 movement (y-axis). In the specific example of FIG. 16(a), the strip length direction is substantially perpendicular to the x-axis direction.

Each strip $304_j$ graphically depicts a data representation (preferably provided in a form that is readable by a computer processor) of those locations of solidifiable material that will be solidified in the y-axis direction for a given x-axis location. The locations may also be defined relative to build envelope boundaries such as the scanning axis boundary 344 and the x-axis boundaries 343 and 345 of FIG. 16(b). The control unit (not shown) receives data indicating the location of solidification energy in the x-axis direction, for example, as indicated by the position of linear solidification device 88 in the x-axis direction. The control unit also receives the data representation (strips $304j$) and directly or indirectly associates each strip $304_j$ with an x-axis position in the build envelope 342 defined within the exposed surface of the solidifiable material. Thus, a position within a strip on the data representation corresponds to a position on the exposed surface of the solidifiable material.

In FIG. 16(a) $x_0$ corresponds to the position of the linear solidification device 88 at which solidification will begin. The increment $x_1-x_0$ represents the width of solidification in the x-axis direction provided by linear solidification device 88. Thus, when linear solidification device is at position $x_0$, solidification energy source 90 will supply solidification energy when a facet 94a-f with which it is in optical communication has a rotational position corresponding to the y-axis locations in the build envelope 342 where the strip defined between $x_0$ and $x_1$ is present. In the illustrated embodiments of FIGS. 5A-C, the length of one facet 94(a)-(f) of rotating energy deflector 92 corresponds to the maximum scannable y-axis dimension of the build envelope 342, i.e., the maximum length of solidification in the y-axis direction. However, any individual strip $304_j$ may correspond to a y-axis solidification length less than the maximum scannable y-axis build envelope dimension.

As linear solidification device 88 moves along the length (x-axis) direction of solidification substrate assembly 62, it will solidify regions of solidifiable material corresponding to each strip $304j$. Each x-axis location corresponds to a particular strip $304j$. In certain embodiments, a linear encoder is operatively connected to motor 76 and/or motor shaft 78 to determine the x-axis position of linear solidification device 88.

The object layer data that is graphically illustrated in FIG. 16(a) may be mapped onto a build envelope 342 as shown in FIG. 16(c). Each strip $304j$ may be defined by an x coordinate (or x-coordinate pairs) and one or more y-coordinates which define the regions of solidification at the particular x-axis location.

In certain examples, each strip $304j$ may be represented by a corresponding set of data strings. In a preferred embodiment, the data strings comprise a set of time values. In another preferred embodiment, the data strings comprise a string number n and a set of time values. In certain cases, the string number n corresponds to a linear scan number. For example, using formula (1) described previously a maximum number of linear scans ($N_{max}$) may be calculated for a build envelope length L and each linear scan will have a corresponding string index number associated with it. For any particular object layer, regions of the build envelope 342 along the x-axis direction may not be solidified and may not be scanned. Nevertheless, all regions at which a unique linear scan may occur in the x-axis direction may be assigned a string number. Thus, for a given speed of motor 76, a given number of facets F of a rotating energy deflector 92 and a given rotational speed of rotating energy deflector 92, there will be a maximum number of linear scans $N_{max}$ within build envelope 342 and a corresponding number of sets of data strings, each of which may or may not have actual scan data (object data) in it, depending on whether any scanning is to occur at its corresponding x-axis location. In the example of FIG. 16(c), thirteen linear scans are used to form the object layer represented by strips $304j$ and each linear scan corresponds to a linear scan index ranging from n to n+12 and a unique set of string data having a string index ranging from n to n+12.

Typical control systems, including microcontrollers, will have a built in lag time between the time when solidification data is read and when solidification energy source 90 is toggled to either an activated or deactivated condition. The lag time may be variable and may cause errors in the dimensions of the three-dimensional object being built. In one example, a microcontroller is provided with the systems for making a three-dimensional object disclosed herein which has a lag time of no more than about 80 nanoseconds, preferably no more than about 60 nanoseconds, and even more preferably no more than about 50 nanoseconds. The part error can be related to the toggle lag time as follows:

$$\text{Error} = (L_{BE})(\text{RPM})(F)(t_{toggle\ lag})/(60\ \text{sec./min.})(0.001\ \text{mm/micron}) \qquad (3a)$$

wherein, Error is the maximum variation in the part dimensions (microns) due to the toggle lag time;

LBE is the build envelope distance in the scanning (y) axis direction (mm);

RPM is the rotational frequency of the rotating energy deflector 92 (revolutions/minute);

F is the number of facets on the rotating energy deflector 92;

and $t_{toggle\ lag}$ (seconds) is the time required for the microprocessor to toggle the state of the solidification energy source.

In certain preferred implementations, the Error is preferably no more than 90 microns, more preferably no more than about 90 microns, still preferably no more than about 70 microns, and even more preferably no more than about 50 microns.

FIG. 16(*d*) provides a table that illustrates exemplary sets of string data that correspond to the object strips shown in FIG. 16(*c*). The string indices begin with n=0 at the left-hand border ($x_0$) of build envelope 342 and end at a maximum string number $N_{max}$ at the right hand border of the build envelope 342. Thus, certain sets of data strings will not have any object data associated with them because they do not correspond to x-axis locations where solidification where occur. In FIG. 16(*d*) no solidification occurs prior to string index n=20 and no solidification occurs after the string index n+12. Thus, there are no entries in the table of FIG. 16(*d*) for the x-axis locations at which no solidification occurs within build envelope 342.

Each set of data strings depicted in FIG. 16(*d*) has a start code which is represented in hexadecimal notation by a series of eight Fs. Going from left to right, the string index n for the data string is next. Following the string index a series of time values is provided. Each time value represents a solidification source energization state event. In one example, the energization states are ON or OFF. The time values may take a variety of forms. However, in one implementation they are defined as elapsed times of a CPU clock in microcontroller unit used to operate the system for making a three-dimensional object. In one example, the CPU has a clock speed of 66 MHz and the units of time are CPU ticks. In an example where the line scanning speed is 1000 lines per second, the maximum scan length of each line in the scanning axis (y-axis direction) corresponds to 66,000 ticks. Thus, the set of string data at n=20 indicates that the solidification energy source 90 will be activated at 22000 ticks and deactivated at 44000 ticks. The set of string data at n=21 indicates that solidification energy source 90 will be activated at 20000 ticks and deactivated at 46000 ticks. In a preferred embodiment a timer is provided (such as a software timer programmed into the microcontroller unit) which is reset at the beginning of each linear scan, and the beginning of each linear scan is synchronized to the build envelope scanning axis boundary 344 using sensor 324 of FIG. 5C in the manner described previously. Thus, the ticks are defined relative to a zero starting time when the timer is reset at which point the line scanning operation is at the scanning axis boundary 344 (FIG. 16(*b*)).

In certain examples, a host computer transmits sets of data strings to a microcontroller unit that operates the system for producing a three-dimensional object for each possible linear scan (i.e., for each string ranging from 0 to $N_{max}-1$) even though some of the sets of data strings may have no object data (e.g., no CPU tick values) associated with them because no solidification occurs at the x-axis location to which they correspond. While this technique may be used, it consumes excess microcontroller unit processor capacity involved in reading data strings corresponding to x-axis locations at which no solidification occurs. Accordingly, in certain examples, only data strings containing object solidification data (e.g., CPU tick values) are transmitted to the microcontroller unit. In such cases it is convenient to define a computer memory index m having values ranging from 0 to one less than the maximum number of transmitted sets of data strings $M_{max}$, where m uniquely identifies each set of string data transmitted to the microcontroller unit. In the example of FIG. 16(*d*), there are a total of $N_{max}$ sets of string data defined for the entire build envelope 342 by the host computer. However, only 13 sets of string data include any object solidification data. Therefore, assuming that linear solidification device 88 is moving from left to right in FIG. 16(*c*), the first data string transmitted by the host computer to the microcontroller unit will have a computer memory index of m=0 and a string index n of 20. The value of the string index n will correspond to a specific location along the x-axis within build envelope 342. However, the computer memory index m will not necessarily so correspond. Thus, the microcontroller unit need only read 13 data strings instead of $N_{max}-1$ data strings.

In certain cases, linear solidification devices 88 utilizing a rotating energy deflector 92 may be subject to variability in the linear scanning speed in the scanning (y-axis) direction. Each facet 94*a-f* will have a rotational position corresponding to a location along the scanning axis (i.e., a "center point") at which solidification energy will be deflected perpendicularly to the solidifiable material and to the opening 100 in the housing of the linear solidification device 88. At the center point, the distance traveled by the solidification energy from the rotating energy deflector 92 to the solidifiable material will be at a minimum relative to locations away from the center point. At rotational positions located away from the center point in the scanning (y-axis) direction, the speed of scanning in the y-axis direction will be faster than proximate the center point. In addition, the speed will increase as the distance from the center point increases. At a constant rotational frequency for rotating energy deflector 92, the speed increase is directly proportional to the distance from the center point.

This variation in scanning speed as a function of scanning axis (y-axis) position can produce inaccuracies in the three-dimensional object. In certain examples, a three-dimensional object is mapped within a build envelope such that the object dimensions dictate specific object coordinates in the scanning (y-axis) direction. The coordinates can be translated to time values indicative of a change in the energization state of a solidification energy source if the scanning speed is constant. However, if time values are used as solidification source event data, variable scanning speeds will cause the coordinates of the solidified object (and the object dimensions) to vary relative to the coordinates dictated by the object data because the scanning speed will vary with scanning axis position. In addition, variable scanning speeds can result in solidification energy densities that vary with scanning axis position because areas that are scanned quickly will have reduced solidification energy exposure times—and therefore reduced solidification energy densities—relative to areas that are scanned more slowly. As a result, hardening depths that vary with scanning axis position may result.

In certain cases, it is desirable to convert original object data to modified object data to compensate for variations in scanning speed and/or energy density along the scanning axis. The original object data preferably comprises a plurality of original object data sets each for an object cross-section and corresponding to a build axis (z) location. Each original object data set comprises a plurality of original solidification energy source event data items, wherein each data item is indicative of a change in the energization state of a solidification energy source. The data items may be, for example, scanning axis locations where an energization state change will occur or times when an energization state change will occur.

Figure 26:
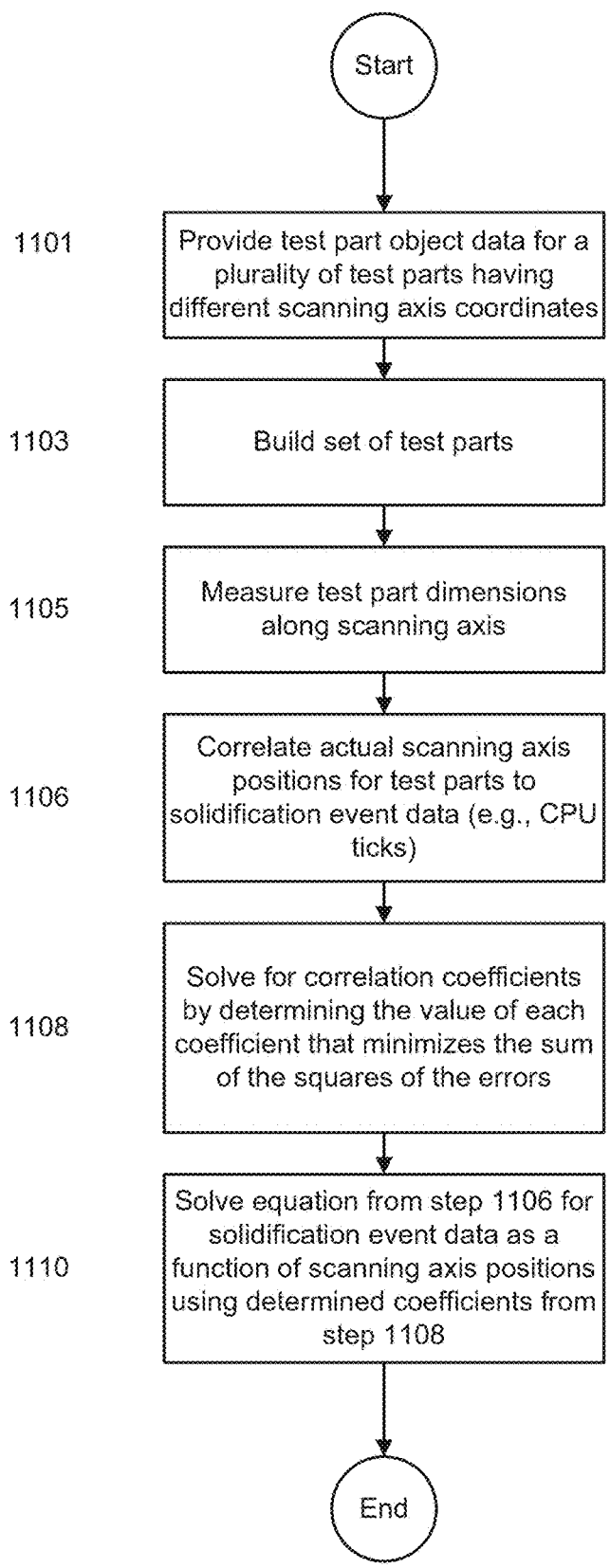
FIG. 26 is a flow chart used to illustrate a first method for providing a linear solidification device speed and/or energy variation compensation algorithm.

Referring to FIG. 26, a method for correlating original object data to modified object data is depicted. In accordance with the method, a plurality of test part object data is provided in step 1101 wherein each test part has different coordinates along the scanning (y) axis. In the example of FIG. 26, the test part object data is preferably time-based (e.g., CPU ticks). The time-based object data may be determined by mapping the object onto a build envelope (see FIG. 16(c)) to determine the scanning axis (y) locations at which a solidification energy source event occurs. Using an average scanning speed based on the total time required to scan one line along the entire build envelope in the scanning axis direction, the locations can be converted to time values. The time values may be converted to CPU ticks using the CPU speed (e.g., in MHz/sec). The time values are then supplied in data strings that are used to solidify a solidifiable material and form the test parts in step 1103. In step 1105, the actual scanning axis coordinates of each test part are measured.

Figure 16B:
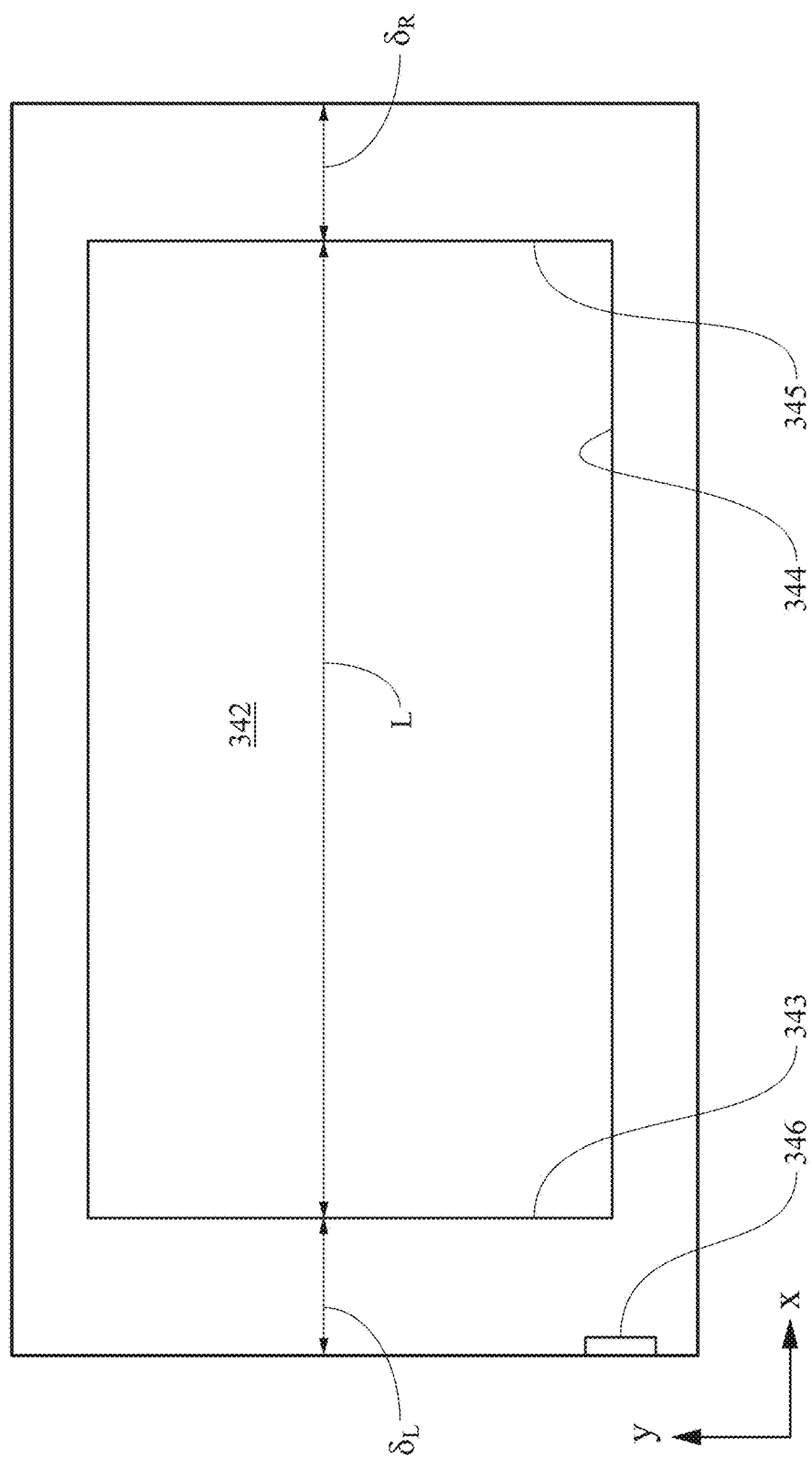
FIG. 16(b) is a top plan view of a source of solidifiable material comprising a build envelope and lateral offset regions.

Using known curve-fitting techniques, the scanning axis positions measured in step 1105 are correlated to the solidification energy source event data (e.g., CPU ticks) in step 1106. In one example, the following equation is obtained from such curve-fitting techniques:

$$f(t) = c_3 t^3 + c_2 t^2 + c_1 t + c_0 \quad \quad 3(b)$$

wherein, $f(t)$=scanning axis position (e.g., in mm) relative to scanning axis boundary 344 (FIG. 16(b));

$t$=time at which f is reached relative to the time at which the line scanning operation is at the scanning axis boundary 344 (FIG. 16(b)); and $c_0, c_1, c_2, c_3$=correlation coefficients (constants), where $c_3$ has units of mm/(CPU ticks)$^3$, $c_2$ has units of mm/(CPU ticks)$^2$, $c_1$ has units of mm/CPU ticks, and $c_0$ has units of mm.

In step 1108, any applicable correlation coefficients (e.g., $c_0, c_1, c_2, c_3$) are obtained, for example, by determining the value of each correlation coefficient that minimizes the sum of the square of the error in the correlation. In step 1110, the correlation from step 1106 is solved to obtain modified object data as a function of original object data and scanning axis position. This resulting correlation may then be stored on a computer readable medium and used in a set of computer executable instructions to obtain modified object data from original object data. In one preferred example, the original object data comprises sets of original solidification energy source event data items, each data item being a scanning axis coordinate f (relative to a scanning axis boundary such as boundary 344 in FIG. 16(b)) at which a solidification source energization event (e.g., activation or deactivation) occurs, and the modified object data comprises sets of modified solidification energy source event data items, each data item being a time (e.g., CPU ticks) when a solidification source energy event occurs, wherein the modified object data items are based on the correlation of step 1106. Thus, the method of FIG. 26 provides modified object data items, each of which is a function of a corresponding original object data item and its associated scanning axis location.

Figure 27:
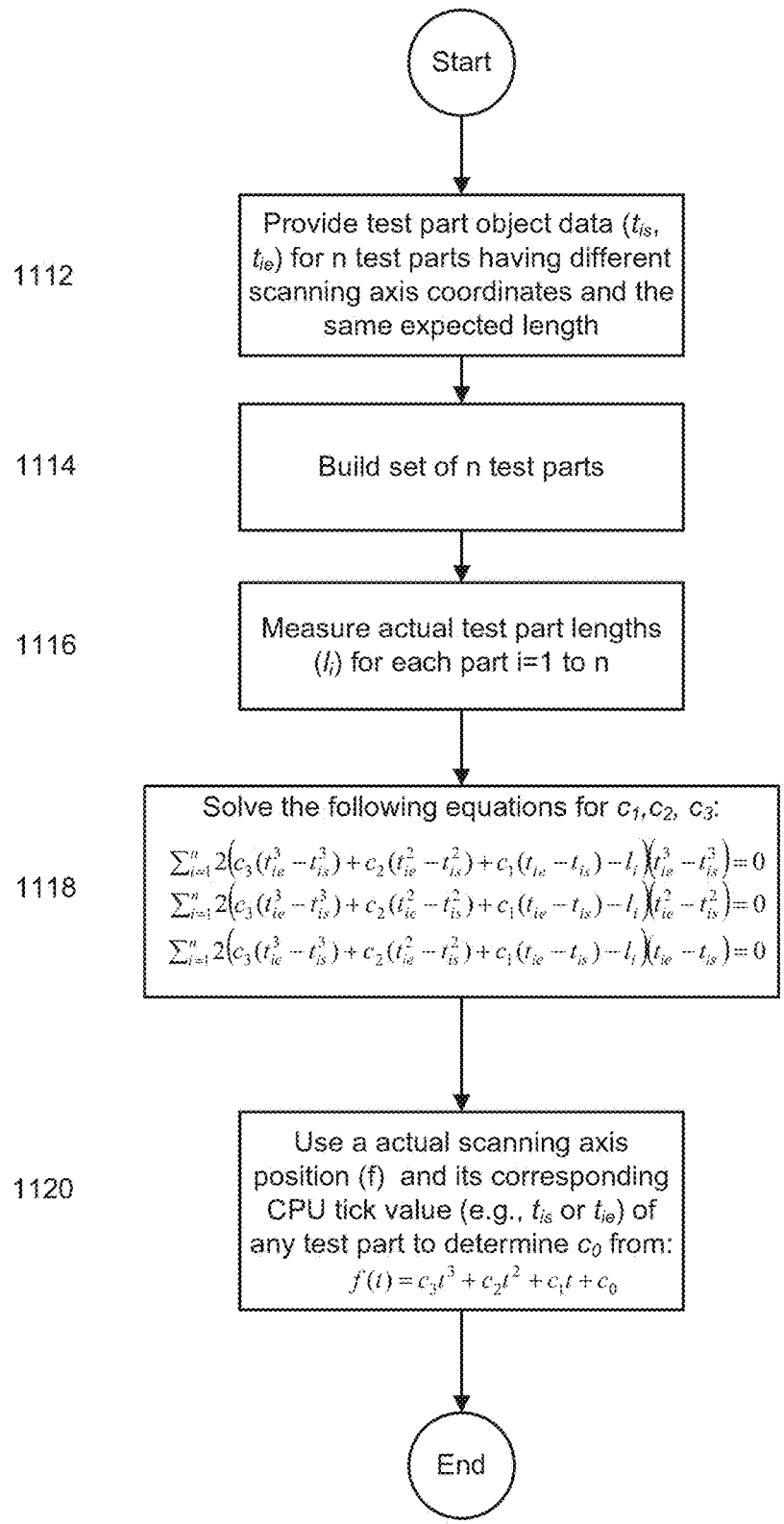
FIG. 27 is a flow chart used to illustrate a second method for providing a linear solidification device speed and/or energy variation compensation algorithm.

FIG. 27 is a flow chart depicting a specific implementation of the method of FIG. 26. In the method of FIG. 27, the correlation of equation 3(b) is used to correlate time-based solidification energy source event data (CPU ticks) to position based data (scanning axis position in mm). In accordance with the method, test part object data based on the desired shape and size of test parts is obtained in step 1112. The test part object data is provided for a plurality of n test objects having a unique test object index ranging from i=1 to n. In one example, the test parts are mapped on to a build envelope as shown in FIG. 29. Test parts $395_1$ to $395_n$ are preferably rectangular bars and map onto scanning axis coordinates that define an equal length for each test part. In the example of FIG. 29, the test parts are spaced apart along the x axis and have scanning axis coordinates that overlap with their adjacent neighbors. Thus, part 1 has an ending scanning axis coordinate (at which the solidification energy source is deactivated) that has a higher value than the beginning scanning axis coordinate for its immediate neighbor, part 2.

Using a known average scanning speed of the linear solidification device (determined as described previously), the scanning axis coordinates for each test part can be converted to CPU tick values at which scanning begins and ends for each part. Thus, for part 1 scanning begins at a CPU tick value of $t_{1s}$ and ends at a CPU tick value of $t_{1e}$. The CPU tick values are provided as data strings that each correspond to a cross-section (z-axis location) and an x-axis location, such as those shown in FIG. 16(d) or FIGS. 16(f) and 16(g). Using a linear solidification device of the type described previously, a solidifiable material is solidified to create the test parts (step 1114). In step 1116 the length $l_i$ of each test part is measured.

In step 1118, the correlation coefficients $c_0, c_1, c_2$, and $c_3$ are obtained by determining the value of each correlation coefficient that minimizes the sum of the square of the error in equation 3(b). For example, a total error F may be defined as follows:

$$F(c_3, c_2, c_1, c_0) = \Sigma_{i=1}^{n} (c_3(t_{ie}^3 - t_{is}^3) + c_2(t_{ie}^2 - t_{is}^2) + c_1(t_{ie} - t_{is}) - l_i)^2 \quad 3(c)$$

wherein, F=sum of squares of error (also referred to as the sum of squared errors of prediction (SSE)) in mm;

$t_{ie}$=solidification energy source deactivation time for the test part (e.g., CPU ticks);

$t_{is}$=solidification energy source activation time for the test part (e.g., CPU ticks);

$l_i$=measured length of test part;

$c_0, c_1, c_2, c_3$=correlation coefficients, where $c_3$ has units of mm/(CPU ticks)$^3$, $c_2$ has units of mm/(CPU ticks)$^2$, $c_1$ has units of mm/CPU ticks, and $c_0$ has units of mm; and i=test part index (ranging from 1 to n test parts)

The partial derivative of equation 3(c) with respect to each correlation coefficient may be set equal to zero to develop a system of three equations that can be solved to obtain $c_1, c_2,$ and $c_3$:

$$\frac{\partial F}{\partial c_3} = \sum_{i=1}^{n} 2(c_3(t_{ie}^3 - t_{is}^3) + c_2(t_{ie}^2 - t_{is}^2) + c_1(t_{ie} - t_{is}) - l_i)(t_{ie}^3 - t_{is}^3) = 0 \quad 3(d)$$

$$\frac{\partial F}{\partial c_2} = \sum_{i=1}^{n} 2(c_3(t_{ie}^3 - t_{is}^3) + c_2(t_{ie}^2 - t_{is}^2) + c_1(t_{ie} - t_{is}) - l_i)(t_{ie}^2 - t_{is}^2) = 0 \quad 3(e)$$

-continued $$\frac{\partial F}{\partial c_1} = \sum_{i=1}^{n} 2(c_3(t_{ie}^3 - t_{is}^3) + c_2(t_{ie}^2 - t_{is}^2) + c_1(t_{ie} - t_{is}) - l_i)(t_{ie} - t_{is}) = 0 \quad 3(f)$$

Once correlation coefficients $c_1$, $c_2$, and $c_3$ are obtained, they can be used with equation 3(b), the known starting or ending scanning axis coordinate f and the corresponding solidification energy source event data (e.g., $t_{ie}$ or $t_{is}$) values of any test part to obtain $c_0$ (step 1120).

Figure 28:
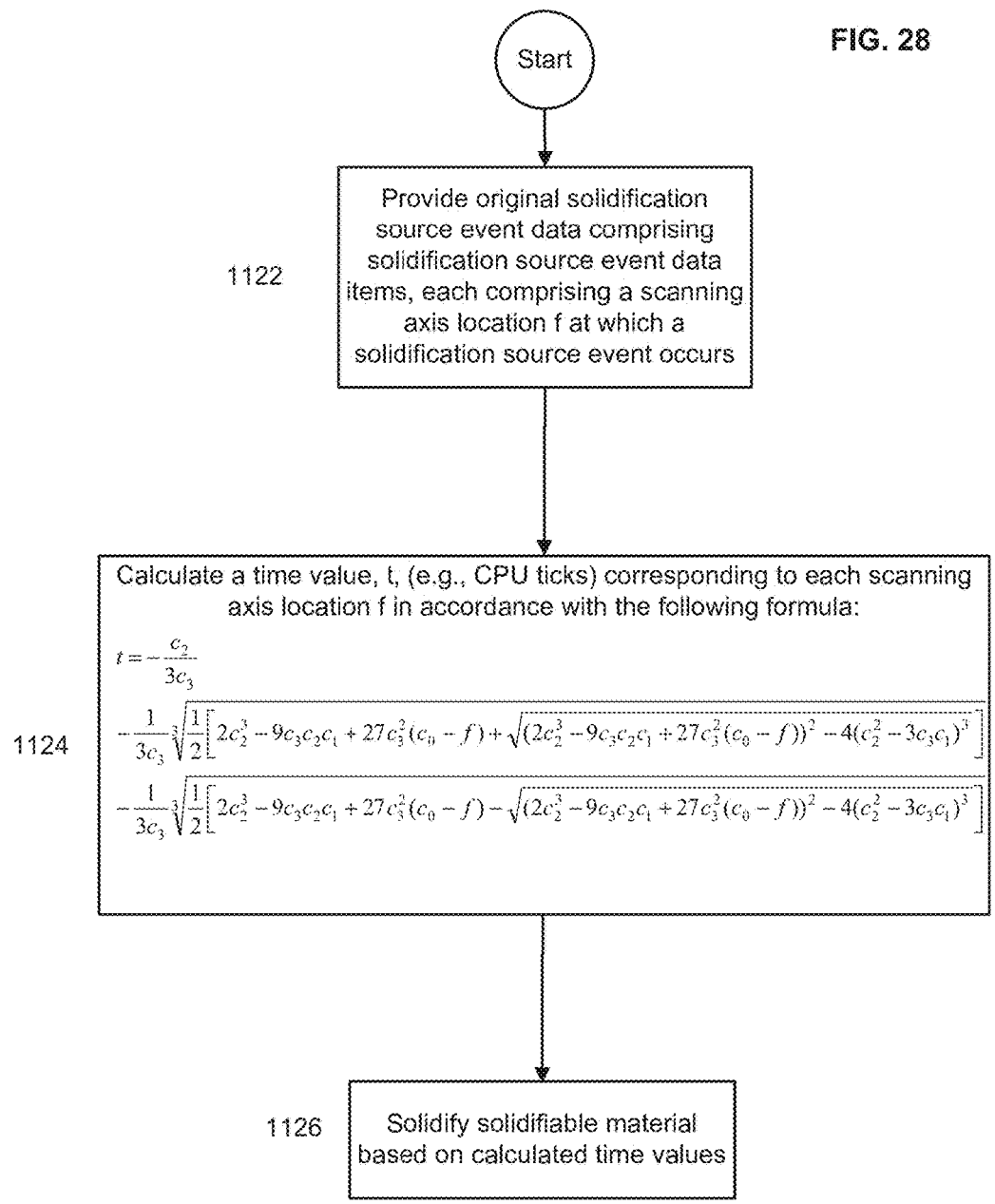
FIG. 28 is a flow chart used to illustrate a method of making a three-dimensional object from a solidifiable material using modified solidification energy source event data to compensate for variations in linear solidification device speed as a function of scanning axis position.

Referring to FIG. 28, a method of converting original object data to modified object data to compensate for variations of scanning speed as a function of scanning axis position is described. In accordance with the method, original solidification energy source event data is provided which comprises a plurality of solidification source event data items. A plurality of modified solidification energy source event data items are calculated wherein each modified solidification energy source event data item is calculated based on a corresponding original solidification energy source event data item and the scanning axis position (relative to a scanning axis border) with which the original solidification energy source event data item is associated. The solidifiable material is then solidified based on the modified solidification energy source event data items.

For example, a set of original object data strings may be provided in step 1122 for each cross-section of a three-dimensional object corresponding to a particular build (z) axis location, wherein each data string corresponds to a particular x-axis location. Each set of data strings may correspond to a strip oriented along the scanning axis, as illustrated in FIG. 16(c). In one example, each data string includes one or more items that are indicative of a solidification energy source event. Thus, for example, in one original object data string a scanning axis position coordinate of 15 mm may indicate a position at which the solidification energy source is activated to begin solidification, and an adjacent scanning axis position coordinate of 45 mm may indicate a position at which the solidification energy source is deactivated.

In step 1124 each scanning axis position coordinate (f) is converted to a CPU tick value (t) using the following equation, which is equation 3(b) rearranged to solve for t:

$$t = -\frac{c_2}{3c_3} - \frac{1}{3c_3}\sqrt[3]{\frac{1}{2}\left[2c_2^3 - 9c_3c_2c_1 + 27c_3^2(c_0 - f) + \sqrt{(2c_2^3 - 9c_3c_2c_1 + 27c_3^2(c_0 - f))^2 - 4(c_2^2 - 3c_3c_1)^3}\right]} - \frac{1}{3c_3}\sqrt[3]{\frac{1}{2}\left[2c_2^3 - 9c_3c_2c_1 + 27c_3^2(c_0 - f) - \sqrt{(2c_2^3 - 9c_3c_2c_1 + 27c_3^2(c_0 - f))^2 - 4(c_2^2 - 3c_3c_1)^3}\right]} \quad 3(g)$$

wherein, f=scanning axis position relative to the scanning axis build envelope boundary 344 (FIG. 16(b)) based on part data;

t=modified solidification energy source event data in CPU ticks that compensates for variable speed of scanning as a function of scanning axis position; and $c_0$, $c_1$, $c_2$, and $c_3$=correlation coefficients.

In a preferred example, an apparatus for making a three-dimensional object is provided which includes a linear solidification device, a controller, and a computer readable medium having computer executable instructions programmed thereon for receiving original object data and calculating modified object data items based on original object data items using equation 3(g) or another suitable correlation. The linear solidification device is preferably configured similarly to device 88, and the controller is preferably operatively connected to the solidification energy source of the linear solidification device to selectively activate and deactivate the solidification energy source based on the modified object data determined by equation 3(g).

Correlations other than that of equation 3(g) may be used to compensate for variations in scanning speed and/or scanning energy density along the scanning axis. In another embodiment, the data values indicative of changes in the energization state (e.g., the number of CPU ticks as exemplified in FIGS. 16(d), (f), and (g)) are adjusted based on their corresponding distance from the center point of the linear solidification device 88). In one implementation, the string data at any string index value n is adjusted as follows:

$$\text{New } CPU \text{ ticks} = \text{Old } CPU \text{ ticks} + \Delta CPU \text{ ticks}*C \quad 3(h)$$

wherein, $\Delta$CPU ticks is calculated by subtracting Old CPU ticks from the center point CPU ticks, and C is a dimensionless constant. The variable "center point CPU ticks" refers to the number of CPU ticks at which the solidification energy will strike the center point. In general, it will correspond to the mid-point of a full scan line along the scanning axis direction.

Thus, in equation 3(h), the values of old CPU ticks comprise original object data items, and the values of new CPU ticks comprise modified object data items. Equation 3(h) may also be modified for use with linear distances before they are converted to CPU ticks. For example, referring to FIG. 15, a three-dimensional object may be sliced into a plurality of slices such as 302i where i ranges from 1 to the maximum number of slices n. A given slice may be projected onto the build area as shown in FIG. 16(c). Each scan line 304j will have locations that define a distance relative to a reference location along the scanning axis direction (e.g., border 344 where y=$y_0$) where the energization state of the solidification energy source 90 changes. The center point may also be defined relative to the same reference location. For each location along the x axis, there will be a plurality of y-axis values (relative to $y_0$ border 344) at which the energization state changes. For each strip shown in FIG. 16(c), the energization state will change twice. Thus, for a given position along the x-axis, each scanning (y) axis value at which the solidification energy source energization state changes may be corrected to account for the scanning (y) axis variation in solidification energy scanning speed as follows:

$$y_{new} = y_{old} + (y_{center\ point} - y_{old})*C \quad 3(i)$$

wherein, $y_{old}$ is a y-axis position relative to the y-axis reference location (e.g., border 344 in FIG. 16(c)) at which the energization state changes as determined by placing (mathematically or graphically) a slice 302i of the three-dimensional object onto a build envelope;

$y_{center\,point}$ is the location of the center point relative to the y-axis reference location (e.g., border 344 in FIG. 16(c));

$y_{new}$ is the new, corrected y-axis value at which the energization state changes; and C is a dimensionless constant.

The values of $y_{new}$ may then be converted to CPU ticks to define the string data for solidification. In equation 3(i) the $y_{old}$ values comprise original object data items, and the $y_{new}$ values comprise new object data items.

The value of the dimensionless constant C may be determined by trial and error. In one example, a plurality of linear sections are solidified along a direction that is substantially perpendicular to the scanning (y) axis direction, e.g., along the x-axis direction. The string data on which the linear sections are based are such that each line is equally spaced apart from its neighbors. In the case of a data string that reads String (n)=(FFFFFF, n, 10000, 10500, 11500, 12000, 22000, 22500, 32500, 33000, 43000, 43500), each linear section would be expected to have a scanning axis thickness corresponding to 500 CPU ticks and equal spacings between linear sections equal to 1000 CPU ticks. If the scanning speed varies along the scanning (y) axis direction, the actual solidified linear sections will not be spaced apart by equal amounts as the object data would otherwise dictate. For example, where the scanning speed is faster at the ends of the scan line relative to the center point, the spacings between adjacent linear sections will increase as you move along the y-axis away from the center point (in either the positive or negative y-axis direction). C can be calculated by ratioing the distances between any two adjacent strings (and/or by averaging the ratios of adjacent neighbors) or by making adjustments to C and repeating the solidification process until the spacings between linear sections are substantially equal.

Thus, in one method of making a three-dimensional object, a three-dimensional object is sliced into adjacent slices along a build axis (e.g., as shown in FIG. 15). Each slice is then subdivided into a set of linear strips, each extending along the scanning direction (e.g., the y-axis). A center point is determined by determining the position along the scanning axis direction at which the distance between solidification energy deflected by the rotating energy deflector 92 and the solidifiable material is a minimum. In one variation, each strip is then converted to a set of scanning axis values (which may be, for example, linear distances relative to a build envelope border or CPU tick values) at which the solidification energy source 90 energization state changes. Each scanning axis value is then corrected to account for the variation in scanning speed along the scanning axis, preferably by an amount that varies with the distance between the location of the scanning axis value along the scanning axis and the center point, such as by using equation 3(h). The corrected scanning axis values are then used by the microcontroller to perform the solidification process. In another variation, the set of linear strips is converted into CPU ticks and then corrected, such as by using equation 3(i).

Figures 16D, 16E:
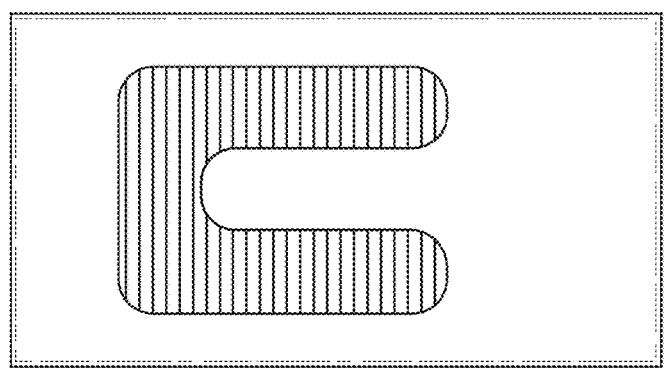
FIG. 16(d) is a table depicting exemplary sets of data strings which correspond to the object cross-sectional strip data of FIG. 16(c)
FIG. 16(e) is an exemplary depiction of object cross-sectional strip data mapped onto a build envelope used to illustrate a method of making adjacent layers of a three-dimensional object using a linear solidification device.

In many three-dimensional object building processes, there will be several adjacent layers that are identical and which therefore can be represented by identical object layer data. Referring to FIG. 16(e), object layer data is depicted in graphical form which may be used to form several layers. In certain cases it is preferable to perform line scanning operations both when linear solidification device 88 is moving from left to right and from right to left along the x-axis. This presents no problem when the object is symmetrical about the mid-line of the x-axis direction. However, when multiple identical asymmetrical layers are formed, the microcontroller unit must read the string data sets in the opposite order when the linear solidification device 88 is moving in opposite directions. For example, the table of FIG. 16(f) depicts multiple sets of string data which correspond to the object layer data of FIG. 16(e). When moving linear solidification device 88 from left to right, the first set of string data at which solidification occurs has a string index of n=20 and a computer memory index value m of zero. The last set of string data at which solidification occurs has a string index of n=60. When linear solidification device 88 reverses direction to go from right to left it cannot perform the solidification starting with computer memory index m=0 and data string index n=20 because that data was defined for the left hand side of FIG. 16(e), not the right hand side. Thus, performing line scanning operations based on such data would solidify a pattern that is the reverse of the desired pattern. The microcontroller unit or host computer could calculate and store full sets of data strings for the right to left direction based on the data generated for the left to right operation. However, this operation would consume excessive memory and processor capacity.

In one method of operation, the data for adjacent identical layers is inverted by the host computer and transmitted to the microcontroller unit. In accordance with the method, identical three-dimensional object layer data corresponding to first (even) and second (odd) adjacent layers of solidifiable material used to form the three-dimensional object is provided. The object layer data is subdivided into respective first and second pluralities of object cross-section strips, wherein each object cross-section strip in the first plurality of object cross-section strips has a set of strip data and a strip index value n(even) ranging from 0 to the maximum index value of $N_{max}-1$ in the first plurality of object cross-section strips. Each strip in the second plurality of object cross-section strips has a set of strip data and a corresponding strip index value n(odd), and the strip data corresponding to each respective value of n(odd) for the second plurality of object cross-section strips equals the strip data for the first plurality of object cross-section strips that corresponds to the string index value n(even) equal to $N_{max}-1$ minus the respective value of n(odd). As each odd layer is solidified, the host computer can simply identify the correct even layer data string that corresponds to each odd layer data string and transmit the even layer data string to the microcontroller, thereby avoiding the need to store a set of odd layer data strings. The use of this inversion technique allows data for multiple layers that are solidified in opposite directions to be determined by creating object layer data for only one layer and either inverting (for layers solidified in the opposite x-axis direction) it or using it (for layers solidified in the same x-axis direction) for all subsequent layers having the same cross-sectional shape.

An exemplary inversion used to reduce the storage capacity of a computer readable medium required to store three-dimensional object data corresponding to a plurality of object layers may be described as follows: A first set of object layer data is stored on a computer readable medium. The first set of object layer data comprises a first set of data strings such as those depicted in FIGS. 16(d), (f), and (g). Each data string in the first set may be represented as d(0, m), wherein 0 indicates that the string belongs to the first set, and m is a computer memory index value unique to the string. The index values m range from 0 for the first data string to $M_{max}$ (or $M_{total}$). The highest index value will be $M_{max}-1$ (because the first value is zero).

A program is stored on the computer readable medium (which may be the same or different as the one on which the first set of object layer data is stored) with instructions for calculating a second set of data strings for a second set of object layer data. The layers to which the first and second sets of object data correspond are preferably adjacent one another and define an alternating layer sequence (first set, second set, first set, second set, etc.). The string data for the second set of object layer data may be calculated using the following equation or using any set of equations such that the string data for the second set of object layer data corresponds to that of the first layer of object data in accordance with the following equation:

$$d(1,m)=d(0,M_{max}-1-m) \quad (4)$$

wherein, $d(1,m)$ is the string data for layer 1 at a given value of the computer memory index, m.

Using equation (4), the host computer can simply identify the data string for the $0^{th}$ layer that corresponds to each data string for the $1^{st}$ layer and transmit it to the microcontroller. Neither the host controller nor the microcontroller need store the $d(1,m)$ strings in memory. As mentioned previously, each location along the x-axis direction of build envelope 342 may uniquely correspond (directly or indirectly) to a string index n. The computer memory index is used to avoid storing data strings that are empty because the correspond to locations where solidification will not take place. However, the data strings for the entire build envelope can be related to one another using an equation similar to equation 3a by replacing m with the string index n and replacing $M_{max}$ with the maximum number of data strings for the build envelope, $N_{total}$.

The foregoing data inversion technique is illustrated in FIGS. 16(*f*) and (*g*). In the example, $N_{max}$ (as may be calculated by equation (1)) is 101 and the string indices range from 0 to $N_{max}-1$ (i.e., 0 to 100). Thus, when solidifying from right to left (FIG. 16(*g*)) along the x-axis the set of string data for the odd layer having a string index of 40 (starting from n=0 at the right-hand build envelope boundary 345 in FIG. 16(*b*)) is the same as the set of string data used for the even layer string having the string index n=100−40=60. Thus, the string indices are always started at zero at both the left and right hand boundaries, but the inversion of the sets of string data by the host computer as reflected in FIGS. 16(*f*) and 16(*g*) avoids the need for recalculating new string data for the odd layer from the object data. Instead, the even layer data can simply be inverted and supplied to the microcontroller unit. In another example, the inversion process can be handled based on the computer memory index value m instead of the string index value n using equation (4). Thus, for example, when solidifying the odd layer (going from right to left) the string data for m=1 can be calculated by taking the even layer data at m=$M_{max}-1-m$(odd)=39 ($M_{max}$ is the total of computer index values, which is 41, not the maximum index value which is 40). This latter technique avoids the need to read string data for strings at which no solidification occurs and instead requires reading only those strings at which there is solidification, which by definition are those assigned a computer memory index value m.

As mentioned previously, in certain implementations of the systems described herein a motor movement parameter such as a number of motor steps is used to indirectly indicate when the linear solidification device 88 is at an x-axis location corresponding to a particular linear scan or string data index, n. For a desired index value, n, the number of steps from the relevant build envelope x-axis boundary, 343 or 345, can be calculated using the following formula:

$$\text{Steps}=W(S)(n)(\text{RPM})(F)/60 \quad (5)$$

wherein, Steps is the number of motor steps from the build envelope x-axis boundary to the location at which the line scan having the index value n is performed;
W is a ratio of motor steps for motor 76 per unit length in the x-axis direction in steps/mm;
S is the speed of the motor 76 in mm/second;
RPM is the rotational frequency of the rotating energy deflector in revolutions per minute; and
F is the number of facets on the rotating energy deflector.

The variable W can itself be considered a "motor movement parameter" since it depends on a number of motor steps. As indicated previously, W can be estimated from known mechanical relationships between the rotational speed and gear ratio of motor 76 and the pulley diameters 82*a* and 82*b*. One method of estimating W is to determine the number of estimated steps required to traverse the x-axis length L of build envelope 342 based on such known mechanical relationships. However, due to thermal effects and other non-idealities, the estimated value of W may not be accurate. In cases where solidification is performed bi-directionally with respect to the x-axis (starting from the build envelope boundaries 343 and 345), the error in W can cause misalignment between odd and even layers because the calculated number of steps will not correspond to the desired x-axis location believed to correspond to the value of n used in equation (5). For example, if a build process is started from the left to right direction along the x-axis direction, and W is too high, a given value of n will cause solidification to occur farther to the right than desired. As a result, the right-most boundary of the part will be farther to the right than desired. If solidification is then reversed (right to left), the number of steps corresponding to a given value of n will be shifted farther to the left than desired. Thus, when the resulting part is viewed from the same orientation as the one in which it was built (i.e., with the side that was the left side during formation positioned to the left of the side that was the right side during formation), the portions of the part that were solidified in the left to right direction will have a right hand border that is shifted to the right relative to the portions of the part that were solidified in the left to right direction. The left hand border of the portions of the part solidified in the right to left direction will be shifted to the left relative to those solidified in the left to right direction. Conversely, if solidification starts from left to right and W is too low, when viewing the resulting part in the same orientation as the one in which it was built, the right-hand border of the portions solidified in the left to right direction will be shifted to the left relative to the portions solidified in the right to left direction, and the left-hand border of the portion solidified in the left to right direction will be shifted to the when solidifying from right As a result, in certain implementations it is desirable to adjust the motor movement parameter (e.g., W) based on test part measurement data. The test part measurement data may comprise the length of an offset dimension or gap between two or more sections of the test part. In certain cases where the data inversion method illustrated in FIGS. 16(*f*) and (*g*) is used, an offset is created between those sections of identical layers which are solidified in opposite directions along the x-axis. The offset is then used to adjust the value of W.

Figure 25A:
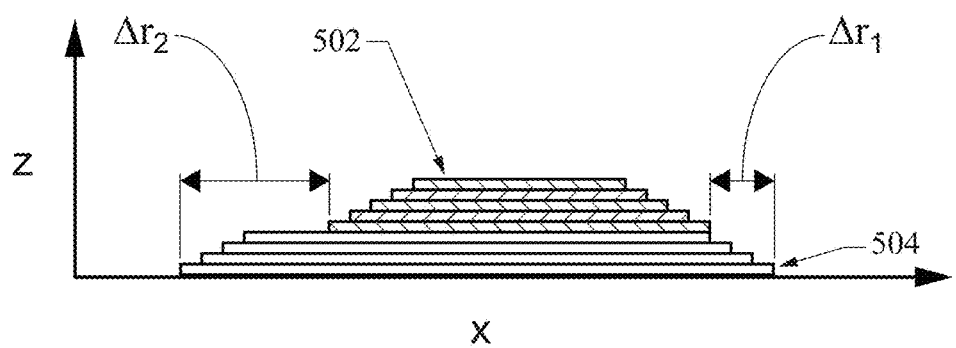
FIG. 25(a) is a view along the scanning (y) axis of a hemispherical test part used to adjust a motor movement parameter in a system for making a three-dimensional object from a solidifiable material in a closed housing configuration.

One method of preparing a test part for use in determining the adjustment of the motor movement comprises forming a first series of layers of the test part by moving linear solidification device 88 in a first direction along the x-axis (e.g., left-to-right) and performing linear scan operations in the scanning axis (y-axis) direction. A second series of layers is then formed by moving linear solidification device 88 in an x-axis direction opposite the one used to form the first set of layers (e.g., right-to-left) and performing linear scan operations in the scanning axis (y-axis) direction. The test part may have a variety shapes, but in certain examples a simple rectangular block shape is used. In other examples, and as illustrated in FIGS. 25(*a*) and 25(*b*), a hemispherical test part shape is used. In the formation of the test part, an initial value of the motor movement parameter is specified which is believed to yield the correct build envelope 342 length in the x-axis direction. In one preferred example, the motor movement parameter is a number of motor steps for motor 76 that is estimated to correspond to the known length L of build envelope 342. From this data, a predicted value of W can be calculated.

As indicated by equation (5), if the motor movement parameter is in error, the predicted value of W will also be in error, which in turn will cause the number of motor steps (Steps) calculated from equation (5) to be in error. The effects of such an error in W can be exemplified by referring again to the data of FIG. 16(*f*). If a test part is built using that data, the first series of layers will all use the data of FIG. 16(*f*) and will be formed in the left to right direction along the x-axis. The second series of layers will be formed in the right to left direction along the x-axis. As the data indicates, for the left to right layers, the first linear scan going from the left to right direction will be performed at string index value n of 20. If the predicted value of W is greater than the actual value, the first linear scan will be offset farther to the right from the left hand build envelope boundary 343 than desired, as will all of the subsequent linear scans. As a result, all of the left to right (even) layers will be shifted to the right relative to the desired position. When solidification direction is reversed and the data of FIG. 16(*g*) is used, the first string at m=0, n=40 will be offset farther to the left from the right-hand build envelope boundary 345 than desired. Thus, when the test part is complete and viewed from the same orientation as its build orientation, the first set of layers formed in the left to right direction will be shifted to the right relative to the second set of layers formed in the right to left direction. The shift will produce a measurable offset dimension.

The test part's measured offset dimension can then be used to correct the value of W used by the microcontroller in accordance with equations (6)-(8):

$$\text{Step Offset} = \Delta L \ast W \quad (6)$$

$$\text{Corrected Build Envelope Length in Steps} = \text{Steps (Predicted)} + \text{Step Offset} \quad (7)$$

$$W_{corrected} = \text{Corrected Build Envelope Length in Steps}/L \quad (8)$$

wherein, $\Delta L$ is the measured offset dimension (mm) between the first and second sets of test part layers, and a positive value of $\Delta L$ indicates that the left to right layers are offset to the left relative to the right to left layers, while a negative value of $\Delta L$ indicates that the right to left layers are offset to the right relative to the right to left layers;
W is the original, predicted value of W (steps/mm);
L is the build envelope length (mm);

Steps (Predicted) is the original number of steps predicted to correspond to build envelope length L based on motor rotation frequency, gear ratio, and pulley diameter, which equals W*L, where L is the build envelope length in mm; and $W_{corrected}$ is the corrected value of W The value of $W_{corrected}$ can then be used with equation (6) in subsequent part building processes. The foregoing relationships can be generalized with respect to the build directions as follows: If solidification occurs in a first series of layers in a first direction and a second series of layers in a second direction (opposite the first direction), when viewing the part in an orientation (the viewing orientation) that is the same as the one in which it was built (the formation orientation) a value of W that is too low will cause the first set of layers to be shifted in the second direction relative to the first set of layers, and the value of $\Delta L$ used in equation (7) will be positive. Conversely, if the value of W is too high, the first set of layers will be offset in the first direction relative to the second set of layers, and the value of $\Delta L$ in equation (7) will be negative.

The relationship between the "viewing orientation" and the "formation orientation" can best be understood with an example. Each layer will be solidified by forming a series of linearly cured sections starting from a build envelope origin and ending at a build envelope terminal point. A formation orientation can be selected by selecting an arbitrary coordinate system which will then define a direction going from the origin to the terminal point, such as the "positive x-axis direction" or "left to right." The "viewing orientation" used to measure the offset $\Delta L$ should then be the same as the formation orientation, such that when viewing the object the portion of the solidified object at which solidification began (the origin) has the same directional relationship to the portion of the solidified object at which solidification ended (the terminal point).

In certain examples, $\Delta L$ is measured using a caliper with a minimum measurement capability of 50 microns. In such cases, offset values $\Delta L$ of less than 50 microns cannot be measured, and layers formed in one direction may be offset from those formed in the other direction by up to 50 microns. In some cases, it may be desirable to increase the accuracy of the part building process by measuring smaller offset values $\Delta L$ and adjusting a motor movement parameter (e.g., W) accordingly. One method suitable for this purpose will now be described with reference to FIGS. 25(*a*) and 25(*b*). In accordance with the technique, a generally hemispherical test part is built. A first set of layers 504 is formed by solidifying the resin only when solidification energy device 88 moves in a first (positive) direction along the x-axis (FIG. 16(*b*)). A second set of layers 502 is then formed by solidifying the resin only when solidification energy device 88 moves in a second (negative) direction opposite to the one used to form the first set of layers 504. In FIG. 25(*a*), the layers 502 and 504 are viewed by looking in a direction perpendicular to the x-z plane (i.e., along the scanning or y-axis).

Figure 25B:
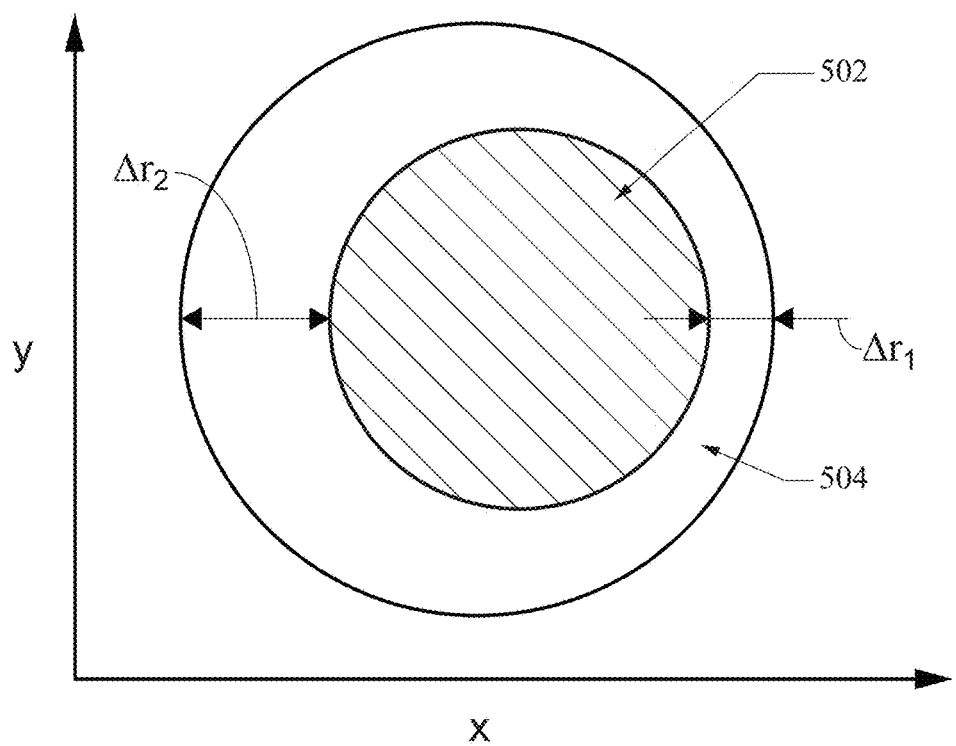
FIG. 25(b) is a view along the build (z) axis of the test part of FIG. 25(a)

In accordance with the method, the completed test part is then placed under a microscope and viewed along the z (height) axis such that the points of origin of the layers are in the same relative positions along the x-axis as during the formation process (i.e., the points of origin of section 502 are farther out in the positive x-axis direction than the points of origin of section 504). Two circular sections 502 and 504 will be visible. If the motor movement parameter W is in error, the inner circle 502 will not be concentric with the outer circle 504, although their diameters parallel to the x-axis should be substantially co-linear. In such cases, two offsets, $\Delta r_1$ and $\Delta r_2$, may be measured between the x-axis extremes of each circular section 502 and 504. As shown in FIG. 25(b), the x-axis location of section 502 that is farthest from the scanning (y) axis may be subtracted from the x-axis location of section 504 that is farthest from the scanning (y) axis to yield $\Delta r_1$. The x-axis location of section 504 that is closest to the y-axis may be subtracted from the x-axis location of section 502 that is closest to the y-axis to yield $\Delta r_2$. If the motor movement parameter is correctly set, the value of $\Delta r_1$-$\Delta r_2$ will be zero (or substantially zero). However, if the motor movement parameter is incorrectly set, $\Delta r_1$-$\Delta r_2$ will be non-zero. As mentioned above, in the example of FIGS. 25(a) and 25(b) section 504 is formed only while solidification energy device 88 moves in the positive x-axis direction, and section 502 is formed only while solidification energy device 88 moves in the negative x-axis direction. The negative value of $\Delta r_1$-$\Delta r_2$ indicates that the motor movement parameter (e.g., W) was set too low. Thus, by building additional test parts with increased values of W, the correct value (the one that yields $\Delta r_1$=$\Delta r_2$) can be determined and input into the microcontroller for actual (non-testing) part builds. Equations (6)-(8) may be used to calculate a corrected value of the motor movement parameter ($W_{corrected}$) by substituting $\Delta r_1$-$\Delta r_2$ for $\Delta L$.

Referring again to FIG. 5C, embodiments of a method for synchronizing a timer to the position of a scan line within the build envelope 342 will now be described. The method comprises activating a solidification energy source, such as source 90, which is in optical communication with a scanning device, such as a rotating energy deflector 92 or a linear scanning micromirror. The scanning device deflects solidification energy received from solidification energy source 90, and the deflected solidification energy is received by a solidification energy sensor, such as sensor 324. In certain examples, a mirror such as mirror 332 is provided to facilitate the transmission of deflected solidification energy from the scanning device to sensor 324.

In accordance with the method, the solidification energy sensor senses the receipt of solidification energy and generates a sensing signal that is transmitted to a system microcontroller. The sensor's receipt of the solidification energy corresponds to the beginning of a line scanning operation. A timer is then initialized to a specified value (e.g., zero) based on the receipt of solidification energy by the sensor.

An example of the foregoing synchronization method will be described with reference to FIG. 5C. As illustrated in the figure, in certain examples, a solidification energy sensor 324, such as a light sensor, may be used to determine the y-axis location of solidification energy supplied by linear solidification energy device 88. In one example, a solidification energy sensor 324 is in optical communication with rotating energy deflector 92 to receive solidification energy deflected therefrom. In another example, the solidification energy sensor 324 is located at one end of housing 96 to indicate when solidification energy projected in the y-axis direction has reached its end or beginning of travel in the y-axis direction. In accordance with the example, the solidification energy sensor 324 is positioned at a location that corresponds to a maximum solidification energy position in the second direction (i.e., at a location corresponding to the end of travel in the y-axis direction). However, the sensor 324 can be located at other positions, but is preferably at a location at which the length of solidification energy travel between sensed events is known. In FIG. 5C, the location of mirror 332 and sensor 324 along with the depicted clockwise rotational direction of rotating energy deflector 92 cause the sensing of solidification energy by sensor 324 to correspond to the beginning of a linear scanning operation.

In accordance with such examples, a processor operatively connected to a clock (i.e., a CPU clock) receives the solidification energy sensor signals from sensor 324 and a timer operating on the clock units is synchronized to them, allowing an elapsed time between sensed solidification energy pulses to be calculated. The y-axis maximum scan length (e.g., the length of opening 100 or a measured length of solidification energy travel in the y-axis direction) is determined, and the speed of solidification energy beam travel in the y-axis direction is calculated by dividing the maximum y-axis length of travel by the elapsed time between pulses:

$$s = 1/\Delta t_{max} \quad (9)$$

wherein, s=speed of solidification energy beam travel in the y-axis direction (e.g. cm/sec);
l=maximum length of travel (e.g., cm); and
$\Delta t_{max}$ =elapsed time between sequential sensed solidification energy signals generated by solidification energy sensor (e.g., sec).

By synchronizing the clock to the sensor's receipt of solidification energy and using the last speed value (or a suitable averaged value), the position of the solidification energy beam in the y-axis direction can be calculated:

$$y = s\Delta t \quad (10)$$

wherein, y=y-axis position of solidification energy beam along solidifiable material relative to the y-axis starting point (e.g., cm);
s=speed of solidification energy beam travel from formula (1);
and
$\Delta t$=elapsed time from last solidification energy signal from sensor.

A linear solidification controller (for example, as implemented in a microcontroller unit) operatively connected to solidification energy source 90 can selectively activate and deactivate solidification energy source 90 to cause solidification energy to be supplied only when linear solidification device 88 is at an x, y location on the solidifiable material that corresponds to a point on one of the strips $304_j$ shown in FIG. 16. Using formulas (9) and (10), the linear solidification controller can receive data indicative of the y-axis position of solidification energy. A linear encoder may provide the linear solidification controller with x-axis location information (for linear solidification energy device 88), allowing the controller to determine the desired y-axis profile at the determined x-axis location from object data such as that in FIG. 16(a). As mentioned previously, the object layer data may also be converted to a plurality of sets of data strings such that each plurality corresponds to a given layer and position along the build axis (z-axis). In accordance with such examples, each set of data strings includes a plurality of time values, each of which defines a time at which the energization state of the solidification energy source 90 is changes. Preferably, the time values are defined relative to a zero time that is reset upon the receipt of a synchronization solidification energy generated when sensor 324 receives solidification energy, as also discussed previously. As mentioned earlier, in certain examples, the zero time of a CPU counter is set at the leading edge 1104a of the synchronization sensor signal received by sensor 324 (FIG. 24).

Referring again to FIG. 16(a), each strip $304_j$ corresponds to a continuous region of solidification in the y-axis direction. However, depending on the object being built, this may not be the case. Certain of the strips $304_j$ may be discontinuous, thereby defining unconnected sections along the y-axis for a given x-axis location. In certain examples a solidification energy modulator (such as a laser diode modulator in the case of a laser diode solidification energy source 90) is provided to selectively activate solidification energy source 90. In other examples, the solidification energy source 90 remains constantly activated and the transparency of selected locations on a flexible mask is manipulated to allow solidification energy to pass through to locations on the solidifiable material where solidification is desired.

Figure 21:
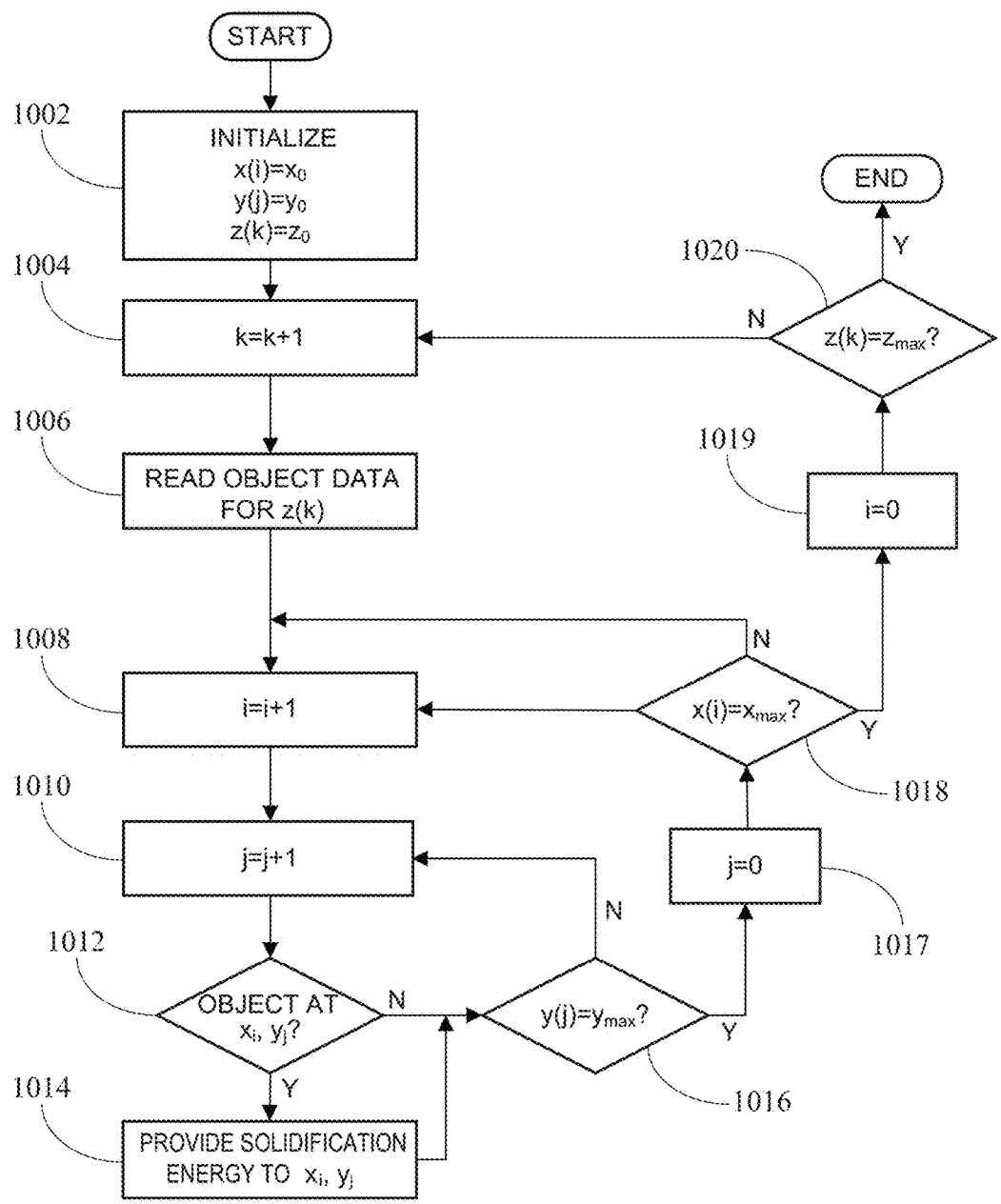
FIG. 21 is a flow chart used to illustrate a method of making a three-dimensional object from a solidifiable material using a linear solidification device.

Referring to FIG. 21, a method of forming a three-dimensional object using a linear solidification device such as linear solidification device 88 will now be described. In a preferred embodiment, the method is embodied in a set of computer readable instructions on a computer readable medium which can be executed by a computer processor.

In accordance with the embodiment, at the start of an object build process, the x, y, and z positions are initialized to their starting positions with their indices i, j, and k set to 0, i.e., $x_0$, $y_0$, and zo (step 1002). In step 1004 the z-axis index (k) is incremented by one and object data for the first object slice at z(1) is read (step 1006). The x-axis index (i) is then incremented by one in step 1008 and the y-axis index (j) is incremented by 1 (steps 1008 and 1010). In step 1012, it is determined whether the x(i), y(j) location on the exposed surface of the solidifiable material corresponds to a region of the object (i.e., a location where solidification is desired based on the object data). If it does, solidification energy is provided to the location in step 1014. As explained previously, in certain implementations, step 1014 involves selectively activating or deactivating solidification energy source 90. In other implementations, step 1014 involves selectively activating location x(i), y(j) on a flexible mask to allow or prevent solidification energy to pass therethrough as the solidification energy source 90 remains continuously activated.

If the determination made at step 1012 indicates that no solidification is to occur at the x(i), y(j) location on the surface of the solidifiable material, control passes to step 1016 where it is determined whether the maximum y-axis position (i.e., the boundary of the build envelope in the y-axis direction) has been reached. If it has not been reached, the y-axis position index (j) is incremented by one, and control returns to step 1010. If the maximum y-axis position has been reached, control transfers to step 1017 at which the y-axis index (j) is reset to 0. In step 1018, it is determined whether the maximum x-axis position (i.e., the boundary of the build envelope in the x-axis direction) has been reached. If it has not, control transfers to step 1008, where the x-axis index is incremented by one. If the maximum x-axis position has been reached, control transfers to step 1019 where the x-axis position index (i) is reset to 0. In certain examples, once the maximum x-axis position is reached, linear solidification device 88 will travel in the opposite direction along the x-axis to solidify another slice of the object (bi-directional solidification), while in other examples, linear solidification device 88 will travel in the opposite direction without performing any solidification and will then solidify the next slice (uni-directional solidification).

In step 1020, it is determined whether the final object data slice ($z_{max}$) has been reached. If it has, the method ends. If the final slice has not been reached, control returns to step 1004, and the z-axis index (k) is incremented by one so that the object data for another slice can be processed. The process repeats until the last slice has been solidified.

Figure 22:
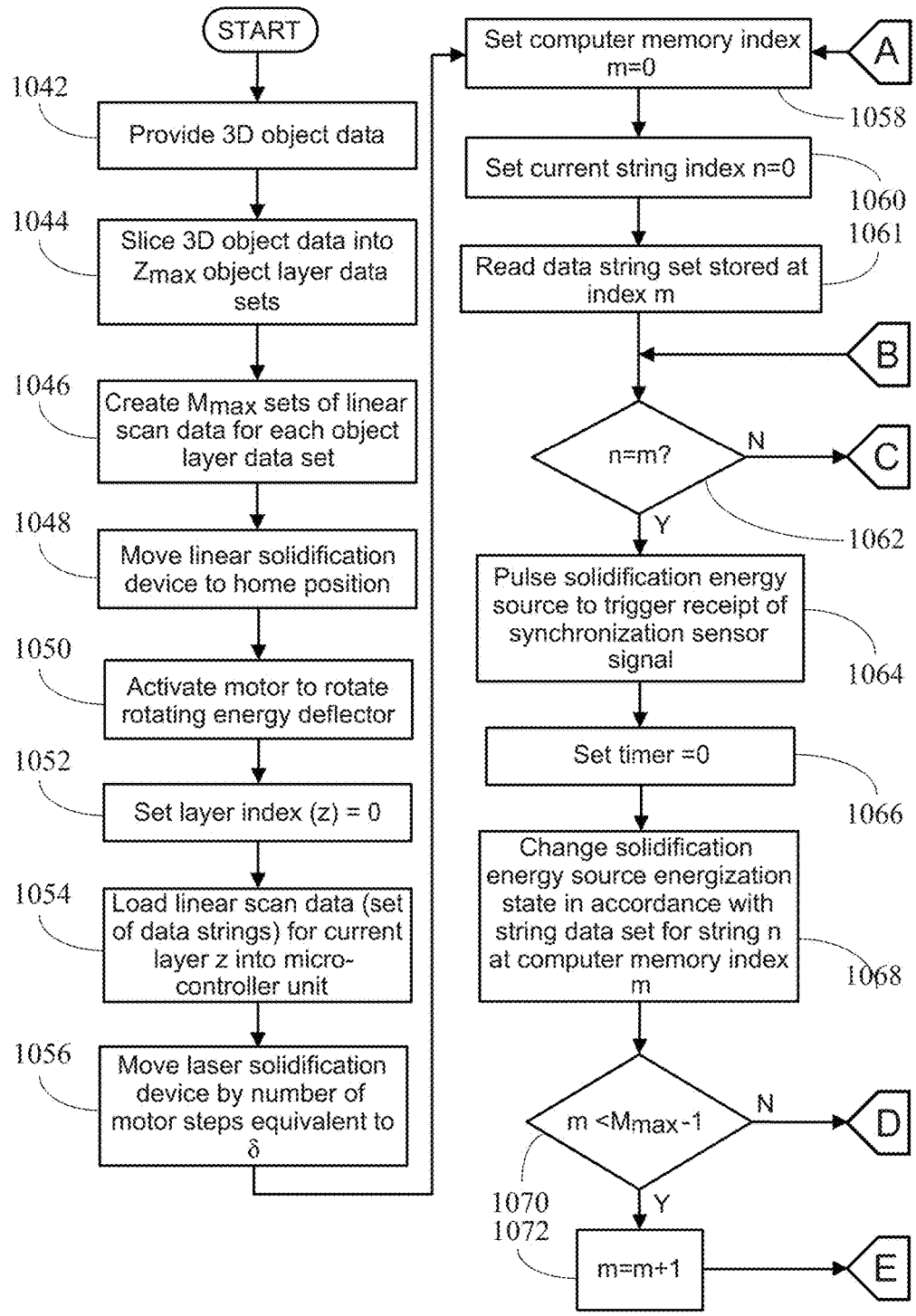
FIG. 22 is a flow chart used to illustrate an alternative method of making a three-dimensional object from a solidifiable material using a linear solidification device.
Figure 23:
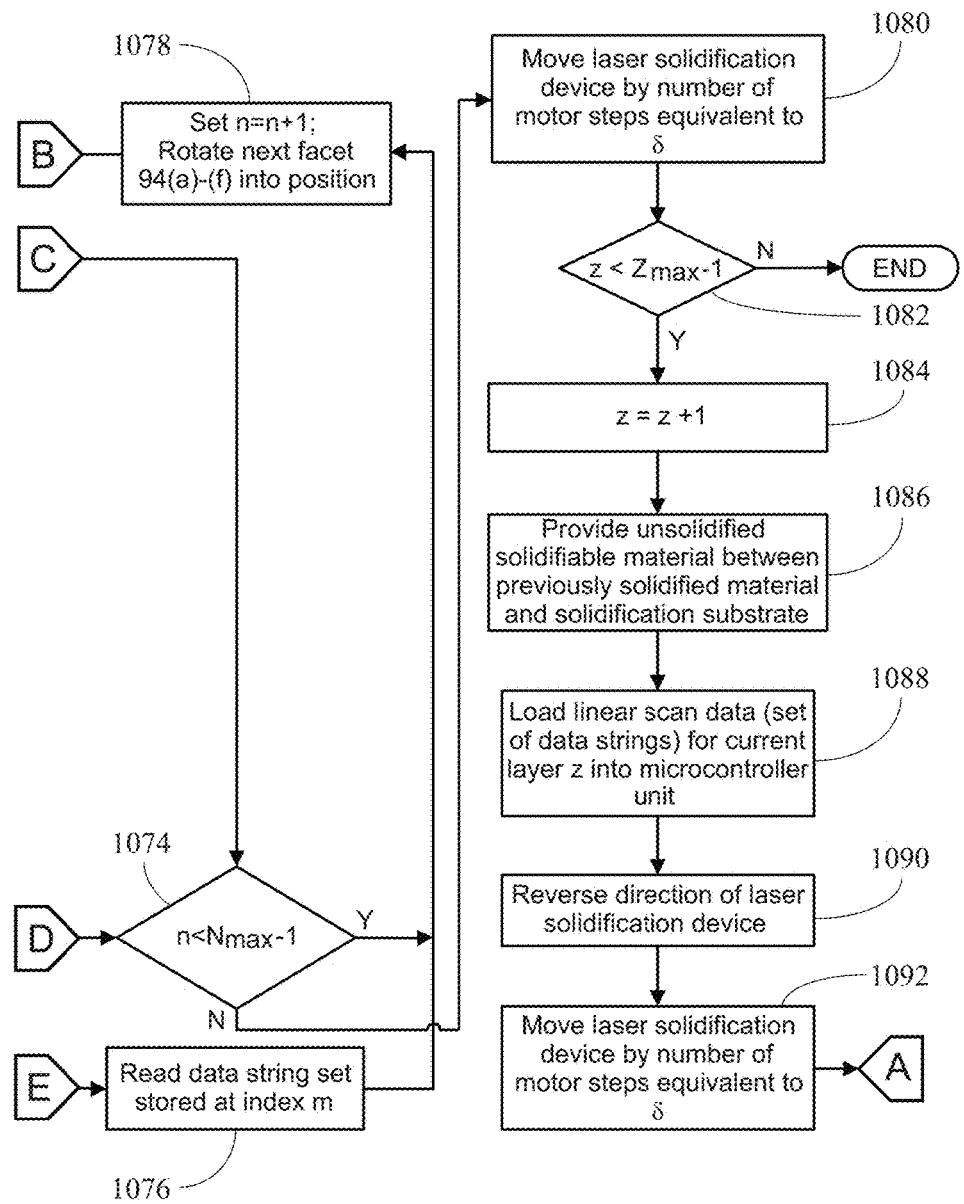
FIG. 23 is a flow chart used to illustrate the alternative method of FIG. 22.

Referring to FIGS. 22 and 23, another method of making a three-dimensional object using a linear solidification device such as linear solidification device 88 (or the previously described variants of device 88) is disclosed. In accordance with the method, three-dimensional object data is provided in step 1042. The data may take a variety of forms such as CAD/CAM data, STL data or other data that defines the shape of the object in three-dimensional space. In step 1044, the data is sliced into a number of object layer data sets $Z_{max}$, wherein each object layer data set corresponds to a particular layer identified by a value of the layer index z that ranges in value from 0 to $Z_{max}-1$. A graphical depiction of such slicing is exemplified by FIGS. 14 and 15. However, the actual slicing method comprises subdividing the three-dimensional object data along a specified axis. In preferred examples, the axis along which the subdividing is done corresponds to the build axis used in the solidification process. Such data slicing techniques are known to those skilled in the art and generally involve identifying the intersection of three-dimensional object data (such as that defined by STL files) with a slicing plane defined by a build axis coordinate. The intersection will define the object contours for the slice.

In step 1046, $M_{max}$ sets of linear scan data are created for each object layer data set. Each layer has its own value of $M_{max}$, which refers to the total number of linear scans necessary to create a part. $M_{max}$ will also be the maximum value of the computer memory index value m for the layer because it represents the number of data storage locations required to store the number of sets of data strings that include object solidification data in the particular layer. In contrast, the entire build envelope 342 (FIG. 16(b)) may have a different maximum number of data strings ($N_{max}$) associated with it which represents the maximum possible number of linear scans that could be performed in the build envelope 342.

In step 1048, linear solidification device 88 is moved to a home position within the x, y plane which may be defined by the position of an end of travel (EOT) sensor 346 (FIG. 16(b)). The home position is preferably offset from the left-hand boundary 343 of the build envelope 342 by a specified offset distance $\delta_L$. In certain examples, the left-hand boundary 343 defines an x-axis origin point $x_0$. The offset distance $\delta_L$ may be specified as a motor movement parameter, such as a number of motor steps, in which case the motor steps may be used to determine when the linear solidification device has arrived at the left-hand boundary 343.

In step 1050, motor 118 (FIGS. 5A and 5C) is activated to begin the rotation of rotating energy deflector 92. The layer index (z) is then set to zero to indicate that the object building process is about to begin.

In step 1054 linear scan data for the layer corresponding to the current value of the layer index (z) is loaded into the microcontroller unit that is used operate the motor 118 and motor 76 and which is also used to change the energization state of solidification energy source 90. The linear solidification device 88 is moved through the offset distance δ(which will be $\delta_L$ or $\delta_R$ depending on the direction of x-axis movement) to reach the boundary 343 or 345 of the build envelope. During the movement of linear solidification device 88 through the offset distance δ, the speed of linear solidification device 88 will preferably reach a substantially constant value. In certain implementations, the linear scan data is corrected to account for variations in the scanning speed along the scanning axis, for example, by using equations 3(g) 3(h), or 3(i) discussed above.

In step 1058, the value of the computer memory index m is set to zero. As explained previously, the computer memory index m is an index used to store those sets of string data that have object solidification data in them. In step 1060, the string index n is also set to zero.

In step 1061, the microcontroller reads the set of string data stored at the current value of the computer memory index m. The set of string data preferably includes a string index (n) value (see FIGS. 16(d), (f), and (g)), and in step 1062 the string index value provided in the set of string data for the current value of m is compared to the current value of n. When the values are the same, it indicates that the solidification will occur at the x-axis position corresponding to the current string index value (n). When the values are not the same, it indicates that no solidification will occur at the x-axis position corresponding to the current string index value (n) so that no data need be read for that string.

When n=m in step 1062, control proceeds to step 1064. In step 1064 a scanning axis synchronization operation is performed prior to the beginning of a line scanning operation. In one example, the solidification energy source 90 is briefly pulsed to cause sensor 324 (FIG. 5C) to generate a synchronization solidification energy sensor signal, which indicates that the rotational position of rotating energy deflector 92 corresponds to the scanning-axis boundary of the build envelope. A timer (such as one programmed in software) is then initialized (e.g., reset to zero) and started (step 1066). The microcontroller unit compares the timer value to the time values stored in the current set of string data (defined by the current value of the computer memory index m) to determine when to change the energization state of the solidification energy source 90 (step 1068). As discussed previously, in the example of FIG. 24 solidification energy source 90 is pulsed at a fixed lag time ($\Delta_1$) relative to the motor 118 pulses used to drive rotating energy deflect 92 in order to perform synchronization. This synchronization pulse may occur at every string index (n) location regardless of whether it is a location at which solidification will occur. Alternatively, it may be performed only for those locations at which solidification will occur. As also described previously, solidification energy source 90 may be pulsed at a fixed time relative to a CPU clock cycle instead of pulsing relative to the motor 118 pulses to perform synchronization. In one example, a dynamic calibration process of the type described previously is used in which the fixed time is determined by dynamically adjusting the synchronizing energy pulse timing relative to the CPU clock until sensor 324 indicates that the energy pulse has been received. In such cases, a lag time $\Delta_1$ relative to the motor 118 pulses may be used as a starting point for the dynamic adjustment process.

The synchronization of the timer to a rotational position of rotating energy deflector 92 will further be described with reference to FIG. 24. Once the timer has been initialized, the solidification energy source 90 is shut off until the current string of object data indicates that it should be toggled on. Due to system delay, such as that involved in receiving and processing synchronization sensor 324 signals and generating solidification energy source output signals, there may be a delay between the microcontroller's receipt of a rising edge 1104a of a synchronization sensor 324 signal and shutting off the solidification energy source 90.

Sensor 324 (FIG. 5C) has a sensing length that may be traversed if the solidification energy source is left on during the period in which it is in optical communication with mirror 332. As a beam of solidification energy traverses the mirror 332 from top to bottom, it will traverse the sensor 324 from bottom to top. However once solidification energy reaches the bottom of mirror 332, it will begin making contact with the solidifiable material and solidifying it. Preferably, the solidification energy source 90 is deactivated before it would otherwise leave the sensing area of sensor 324 or the area of mirror 332 during a synchronization operation. Otherwise, solidification energy would make contact with and solidify solidifiable resin before indicated by the string data. In certain examples, the delay between the receipt of the rising edge of the solidification sensor 324 input signal and the deactivation of the solidification energy source 90 occurs within a lag time $\Delta_2$ that is no more than about 400 nanoseconds, preferably no more than about 300 nanoseconds, more preferably no more than about 250 nanoseconds, and still more preferably no more than about 200 nanoseconds.

In preferred examples, the lag time $\Delta_2$ is less than the time required for solidification energy to traverse the entire sensing length of sensor 324. The time required for solidification energy to traverse the entire length of sensor 324 may be calculated as follows:

$$\text{time} = (60 \text{ sec/min})(L_S/(L_{BE} \times \text{RPM} \times F)) \quad (11)$$

wherein, $L_S$=linear distance of the sensor's sensing area;
  $L_{BE}$=length of the build envelope in the scanning (y) axis direction (i.e., the linear length of a full scan);
  RPM=rotational speed of rotating energy deflector 92 (revolutions/minute); and
  $F$=number of facets on rotating energy deflector 92.

Referring again to FIG. 22, when the line scanning operation is complete, the current value of the computer memory index m is compared to the maximum index value ($M_{max}$-1) for the current layer (step 1070). If m is less than $M_{max}$-1, the layer is not complete. In that case, control proceeds to step 1072 and the value of the computer memory index m is incremented by one. The set of string data for the new value of m is read in step 1076. In step 1078, the value of the string index n is incremented by one and the rotating energy deflector 92 rotates to the next facet 94(a)-(f). Control then returns to step 1062.

During step 1062 if the string index value n that is stored in the set of string data for the current value of m is not equal to the current value of the string index value n, then no solidification will occur at the x-axis position corresponding to the current value of the string index n. In that case, control transfers to step 1074 to determine if the last string $N_{max}$-1 has been reached. If it has been reached, control transfers to step 1080 (FIG. 23). Otherwise, control transfers to step 1078 at which the value of the string index n is again incremented by one. In step 1070 if the current value of the memory index m has reached the layer's maximum value $M_{max}$-1, no further solidification will occur in the current layer and control proceeds to step 1074.

As mentioned previously, in certain examples a microcontroller is used to control the operation of solidification energy source 90 based on object shape data and also may regulate movement of the build platform (e.g., build platform 43 in FIGS. 1-2 or build platform 354 in FIG. 19). Many commercially available microcontrollers use what are known as "interrupts" to perform tasks such as USB communications, memory refreshing, and reading peripheral devices. During an interrupt, the currently executed task is stopped so that one of these other tasks may be performed. However, in those examples that use string data comprising time values to represent a three-dimensional object, an interrupt will disturb the synchronization of the CPU timer with the position of the rotating energy deflector (or the tilt angle of a laser scanning micromirror) and potentially distort the three-dimensional object. In such examples, it is preferable to cancel software and/or hardware interrupts during a line scanning operation. In one example, a program is stored in the microcontroller which causes the interrupts to be disabled when the method of FIGS. 22-23 is between steps 1062 and 1082. The interrupts may then be enabled when the method reaches step 1084.

In step 1074, when the string index value n reaches the maximum string index value $N_{max}-1$, processing of the current layer is complete. Control then proceeds to step 1080 to move linear solidification device 88 through the offset distance δ. If the linear solidification device 88 processed the current layer by moving from left to right (when the build envelope 342 is viewed from above), the offset distance δ in step 1080 will be $δ_R$. Otherwise, it will be $δ_L$.

In step 1082 the current value of the layer index (Z) is compared to the maximum layer index value ($Z_{max}-1$). If the last layer has been completed, the build terminates. Otherwise, the layer index is incremented by one (step 1084). In step 1086, a fresh amount of unsolidified solidifiable material is provided between the previously solidified layer and the rigid or semi-rigid solidification substrate 68. In the case of the systems shown in FIGS. 1-4 and 6-8, this could be done, for example, by moving the build platform 43 downward into a supply of solidifiable material, which would produce a gap between the last solidified layer and the substrate 68 into which fresh unsolidified material can flow. In the case of systems such as those shown in FIGS. 19 and 20, build platform 356 may be moved upward and fresh unsolidified solidifiable material may be added to the basin film assembly 205 or one of the other basin structures described previously.

In step 1088, linear scan data (i.e., sets of string data) corresponding to the new layer index value z is loaded into the microcontroller unit. In step 1090, the direction of travel of the linear solidification device 88 along the x-axis direction is reversed. The linear solidification device is moved through the applicable offset distance $δ_L$ or $δ_R$ until the applicable build envelope boundary 343 or 345 is reached. Control then returns to step 1058 in FIG. 22 to begin the process of solidifying the new layer.

Referring to FIGS. 17-18, an alternate embodiment of a system for making a three-dimensional object is depicted. The system comprises a solidification substrate assembly 62 that is substantially similar to the solidification substrate assembly 62 of FIGS. 7-13. In this embodiment, however, linear solidification device 88 has been replaced with linear solidification device 308. Although FIGS. 17-18 depict linear solidification device 308 with the solidification substrate assembly 62 of FIGS. 7-13, it can also be used with the embodiment of solidification substrate assembly 62 shown and described with respect to FIGS. 3 and 7 which uses a curved, stationary, rigid or semi-rigid solidification substrate 68. In FIGS. 17-18, film assembly 205 is again provided (film 224 is not visible in FIGS. 17 and 18).

In the example of FIGS. 17-18, linear solidification device 308 comprises an array of light projecting elements such an array of laser elements or light emitting diode elements $310_0$-$310_{max}$. In one preferred embodiment, each such element is "gray scalable," such that the duration of each element's activation at a given location in the x, y plane is the same while each element projects an individually controllable light intensity. Linear solidification device 308 may comprise a single row of light projecting elements $310_0$-$310_{max}$ and may also include several rows of light projecting elements arranged in the length (x-axis) direction of solidification substrate assembly 62. In certain examples, at least two rows of light projecting elements are provided with the rows arranged in the length (x-axis) direction and their respective light projecting elements staggered in the width (y-axis) direction to create a zig-zag pattern.

Unlike linear solidification device 88, at a given position along the length (x-axis) direction of solidification substrate assembly 62, linear solidification device 308 can selectively and simultaneously solidify locations along the entire y-axis build envelope direction. Each element of light emitting elements $310_0$-$310_{max}$ projects a corresponding pixel of solidification energy onto a corresponding y location of the solidifiable material (the x-axis location depends on the position of the linear solidification device 308 which is variable). Thus, energy is not "scanned" in the y-axis direction as with linear solidification device 88. Further, object data may be provided as volumetric pixels ("voxels") each having its own x and y location and associated solidification depth in the z-axis direction because the gray scaling feature allows for individually controllable intensities, which in turn may provide individually controllable curing depths. The grayscale value represents a total exposure for the pixel (where total exposure for the pixel is expressed as follows:

$$\text{Total Exposure} = \int I \, dt \quad (12)$$

wherein, I is the intensity of the supplied solidification energy (e.g., Watts/pixel) and the integration is performed over the exposure time period, Δt.

In certain examples, the grayscale output value may be used to control the linear solidification device's output to provide full intensity, no output, or variations in between. In processes using a fixed exposure time per pixel, the linear solidification deice may reduce the amount of electromagnetic radiation (e.g., intensity, I) that the solidifiable material is exposed to for each pixel for the specified exposure time.

In one preferred embodiment, linear solidification device 308 moves continuously in the x-axis direction as solidification energy is provided as a generally, or preferably substantially, linear pattern in the y-axis direction. Depending on the profile of the object being built, the solidification energy pattern defined by linear solidification device 308 may change as different locations on the length (x-axis) direction are reached.

The use of gray scalable light emitting elements $310_0$-$310_{max}$ allows for the use of voxelized object data to represent the three-dimensional object being built. Voxel data may be considered a collection or set of data that represents volumetric pixels. The voxel data may be organized into a voxelized bitmap pattern that includes a grayscale value for each pixel and/or an exposure time. The voxelized bitmap may be considered an organized collection of individual voxels, each voxel having its own depth that is independent of the other voxels. Although the voxels may be organized into a bitmap, each voxel is generally treated individually and has its own curing depth (which can be determined by the exposure time and/or intensity value assigned to each voxel) to determine each voxel's geometry independent of any other voxel data. The object may be formed using the voxel data where each voxel may be created in the solidifiable material by exposing the exposed surface of the solidifiable material to obtain a particular depth of cure (typically determined by the grayscale value and/or exposure time) and thereby create the three-dimensional voxel in the solidifiable material. Each voxel may be generated individually, in a group or subset (e.g., more than one voxel), or as a whole of the voxel data (e.g., all voxels at once).

When using a voxelized construction process, each voxel may have its own thickness (e.g., depth of solidification) which is controlled by the grayscale value. Nevertheless, sliced object data such as that described with respect to FIG. 15 may be used to drive the operation of linear light emitting device arrays comprising linear solidification device 308. A control unit (not shown) receives object data in the desired format and directs the activation of each light projecting element $310_0$-$310_{max}$.

While the gray-scaled intensity may be expressed as an integer number on a reference scale (e.g., 0 . . . 255), the intensity value may also be compensated or adjusted before being sent to the linear solidification device 308, or may be compensated or adjusted at the linear solidification device 308, or both. For example, where the solidifiable material has a minimum intensity threshold that is required for polymerization or partial-polymerization, the "off" or zero (0) value intensity (e.g., brightness and/or "on" time) may be determined based on the minimum intensity threshold specific to the particular solidification material. A zero value for intensity does not necessarily imply that the energy supplied by linear solidification device 308 is actually zero. In a typical case, a low level of brightness may correspond to a zero (0) intensity.

Intensity ranges of 0 to 255 are convenient for examples when an 8-bit system is used to determine intensity. However, systems having more or less resolution for intensity may be used. Examples may include a 4 bit system or a 16 bit system. Further, the exposure time of the electromagnetic radiation may have a wide range, for example, 1 millisecond to 100 seconds. Note that the time range is merely an example and is not limiting as the "on time" for the electromagnetic radiation may be dependent on other variables such as the minimum switching time of the pattern generator, the intensity of the electromagnetic radiation, the solidifiable material's minimum effective time and radiation intensity for solidification, the speed of movement of build platform 43, and other factors.

The process of solidifying solidifiable material with linear solidification device 308 or linear solidification device 88 may occur in discrete steps with the formation of discrete object layers or without the use of a layered formation process. In particular, a continuous build process may be used in which build platform 43 moves during the entire build process. Even with continuous build processes, due to possible electromagnetic radiation interruptions, some slight interface layer formation could still occur. Nevertheless, such interface formation can be minimized or even totally eliminated.

When continuous build processes are used, structural "steps" that sometimes appear in the outer contours of objects built with layer processes can be minimized. In continuous build processes, the three-dimensional object is allowed to solidify or grow in the main building direction (typically in the Z-direction) without interrupting the supply of electromagnetic radiation during an irradiation phase and optionally during the whole building process. The corresponding continuous growth of solidifiable material in the main building (Z) direction during an irradiation phase may thus proceed at an extent exceeding a usual hardening depth typical of conventional layer-wise solidification and which is predetermined by the used supply of electromagnetic radiation and/or by a used polymerizable material.

By the layer-independent continuous operation, it is even possible to specifically influence and to control a current hardening depth of the solidifiable material. An adjustment of the speed of the support plate supporting the object to be generated moving away from the building surface, and an adjustment of the irradiation intensity of pixels (grey value or color value), respectively alone or in combination, are particular means for controlling the hardening depth.

In using the systems for making a three-dimensional object described herein, it is desirable to ensure that sufficient solidifiable material is provided over the most recently formed section of the three-dimensional object so that the desired layer thickness is obtained. It is also generally desirable to ensure that while the solidifiable material is being solidified, the region receiving solidification energy is free from surface disturbances or other disruptions to better conform the solid object to the object data that defines it. In certain examples, such as in the system 40 of FIGS. 1-2 or the modified versions thereof described previously, it is necessary to temporarily separate the build platform from the exposed surface of the solidifiable material by a distance greater than the next layer thickness and then return the build platform to a distance from the exposed surface that is equal to the next layer thickness to allow solidifiable material to flow over the most recently solidified section of the three-dimensional object. In downward build processes, this is sometimes referred to as "deep dipping." However, such processes may increase object build times because of the waiting time required until a new layer of solidifiable material is present.

Figure 33:
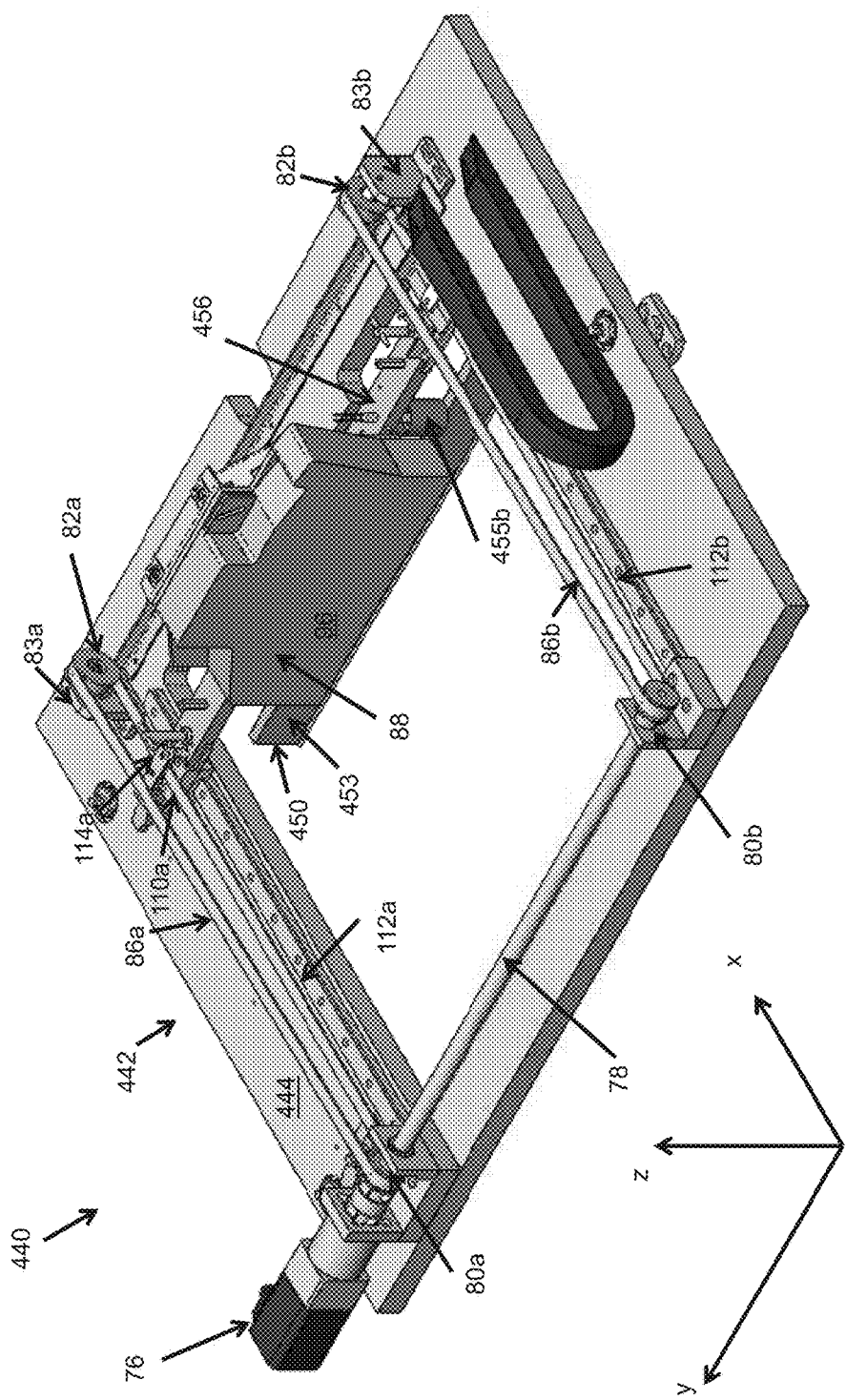
FIG. 33 is a perspective view of a portion of a work table assembly and a linear solidification device operatively connected to a vacuum blade for use in a system for making at three-dimensional object.
Figure 34:
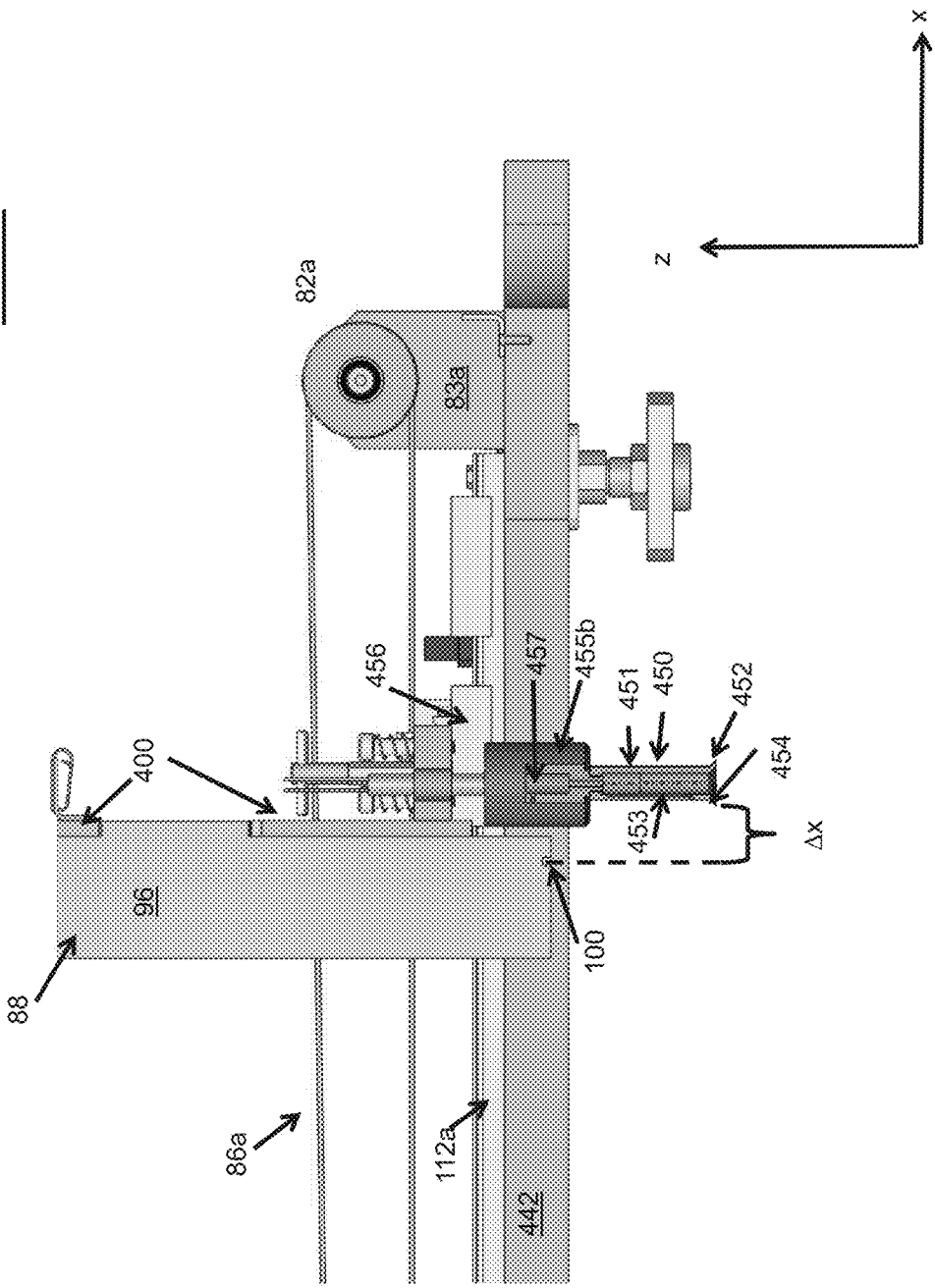
FIG. 34 is a side cross-sectional view of a portion of FIG. 33.
Figure 35:
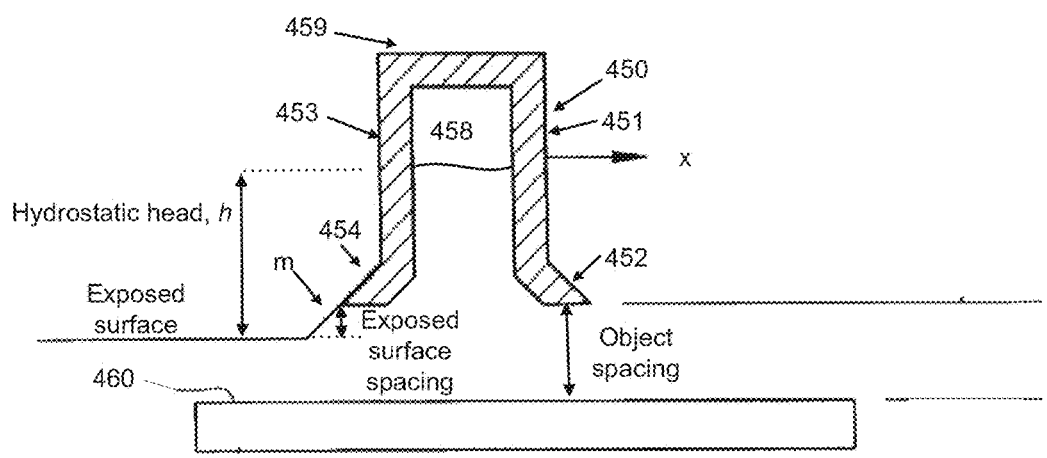
FIG. 35 is a side cross-sectional view of the vacuum blade of FIG. 33 relative to a working surface of a solidifiable material and an upper portion of a solidified object.

Referring to FIGS. 33 and 34, a portion of a system 440 for making a three-dimensional object is depicted. System 440 comprises a work table assembly 442 that includes a work table 444. A reservoir of solidifiable material would be located underneath the work table 444 along with a build platform, but neither is shown in the figures. Unlike the previous systems, a solidification substrate assembly is not provided with system 440. However, system 440 includes a blade which is preferably a vacuum blade 450 as shown in FIGS. 33 and 34. Vacuum blade 450 is an elongated generally rectangular structure with a height (in the z-axis direction) that is at least twice, preferably three times, and even more preferably four times its width in the x-axis direction. Referring to FIG. 35, vacuum blade 450 includes first and second surfaces 451 and 453 having lengths that extend along the scanning (y) axis direction and which are spaced apart from one another along the x-axis direction. Surfaces 451 and 453 lie in the y-z plane. Upper surface 459 lies in the x-y plane and connects first and second surfaces 451 and 453. The spacing between surfaces 451 and 453 creates a hollow interior 458 that may receive a volume of solidifiable material. First and second surfaces 451 and 453 are connected to respective projecting edges 452 and 454. Projecting edge 452 is connected to first surface 451 and projects away from both first surface 451 and second surface 453 along a direction that has both x-axis and z-axis components. Projecting edge 454 is connected to second surface 453 and projects away from both first surface 451 and second surface 453 along a direction that has both x-axis and z-axis components. The projecting edges 452 and 454 are spaced apart from one another along the x-axis and face away from one another along the x-axis. The projecting edges 452 and 454 are also spaced apart from upper surface 459 in a direction along the z-axis.

The hollow interior 458 of vacuum blade 450 is preferably in fluid communication with a vacuum pump or a compressor that is operable to maintain the hollow interior at a pressure that is below atmospheric pressure (typically 14.7 psia at sea level). The maintenance of a subatmospheric pressure causes a level (shown as having a height h in FIG. 35) of solidifiable material to develop within the hollow interior of vacuum blade 450 relative to the exposed surface of the solidifiable material which remains at atmospheric pressure. The level of solidifiable material may be determined by well known calculations that relate the level of vacuum to the hydrostatic head h created by the level in the vacuum blade interior 458. A pressure regulator is preferably provided to maintain a desired level of vacuum within hollow interior 458. A shown in FIG. 35, a meniscus m is created between the projecting edges 452 and 454 and the exposed surface of the solidifiable material. The meniscus m seals the bottom of vacuum blade 450.

As discussed previously, in the systems described herein, the build platform (e.g., build platform 43 in FIGS. 1-2) is pulled away from the exposed surface of solidifiable material once the linear solidification device 88 completes its traversal of the build envelope in the x-axis direction. This temporarily results in the most recently solidified surface of the three-dimensional object being exposed (i.e., not covered with solidifiable material) at a build (z) axis position that is offset from the exposed surface of solidifiable material elsewhere in the build envelope. Viscous solidifiable materials may take some time to flow over the solidified object so that a new layer may be created. However, when vacuum blade 450 encounters the most recently formed object surface, fluid from the interior space 458 of the vacuum blade 450 is deposited over the most recently formed object surface to create an even, new layer of unsolidified, solidifiable material.

Without wishing to be bound by any theory, it is believed that when the vacuum blade 450 encounters the most recently formed surface of the object, there is a sudden change in hydrostatic head in the interior space 458 of vacuum blade 450. If the interior space 458 has a controlled vacuum pressure, the level h drops in order to maintain hydrostatic equilibrium. Thus, solidifiable material from the interior 458 is deposited onto the last formed object surface to restore equilibrium. It is further preferred that a level compensator of the type known in the art is provided to maintain the exposed surfaced of the solidifiable material at a substantially constant level as the build platform moves and solidifiable material is solidified. Thus, in certain preferred examples, the height h of solidifiable material within vacuum blade interior space 458 is at least as great as the maximum desired layer thickness to ensure that sufficient liquid is available for deposit over the last formed layer.

As shown in FIG. 35, in certain examples the lower surface of the vacuum blade 450 is spaced apart from the exposed working surface of the solidifiable material by an exposed surface spacing and is also spaced apart from the last formed layer of three-dimensional object 460 by an object spacing. In preferred examples, the object spacing is greater than the exposed surface spacing. The exposed surface spacing is preferably greater than zero to avoid disturbing the exposed surface as the vacuum blade 450 moves in the x-axis direction. At the same time, or in other cases, the exposed surface spacing is preferably no greater than that which allows the formation of a reliable meniscus m to ensure that the vacuum level within interior space 458 of vacuum blade 450 is not disrupted. Preferred exposed surface spacings between the lower surface of vacuum blade 450 and the exposed surface of the solidifiable material are no greater than about 500 microns, even more preferably no greater than 200 microns, and still more preferably no greater than 100 microns. Preferred object spacings between the lower surface of vacuum blade 450 and the last solidified (upper) surface of object 460 are at least about one layer thickness, preferably at least about 1.2 layer thicknesses, and more preferably at least about 1.5 layer thicknesses. At the same time or in other examples, preferred object spacings between the lower surface of vacuum blade 450 and the last solidified (upper) surface of object 460 are no greater than about 3 layer thicknesses, more preferably no greater than about 2.5 layer thicknesses, and still more preferably no greater than about 2 layer thicknesses.

As best seen in FIG. 34, vacuum blade 450 and linear solidification device 88 are operatively connected to one another so that when linear solidification device 88 moves in the x-axis direction, the vacuum blade 450 also moves in the x-axis direction. In preferred examples, there is a substantially fixed x-axis offset (shown as Δx in FIG. 34) that is maintained between the substantially linear opening 100 in the linear solidification device housing 96 and vacuum blade 450 as the linear solidification device and vacuum blade 450 travel in the x-axis direction. The x-axis offset minimizes the likelihood that solidification energy exiting from the substantially linear opening 100 will impinge on vacuum blade 450 instead of upon the solidifiable material. In certain known three-dimensional object manufacturing systems, vacuum blades are used to apply and smooth a solidifiable material across an entire build envelope prior to the delivery of solidification energy to any portion of the build envelope for a particular object cross-section. In such systems, there is often a "wait time" before the exposed surface of the solidifiable material is sufficiently smooth such that solidification energy may be delivered. However, in the system of FIGS. 33-36, solidification energy may be delivered quickly after vacuum blade 450 traverses a particular x-axis location because solidification energy is only delivered to linear sections extending along the scanning (y) axis and which are separated from the vacuum blade by the x-axis offset (Δx). Thus, it is unnecessary to wait until the entire exposed surface of solidifiable material is smooth because that entire area will not be solidified at once, as in the case of DLP or spatial light modulator systems. Nor will the exposed surface be subject to the delivery of solidification energy in non-linear patterns from point sources, as in the case of laser systems that make use of dual galvo mirrors.

Referring again to FIG. 33, linear solidification device 88 is connected to a cross-bar 456 by a suitable mechanical connection device. Cross-bar 456 is connected to linear bearings 110*a* and 110*b* (not visible in figures) at each of its ends. Each linear bearing 110*a* and 110*b* engages a respective linear slide 112*a* and 112*b*. Brackets 114*a* and 114*b* (not visible) connect cross bar 456 to respective timing belts 86*a* and 86*b* (not visible). Each timing belt 86*a* and 86*b* is connected to a respective pulley 82*a* and 82*b* and a respective end 80*a* and 80*b* of motor shaft 78. Brackets 83*a* and 83*b* are also provided to mount pulleys 82*a* and 82*b*. When motor 76 is energized, shaft 78 rotates, causing timing belts 86*a* and 86*b* to circulate. The circulation of the timing belts 86*a* and 86*b* causes the cross-bar 456 to move in the x-axis direction as the linear bearings 110*a* and 110*b* slidingly engage their respective linear slides 112*a* and 112*b*.

Vacuum blade 450 is also connected to cross-bar 456 via vacuum blade supports 455*a* (not visible) and 455*b*. The vacuum blade 450 is spaced apart from cross-bar 456 in the z-axis direction and away from the bottom of the linear solidification device housing 96 in the z-axis direction. Because both the linear solidification device 88 and the vacuum blade 450 are connected to cross-bar 456, they each move concurrently with one another in the x-axis direction and maintain the x-axis offset, Δx. In the example of FIG.

33, solidification energy is only supplied when the vacuum blade 450 precedes the linear solidification device 88, which occurs when the linear solidification device moves away from motor shaft 78 in the x-axis direction. Put differently, solidification energy is only supplied when the linear solidification device moves in the same direction as the x-axis offset. Thus, if the x-offset (as measured by subtracting the x-axis position of the linear solidification device 88 from the x-axis position of the vacuum blade 450) is in the positive x-axis direction, solidification occurs when the linear solidification device moves in the positive x-axis direction. This ensures that the vacuum blade 450 provides any necessary solidifiable material to the x-axis locations to be solidified before solidification energy is delivered to those locations. In the example of FIG. 33, once the linear solidification device 88 and vacuum blade 450 reach the end of travel in the direction away from motor shaft 78, they are quickly returned to the starting location proximate motor shaft 78 without delivering solidification energy during the return trip. Thus, only unidirectional solidification occurs along the x-axis. However, in certain other examples, a second vacuum blade may be positioned on the side of linear solidification device 88 opposite vacuum blade 450 (i.e., so the two vacuum blades are spaced apart along the x-axis). Each vacuum blade would preferably have a fixed x-axis offset relative to the linear opening 100 in the linear solidification device housing 96. This configuration would allow for bi-directional solidification in the x-axis direction by ensuring that a vacuum blade contacts any linear section of solidifiable material to be solidified before solidification energy is delivered to the linear section.

In some cases involving large build envelopes, a single linear solidification device 88 may be incapable of delivering a sufficient solidification energy density to solidify a three-dimensional object in a desired amount of time. As the build envelope size increases in the scanning (y) axis direction, the scanning speed will have to increase in order to maintain the same overall build speed. However, as the scanning speed increases, each portion of the solidifiable material that receives solidification energy during a given scan is exposed for less time, resulting in a decreased solidification energy. As a result, it may be difficult or impossible in some cases to achieve the desired solidification depth in the build (z) axis direction without significantly increasing the overall build time. As a result, in some cases, especially those involving large build envelopes, it is desirable to use multiple linear solidification devices arranged along the scanning (y) axis direction. An example of a portion of system 440 for making a three dimensional object using multiples linear solidification devices is depicted in FIG. 36.

FIG. 36 is a perspective view looking upward from underneath a work table assembly 442 comprising work table 444. Linear solidification devices 88a and 88b are spaced apart from one another in the scanning (y) axis direction and are each connected to a cross-bar 456 that is configured as described with respect to FIG. 33. The linear solidification devices 88a and 88b are each connected to a single vacuum blade 450, which is also configured as shown in FIGS. 33-35. The drive components (motor 76, shaft 78, linear bearings 110a and 110b, linear slides 112a and 112b, etc.) are the same in FIG. 36 as in FIGS. 33-34.

While the linear solidification devices 88a and 88b are spaced apart from one another along the scanning (y) axis direction, they are preferably configured to deliver solidification energy to an overlap region along the scanning axis to ensure that there are no gaps or deadspaces along the scanning (y) axis that cannot be exposed to solidification energy. As best seen in FIGS. 5C and 5D, solidification energy may be delivered from each device 88a and 88b at an angle relative to the x-y plane so that the highest position that device 88b can deliver energy to along the y-axis is higher than the lowest position that the device 88a can deliver energy to along the y-axis. In one example, device 88b may be capable of delivering solidification energy from the beginning of the build envelope (in the scanning axis direction) to a maximum position 20 mm away from the beginning of the build envelope, while device 88a may be capable of delivering solidification energy from a minimum position 18 mm away from the beginning of the build envelope to the end of the build envelope (in the scanning axis direction), yielding a 2 mm overlap region. The desired degree of overlap may be achieved by appropriately selecting the spacing between the linear solidification devices 88a and 88b, as well as appropriate linear opening 100a and 100b lengths for each device, and ensuring that the various lenses and other optical components are appropriately selected.

As indicated above, in many cases, the linear solidification devices 88a and 88b will solidify a common overlap region to ensure continuity of solidification. To prevent gaps from occurring the object data strings used to guide the solidification process may be modified for use with multiple linear solidification devices. An example of such modified data is provided in FIG. 30. FIG. 30 is based on the data strings of FIG. 16(d) which corresponds to the object cross-section depicted in FIG. 16(c). The object cross-section of FIG. 16(c) requires solidification by each linear solidification device 88a and 88b in an overlap region along the y-axis because it includes continuous object sections that cross the scanning axis boundary that divides the scanning axis regions served by the linear solidification devices 88a and 88b. Thus, each data string in FIG. 16(d) is subdivided into two data strings for each of the devices 88a and 88b. In this example, device no. 1 mentioned in FIG. 30 would correspond to linear solidification device 88b in FIG. 36, and device no. 2 would correspond to linear solidification device 88a. For string (n) index 20, the solidification energy source in linear solidification device 88b is activated at 22000 CPU ticks and deactivated at 34000 CPU ticks. The solidification energy source in linear solidification device 88a is activated at 33000 CPU ticks (i.e., before the solidification energy source in linear solidification device 88b is deactivated) and deactivated at 44000 CPU ticks. Thus, there is a 1000 CPU tick overlap that defines a time period during which the solidification energy sources in both linear solidification device 88a and 88b will be activated.

FIGS. 31 and 32 are based on FIGS. 16(f) and 16(g), and each provide data strings for two linear solidification devices. In this example, the string data for device no. 1 in FIG. 31 is used for linear solidification device 88b in FIG. 36, and the string data for device no. 2 in FIG. 32 is used for linear solidification device 88a in FIG. 36. The object for which the data strings are provided is the object depicted in FIG. 16(e). This object has some regions where continuous solidification is required across the scanning axis border of the scanning axis regions served by both linear solidification devices 88a and 88b and other regions where there is a gap between the regions. FIG. 31 depicts the string data for "even" object layers, and FIG. 32 depicts the data strings for "odd" object layers.

Referring to FIG. 31, string index n=20 describes data strings for areas where the object crosses the scanning axis boundaries of linear solidification devices 88a and 88b.

Thus, linear solidification device 88*b* is activated at 8500 CPU ticks and deactivated at 32000 CPU ticks, while linear solidification device 88*a* is activated at 31000 CPU ticks and deactivated at 54000 CPU ticks, thereby providing an overlap interval of 1000 CPU ticks during which the solidification energy sources for both linear solidification devices 88*a* and 88*b* are active. In contrast, data strings for string index n=30, 59, and 60 describe regions where there is a scanning axis gap in the object, and the regions do not cross the scanning axis boundaries of the linear solidification devices 88*a* and 88*b*. Thus, the solidification energy source in linear solidification device 88*b* is deactivated prior to the activation of linear solidification device 88*a*, as reflected in the gap between the 24750 CPU tick value for device no. 1 in string index n=30 and the 41250 CPU tick value for device no. 2 at string index n=30. FIG. 32 shows the transformation of the data in FIG. 31 to allow an odd layer to be solidified in the same pattern as the even layer without the need for separately storing the object data for the odd layer, using the same technique described to generate the data of FIG. 16(*g*) based on the data of FIG. 16(*f*).

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. An apparatus for making a three-dimensional object from a solidifiable material, comprising:
    a linear solidification device that is movable along a first axis and operable to progressively solidify the solidifiable material along a second axis while moving along the first axis; and
    a vacuum blade having a length extending along the second axis and which is operatively connected to the linear solidification device such that when the linear solidification device moves along the first axis, the vacuum blade moves along the first axis.

2. The apparatus of claim 1, wherein the vacuum blade comprises first and second surfaces spaced apart along the first axis which define an interior space between the first and second surfaces, and the apparatus further comprises a vacuum pump in fluid communication with the interior space and operable to maintain the interior space below atmospheric pressure.

3. The apparatus of claim 2, wherein the vacuum blade further comprises first and second projecting edges, the first projecting edge is connected to the first surface and projects away from the first surface and the second surface, and the second projecting edge is connected to the second surface and projects away from the second surface and the first surface, and the first and second projecting edges are spaced apart from one another along the first axis.

4. The apparatus of claim 1, wherein the linear solidification device and the vacuum blade are spaced apart along a third axis.

5. The apparatus of claim 1, wherein the vacuum blade is spaced apart from the linear solidification device in a first direction along the first axis.

6. The apparatus of claim 1, wherein the solidifiable material comprises a photohardenable resin, and the apparatus further comprises a container that contains the photohardenable resin.

7. The apparatus of claim 1, wherein the solidifiable material has an exposed surface, the vacuum blade has a lower surface, and the lower surface of the vacuum blade is spaced apart from the exposed surface along a third axis.

8. The apparatus of claim 1, wherein the linear solidification device is movable in a first direction along the first axis and in a second direction along the first axis, the linear solidification is operable to progressively solidify the solidifiable material while moving in the first direction along the first axis and is not operable to progressively solidify the solidifiable material while moving in the second direction along the first axis, and the vacuum blade is spaced from the linear solidification device in the first direction along the first axis.

9. The apparatus of claim 1, wherein the linear solidification device comprises a first linear solidification device, and the apparatus further comprises a second linear solidification device positioned adjacent the first linear solidification device along the second axis.

10. The apparatus of claim 1, wherein the linear solidification device comprises a selectively activatable laser diode in optical communication with a rotating polygonal mirror.

11. A method of forming a three-dimensional object, comprising:
    traversing a vacuum blade along a first axis and in contact with a solidifiable material; and
    traversing a linear solidification device along the first axis and progressively supplying solidification energy from the linear solidification device to the solidifiable material along a second axis as the linear solidification device is traversed along the first axis.

12. The method of claim 11, further comprising maintaining an offset between the vacuum blade and the linear solidification device in a first direction along the first axis.

13. The method of claim 11, wherein the step of traversing the linear solidification device along the first axis comprises traversing the linear solidification device in a first direction along the first axis and progressively supplying solidification energy from the linear solidification device to the solidifiable material along the second axis as the linear solidification device is traversed in the first direction along the first axis, and the method further comprises traversing the linear solidification device in a second direction along the first axis without supplying solidification energy from the linear solidification device to the solidifiable material.

14. The method of claim 13, wherein during the step of traversing the linear solidification device in a second direction along the first axis the vacuum blade is offset from the linear solidification device in the first direction along the first axis.

15. The method of claim 11, wherein the vacuum blade has a length extending along the second axis and first and second surfaces spaced apart along the first axis which define an interior space between the first and second surfaces, and the method further comprises maintaining the interior space at a sub-atmospheric pressure.

16. The method of claim 15, wherein the solidifiable material has an exposed surface, the method further comprises maintaining a volume of the solidifiable material in the interior space, and the volume of the solidifiable material has a level above the exposed surface.

17. The method of claim 11, wherein the solidifiable material has an exposed surface, the vacuum blade has a bottom surface, and the step of traversing the vacuum blade along the first axis comprises maintaining the bottom vacuum blade surface spaced apart from the exposed surface along a third axis.

18. The method of claim 11, wherein the linear solidification device is a first linear solidification device, and the method comprises providing a second linear solidification device positioned adjacent the first linear solidification device along the second axis, and the method further comprises progressively supplying solidification energy to the solidifiable material from the second linear solidification device along the second axis as the second linear solidification device is traversed along the first axis.

19. The method of claim 18, wherein the step of progressively supplying solidification energy to the solidifiable material from the first linear solidification device to the solidifiable material along the second axis comprises supplying solidification energy from the first linear solidification device to an overlap region of the solidifiable material along the second axis, and the step of progressively supplying solidification energy to the solidifiable material from the second linear solidification device to the solidifiable material along the second axis comprises supplying solidification energy from the second linear solidification device to the overlap region of the solidifiable material along the second axis.

20. The method of claim 11, wherein the step of progressively supplying solidification energy from the linear solidification device to the solidifiable material along a second axis as the linear solidification device is traversed along the first axis comprises selectively activating a laser diode in optical communication with a rotating polygonal mirror as the linear solidification device is traversed along the first axis.

* * * * *